(12) United States Patent
Mizusawa

(10) Patent No.: US 10,045,328 B2
(45) Date of Patent: Aug. 7, 2018

(54) APPARATUS ENABLING MULTICAST TO A SPECIFIC TERMINAL GROUP

(71) Applicant: SONY CORPORATION, Tokyo (JP)

(72) Inventor: Nishiki Mizusawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 1 day.

(21) Appl. No.: 15/112,446

(22) PCT Filed: Nov. 11, 2014

(86) PCT No.: PCT/JP2014/079859
§ 371 (c)(1),
(2) Date: Jul. 19, 2016

(87) PCT Pub. No.: WO2015/114905
PCT Pub. Date: Aug. 6, 2015

(65) Prior Publication Data
US 2016/0338011 A1   Nov. 17, 2016

(30) Foreign Application Priority Data

Jan. 28, 2014 (JP) ................................. 2014-013643

(51) Int. Cl.
*H04W 72/00* (2009.01)
*H04W 4/06* (2009.01)
*H04W 48/16* (2009.01)
*H04W 72/04* (2009.01)
*H04W 4/08* (2009.01)

(52) U.S. Cl.
CPC ........... *H04W 72/005* (2013.01); *H04W 4/06* (2013.01); *H04W 4/08* (2013.01); *H04W 48/16* (2013.01); *H04W 72/042* (2013.01)

(58) Field of Classification Search
None
See application file for complete search history.

(56) References Cited

U.S. PATENT DOCUMENTS

| | | | |
|---|---|---|---|
| 2011/0194477 A1* | 8/2011 | Damnjanovic | H04W 72/005 370/312 |
| 2013/0095838 A1* | 4/2013 | Uemura | H04W 36/30 455/443 |
| 2013/0215761 A1* | 8/2013 | Xu | H04W 24/08 370/241 |

(Continued)

FOREIGN PATENT DOCUMENTS

JP   2013-502178 A   1/2013

OTHER PUBLICATIONS

"LTE; Evolved Universal Terrestrial Radio Access (E-UTRA); Radio Resource Control (RRC); Protocol specification", 3GPP TS 36.331 version 11.5.0 Release 11, Sep. 2013, pp. 01-350.

(Continued)

*Primary Examiner* — Kodzovi Acolatse
(74) *Attorney, Agent, or Firm* — Oblon, McClelland, Maier & Neustadt, L.L.P.

(57) ABSTRACT

To enable multicast to a specific terminal group to be performed.
There is provided an apparatus including an acquisition unit configured to acquire channel configuration information indicating a configuration of a multicast channel disposed in an MBSFN subframe for a specific terminal group, and a control unit configured to notify the specific terminal group of the channel configuration information.

18 Claims, 38 Drawing Sheets

(56) References Cited

U.S. PATENT DOCUMENTS

| | | | |
|---|---|---|---|
| 2013/0250771 A1* | 9/2013 | Yu | H04W 76/023 370/241 |
| 2014/0003320 A1* | 1/2014 | Etemad | H04W 4/06 370/312 |
| 2014/0185455 A1* | 7/2014 | Balasubramanian | H04W 4/06 370/241 |
| 2014/0286222 A1* | 9/2014 | Yu | H04W 4/08 370/312 |
| 2014/0355493 A1* | 12/2014 | Niu | H04L 12/189 370/280 |
| 2016/0007319 A1* | 1/2016 | He | H04W 36/14 370/280 |
| 2016/0119762 A1* | 4/2016 | Zhu | H04W 72/042 370/312 |

OTHER PUBLICATIONS

"PDCCH/EPDCCH monitoring in MBSFN subframes used for PMCH", CATT, 3GPP, TSG RAN WG2 Meeting # 82, May 20-24, 2013, pp. 01-02.

"3rd Generation Partnership Project; Technical Specification Group Radio Access Network; Evolved Universal Terrestrial Radio Access Network (E-UTRAN); M2 Application Protocol (M2AP) (Release 11)", Jun. 2013, 12 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", Dec. 2013, 5 pages.

"3rd Generation Partnership Project; Technical Specification Group Radio Access Network; Evolved Universal Terrestrial Radio Access (E-UTRA); Radio Resource Control (RRC); Protocol specification (Release 12)", Dec. 2013, 4 pages.

ETSI, "LTE; Evolved Universal Terrestrial Radio Access (E-UTRA); Radio Resource Control (RRC); Protocol specification (3GPP TS 36.331 version 11.5.0 Release 11)", Technical Specification, Sep. 2013, 351 pages.

3rd Generation Partnership Project, "Technical Specification Group Radio Access Network; Evolved Universal Terrestrial Radio, Access Network (E-UTRAN); M2 Application Protocol (M2AP) (Release 11)", 3GPP TS 36.443 version 11.3.0, Technical Specification, Jun. 2013. 12 pages.

3rd Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP TS 36.300 Version 12.0.0, Technical Specification. Dec. 2013, 5 pages.

3rd Generation Partnership Project; "Technical Specification Group Radio Access Network; Evolved Universal Terrestrial Radio Access (E-UTRA); Radio Resource Control (RRC); Protocol specification (Release 12)", 3GPP TS 36.331 Version 12.0.0, Technical Specification, Dec. 2013, 4 pages.

3rd Generation Partnership Project, "PDCCH/EPDCCH monitoring in MBSFN subframes used for PMCH", Discussion and Decision, 3GPP TSG RAN WG2 Meeting #82, Fukuoka, Japan. R2-131773, May 20-24, 2013, 2 pages.

* cited by examiner

FIG. 9
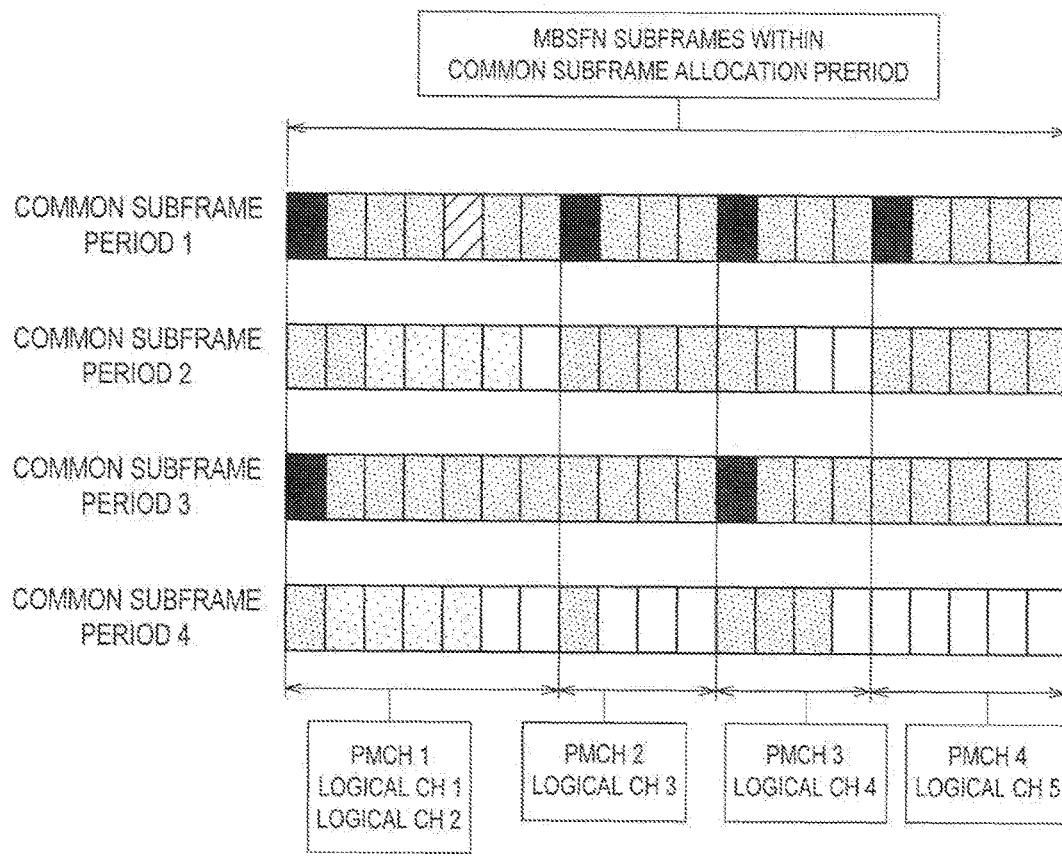
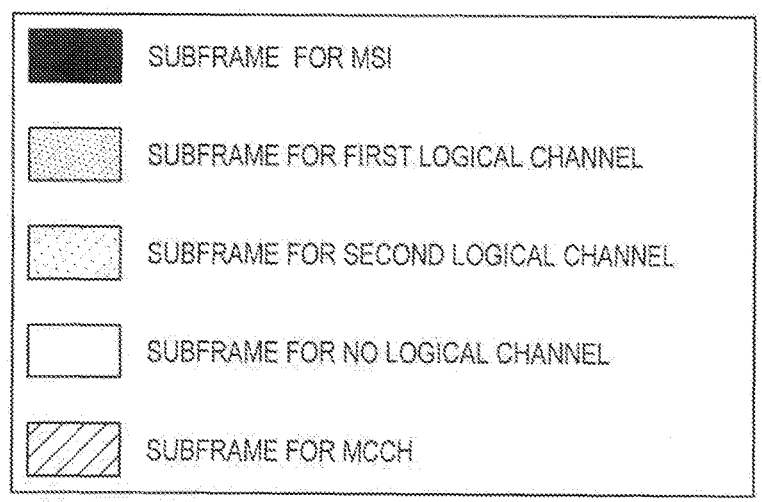

APPARATUS ENABLING MULTICAST TO A SPECIFIC TERMINAL GROUP

CROSS REFERENCE TO RELATED APPLICATIONS

This application is a U.S. National Phase of International Patent Application No. PCT/JP2014/079859 filed on Nov. 11, 2014, which claims priority benefit of Japanese Patent Application No. 2014-013643 filed in the Japan Patent Office on Jan. 28, 2014. Each of the above-referenced applications is hereby incorporated herein by reference in its entirety.

TECHNICAL FIELD

The present disclosure relates to an apparatus.

BACKGROUND ART

In cellular networks, multicast broadcast multimedia services (MBMS) has been put to practical use as a scheme of delivering the same content as broadcast content to a plurality of users. In particular, in Long Term Evolution (LTE), an MBMS over single frequency network (MBSFN) in which base stations of a plurality of cells are mutually synchronized to deliver the same content has been standardized. Through an MBSFN, received signals from a plurality of base stations are combined so that reception quality can be improved. In response to recent increases in traffic, technologies in which more efficient MBSFN management is expected have been proposed.

Technologies have been proposed.

For example, Non-Patent Literature 1 discloses a technology standardized for MBMS and MBSFN.

CITATION LIST

Non-Patent Literature

Non-Patent Literature 1:3GPP TS 36.331 V11. 5.0 (2013-09) LTE; Evolved Universal Terrestrial Radio Access (E-UTRA); Radio Resource Control (RRC); Protocol Specification

SUMMARY OF INVENTION

Technical Problem

However, in the technology disclosed in the foregoing Non-Patent Literature 1, multicast is assumed in all of the terminals located in an MBSFN area. Therefore, multicast to a specific terminal group may not be performed.

For example, in a closed subscriber group (CSG) cell such as a femtocell, the quality and/or kind of service to be provided to a terminal can be changed according to an access right of the terminal (a CSG UE or a non-CSG UE). However, multicast to the CSG may not be performed here either.

Accordingly, it is desirable to provide a structure enabling multicast to a specific terminal group to be performed.

Solution to Problem

According to the present disclosure, there is provided an apparatus including: an acquisition unit configured to acquire channel configuration information indicating a configuration of a multicast channel disposed in a multimedia broadcast multicast service (MBMS) over single frequency network (MBSFN) subframe for a specific terminal group; and a control unit configured to notify the specific terminal group of the channel configuration information.

According to the present disclosure, there is provided an apparatus including: an acquisition unit configured to acquire identification information for a specific terminal group; and a control unit configured to acquire channel configuration information which indicates a configuration of a multicast channel disposed in an MBSFN subframe for the specific terminal group using the identification information and of which a base station notifies the specific terminal group.

According to the present disclosure, there is provided an apparatus including a decision unit configured to decide MBSFN subframes for a specific terminal group.

Advantageous Effects of Invention

According to the present disclosure described above, multicast to a specific terminal group can be performed. Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 9 is an explanatory diagram illustrating examples of a PMCH and an MTCH mapped to the PMCH.

DESCRIPTION OF EMBODIMENT(S)

Hereinafter, preferred embodiments of the present disclosure will be described in detail with reference to the appended drawings. In this specification and the drawings, elements that have substantially the same function and structure are denoted with the same reference signs, and repeated explanation is omitted.

The description will be made in the following order.
1. Introduction
2. Schematic configuration of communication system
3. First Embodiment
   3.1. Configuration of control apparatus
   3.2. Configuration of small base station
   3.3. Configuration of terminal apparatus
   3.4. Flow of process
   3.5. Modification example
4. Second Embodiment
   4.1. Configuration of control apparatus
   4.2. Configuration of small base station
   4.3. Configuration of terminal apparatus
   4.4. Flow of process
   4.5. Modification example
5. Third Embodiment
   5.1. Overview
   5.2. Configuration of small base station
   5.3. Configuration of terminal apparatus
   5.4. Flow of process
   5.5. Modification example
6. Application examples
   6.1. Application example of control apparatus
   6.2. Application example of small base station
   6.3. Application example of terminal apparatus
7. Conclusion 1. Introduction First, technologies for MBMS and an MBSFN will be described with reference to FIGS. 1 to 12.

(MBSFN Area)

In an MBSFN, a plurality of base stations are mutually synchronized to deliver the same content. That is, in an MBSFN, a plurality of base stations transmit the same data with the same radio resources. Cells (that is, a plurality of cells) of the plurality of base stations are referred to as MBSFN areas. Each cell can belong to a maximum of 8 MBSFN areas. Hereinafter, a specific example of an MBSFN area will be described with reference to FIG. 1.

Figure 1:
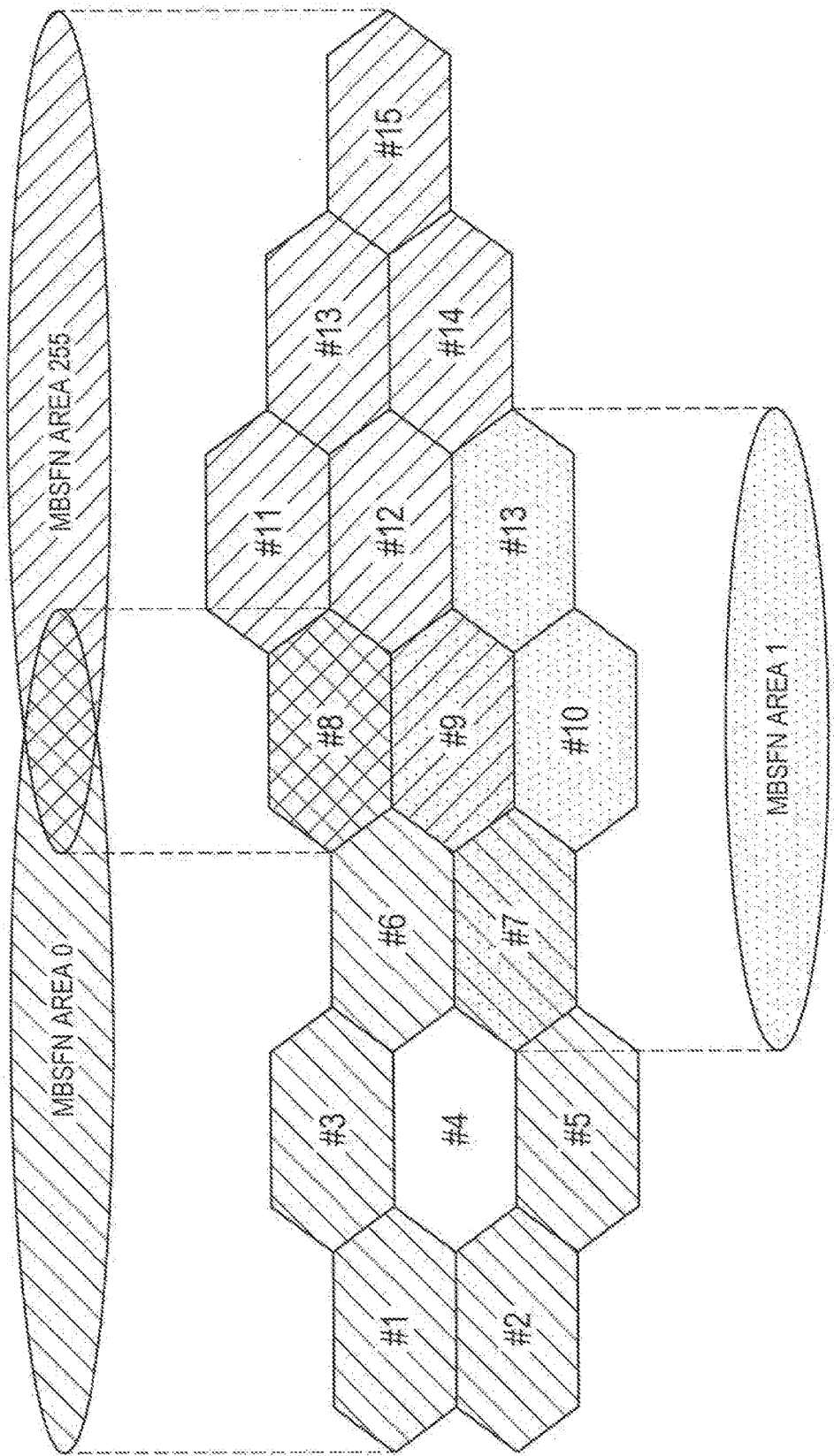
FIG. 1 is an explanatory diagram illustrating an example of an MBSFN area.

FIG. 1 is an explanatory diagram illustrating an example of an MBSFN area. Referring to FIG. 1, cells #1 to #15 are illustrated. In this example, an MBSFN area 0 includes cells #1 to #3 and #5 to #8, an MBSFN area 1 includes cells #7, #9, #10, and #13, and an MBSFN area 255 includes cells #8, #9, and #11 to #15. Cell #7 belongs to both of the MBSFN area 0 and the MBSFN area 1. Cell #8 belongs to both of the MBSFN area 0 and the MBSFN area 255. Cell #9 belongs to both of the MBSFN area 1 and the MBSFN area 255. Cell #4 belongs to neither the MBSFN area 1 nor the MBSFN area.

(Channels Related to MBMS)

Logical channels, transport channels, and physical channels are decided for the MBMS. Hereinafter, this point will be described with reference to FIG. 2.

Figure 2:
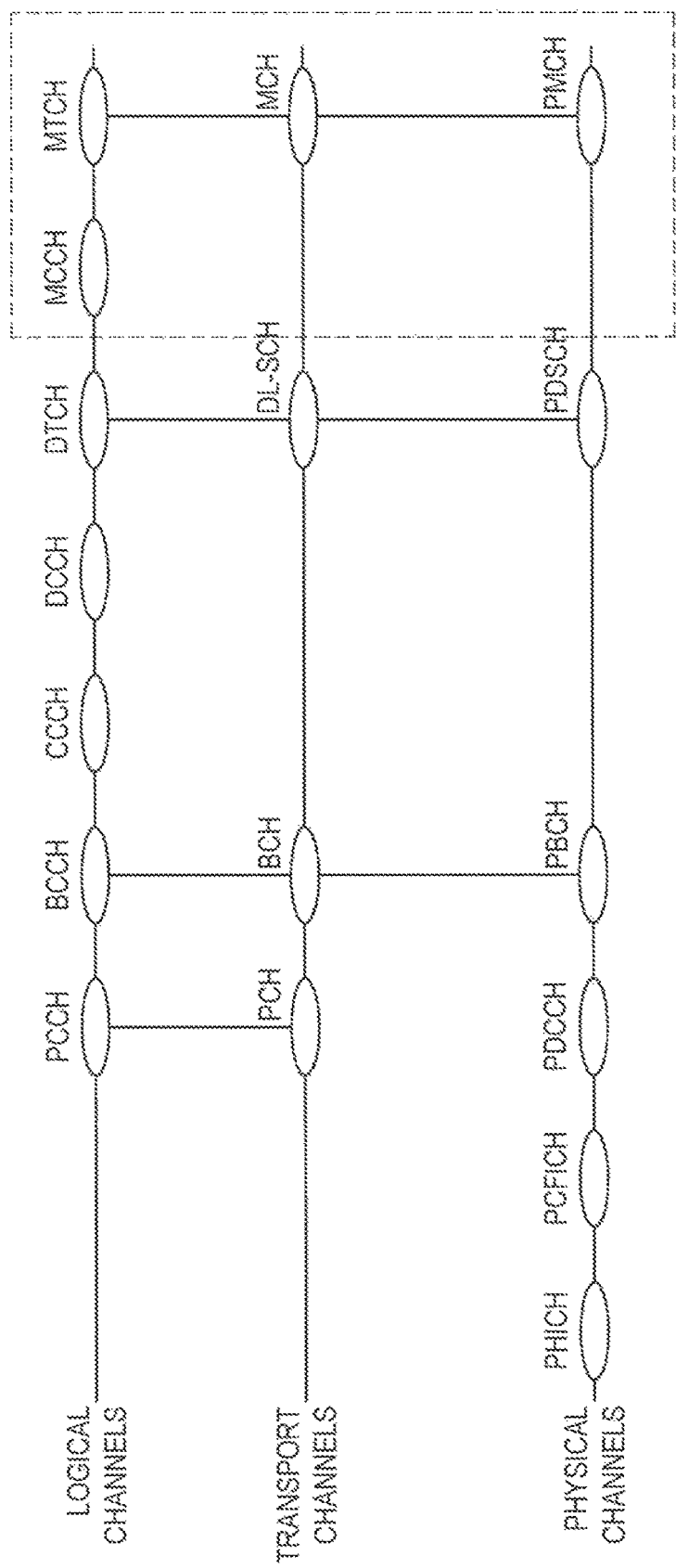
FIG. 2 is an explanatory diagram illustrating channels for an MBMS.

FIG. 2 is an explanatory diagram illustrating channels for an MBMS. Referring to FIG. 2, logical channels, transport channels, and physical channels decided in LTE are illustrated. In particular, a multicast control channel (MCCH) and a multicast traffic channel (MTCH) are decided as the logical channels for the MBMS. The MCCH is a channel for transmitting control information such as an MBSFN area configuration message and an MBM counting request message (MBMS). The MTCH is a channel for transmitting data of the MBMS. A physical multicast channel (PMCH) is decided as the physical channel for the MBMS. Both of the control information mapped to the MCCH and data mapped to the MTCH are mapped to the PMCH via a multicast channel (MCH) which is a transport channel.

(MBSFN Subframes)

The MBSFN is transmitted with MBSFN subframes. The MBSFN subframe is indicated by a radio frame allocation period, a radio frame allocation offset, and a subframe allocation. Hereinafter, specific examples of the MBSFN subframes will be described with reference to FIG. 3.

Figure 3:
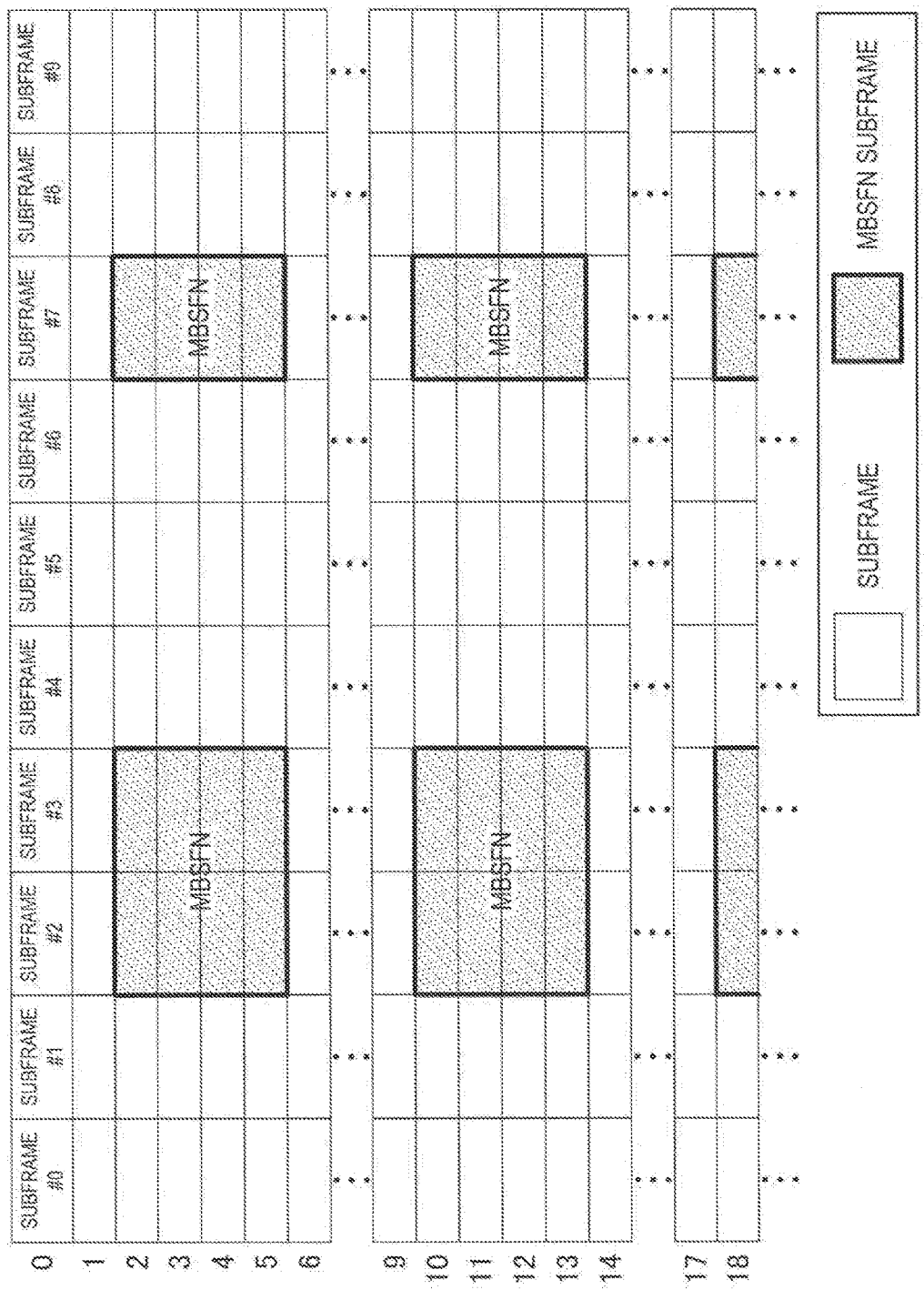
FIG. 3 is an explanatory diagram illustrating examples of MBSFN subframes.

FIG. 3 is an explanatory diagram illustrating examples of the MBSFN subframes. Referring to FIG. 3, subframes included in a radio frame of each system frame number (SFN) are illustrated. In this example, the radio frame allocation period is 8 and the radio frame allocation offset is 2. The subframe allocation is a 4 frame pattern (24 bits). Therefore, a radio frame of the SFN satisfying "SFN mod 8=2" (that is, the SFN of 2, 10, 18, or the like) and 3 radio frames continuously subsequent to the radio frame are radio frames for the MBSFN. In this example, frequency division duplexing (FDD) is adopted and the subframe allocation is "011010 011010 011010 011010." When the FDD is adopted, bits of the subframe allocation indicate subframes #1, #2, #3, #6, #7, and #8. Therefore, of the radio frames, subframes #2, #3, and #7 are MBSFN subframes.

Subframes with which system information and paging information are transmitted are not used as the MBSFN subframes. Thus, when the FDD is adopted, subframes #0, #4, #5, and #9 are not used as the MBSFN subframes. When time division duplexing (TDD) is adopted, subframes #0, #1, #2, #5, and #6 are not used as the MBSFN subframes.

For example, a terminal apparatus is notified of the MBSFN subframes with system information block (SIB) 2. Accordingly, the terminal apparatus can know an MBSFN area. The terminal apparatus is notified of the MBSFN subframes of each MBSFN area also with control information mapped to the MCCH (MBSFN area configuration message), as will be described below.

(Reference Signal)

The MBSFN subframe includes an MBSFN region and a non-MBSFN region. Since the PMCH is disposed in the MBSFN region, the control information mapped to the MCCH and the data mapped to the MTCH are transmitted particularly in the MBSFN regions.

The base stations of the cells belonging to an MBSFN area transmit the same signal particularly in the MBSFN regions of the MBSFN subframes. Therefore, such a base station does not transmit a cell-specific reference signal (CRS) in the MBSFN region. Instead, such a base station transmits an MBSFN reference signal (MBSFN-RS) which is a reference signal for the MBSFN. The MBSFN-RS is transmitted with the same radio resources (that is, the same resource elements) in all the cells belonging to an MBSFN area. Hereinafter, a specific example of this point will be described with reference to FIG. 4.

Figure 4:
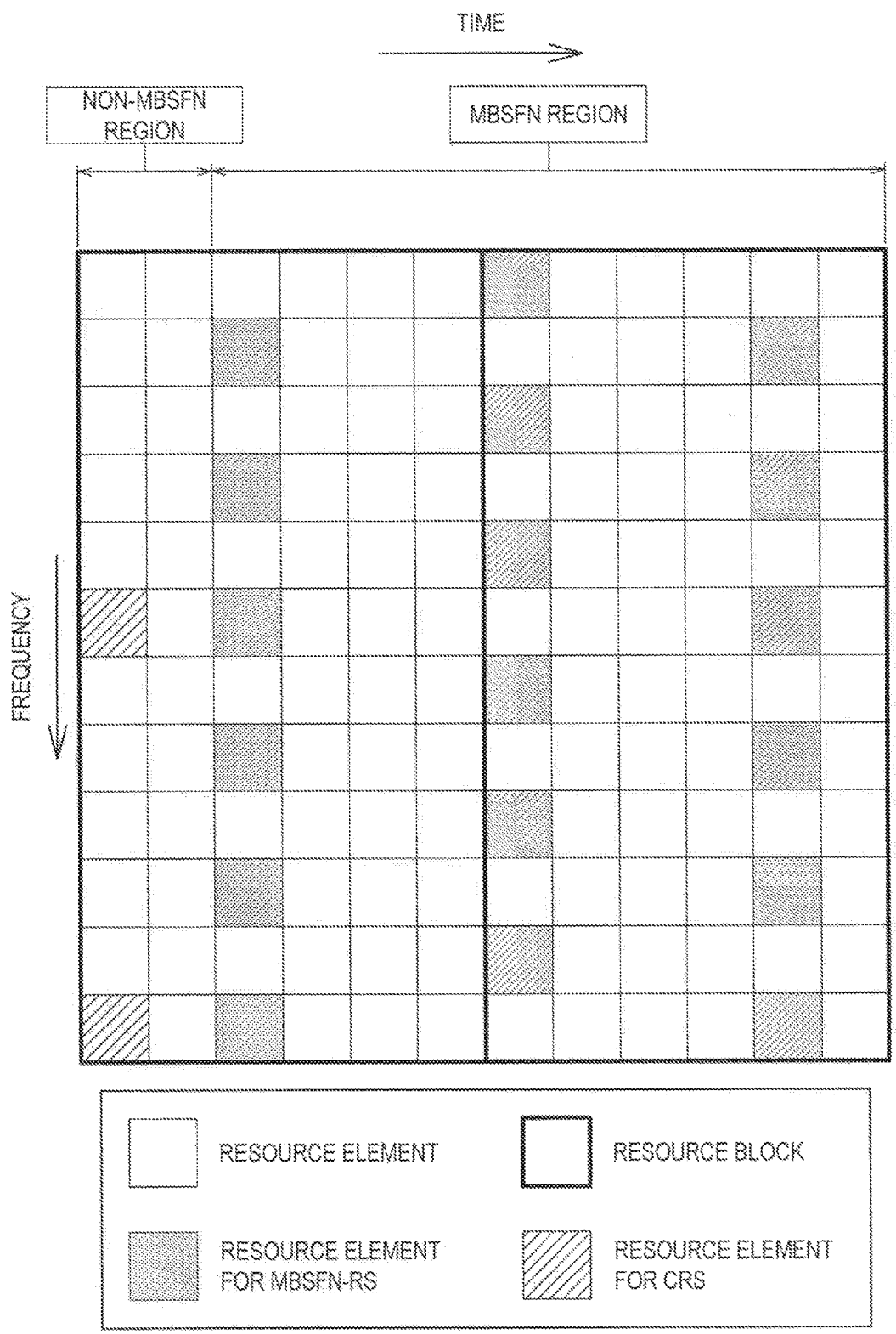
FIG. 4 is an explanatory diagram illustrating examples of signals transmitted with the MBSFN subframes.

FIG. 4 is an explanatory diagram illustrating examples of signals transmitted with the MBSFN subframes. Referring to FIG. 4, two resource blocks (RB) arranged in a time direction in the MBSFN subframes are illustrated. In this example, the MBSFN subframes include 12 OFDM symbols in the time direction. The MBSFN subframe includes a non-MBSFN region extending over the first two OFDM symbols among the 12 OFDM symbols and an MBSFN region continuing after the non-MBSFN region. In the non-MBSFN region, the CRS can be transmitted. On the other hand, in the MBSFN region, a common MBSFN-RS between cells belonging to the MBSFN area is transmitted. In the MBSFN region, the control information mapped to the MCCH and/or the data mapped to the MTCH are transmitted.

In the subframes other than the MBSFN subframes, the CRS is transmitted. The CRS is used, for example, to select a cell, estimate a channel, and detect synchronization. Hereinafter, a specific example of the CRS will be described with reference to FIGS. 5 and 6.

Figure 5:
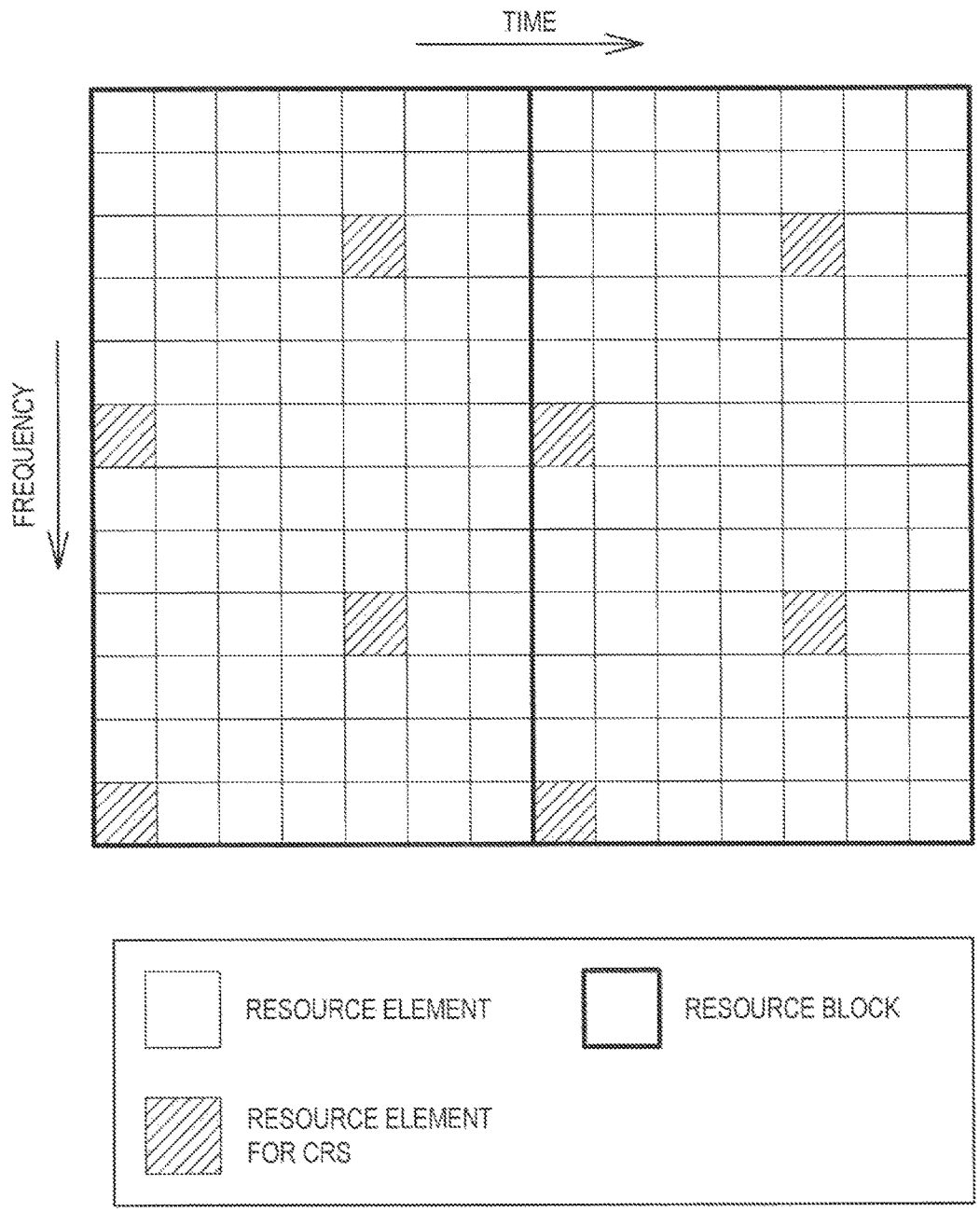
FIG. 5 is an explanatory diagram illustrating an example of a CRS transmitted in normal subframes.

FIG. 5 is an explanatory diagram illustrating an example of the CRS transmitted in normal subframes. Referring to FIG. 5, two resource blocks (RB) arranged in the normal subframes in the time direction are illustrated. The normal subframes include 14 OFDM symbols in the time direction. The CRS is transmitted with predetermined resource elements (RE) in each RB. The predetermined REs are set for each cell.

Figure 6:
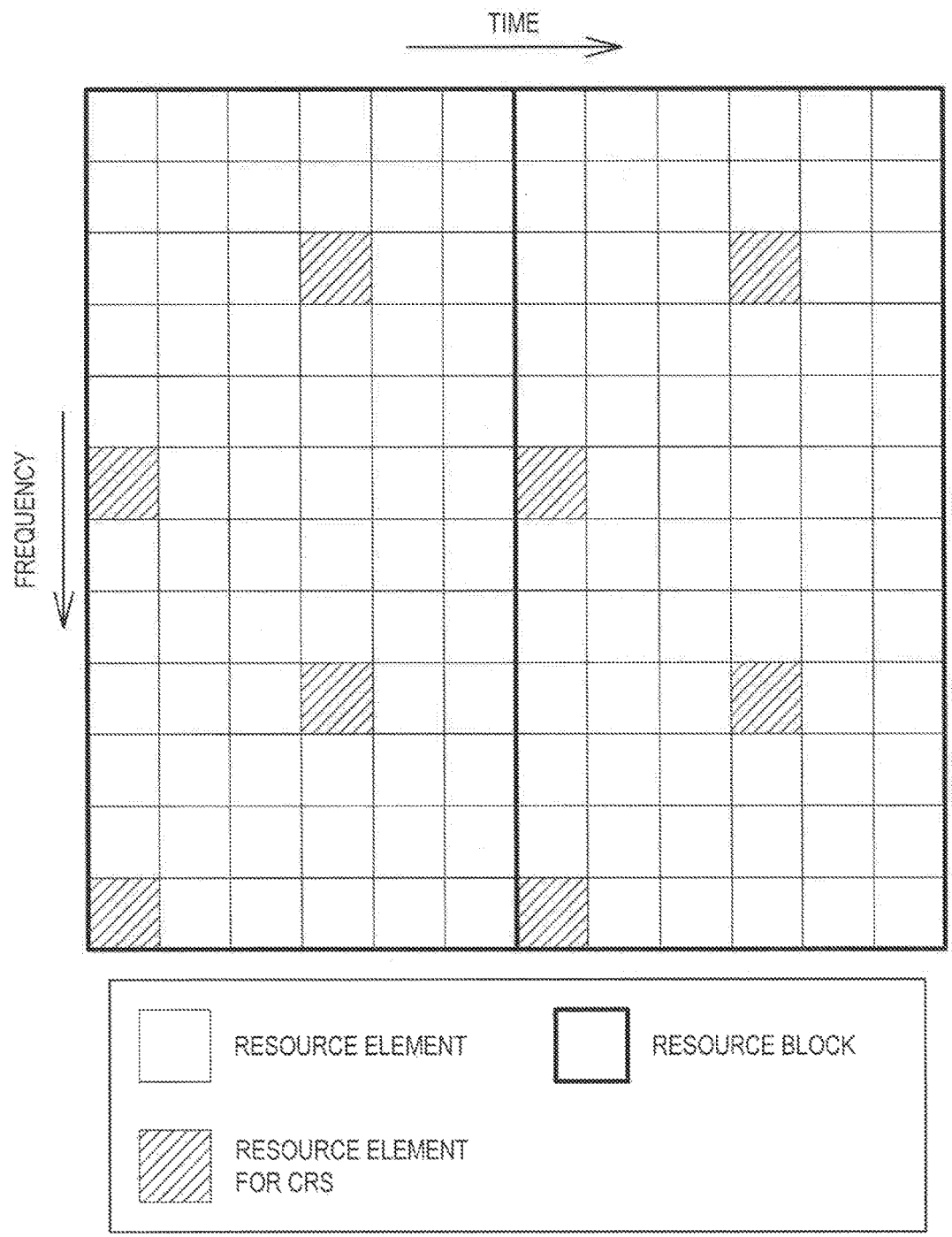
FIG. 6 is an explanatory diagram illustrating an example of the CRS transmitted in the subframes at the time of use of an extended cyclic prefix.

FIG. 6 is an explanatory diagram illustrating an example of the CRS transmitted in the subframes at the time of use of an extended cyclic prefix. Referring to FIG. 6, two resource blocks (RB) arranged in the time direction in the subframes at the time of use of the extended cyclic prefix are illustrated. In this case, the subframes include 12 OFDM symbols in the time direction. Even in this case, the CRS is transmitted in predetermined resource elements (RE) in each RB. The predetermined REs are set for each cell.

(MCCH, MTCH, and PMCH)

Relation Between MBSFN Area and MCCH

One MCCH corresponds to one MBSFN area. That is, the MCCH is present in each MBSFN area to which the cell belongs.

SIB 13

An SIB 13 indicates a subframe or the like in which the MCCH is disposed and the terminal apparatus is notified of the SIB 13. More specifically, the SIB 13 includes an MCCH repetition period, an MCCH offset, and subframe allocation information. Hereinafter, specific examples of the subframes in which the MCCH is disposed will be described with reference to FIG. 7.

Figure 7:
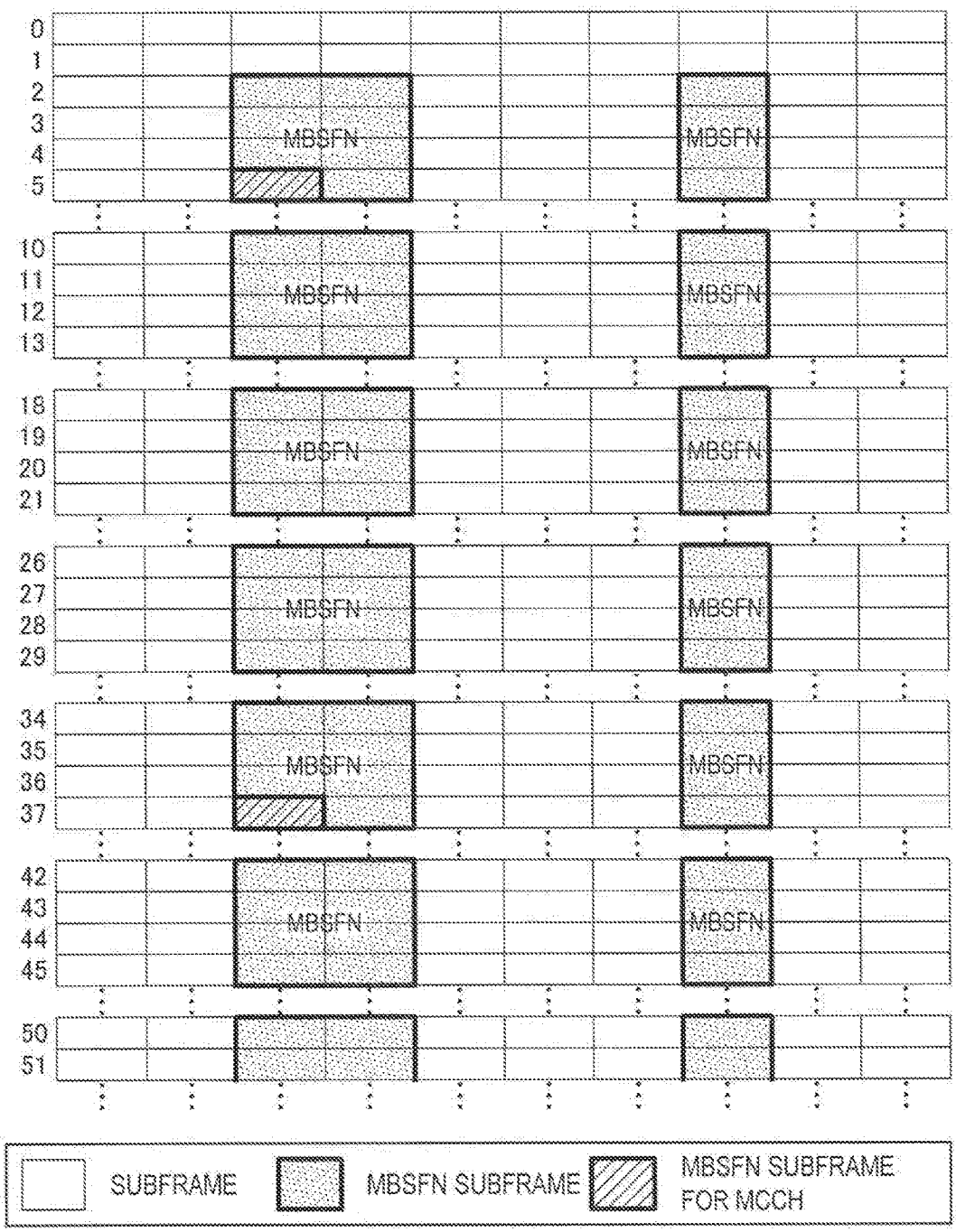
FIG. 7 is an explanatory diagram illustrating examples of subframes in which an MCCH is disposed.

FIG. 7 is an explanatory diagram illustrating examples of the subframes in which an MCCH is disposed. Referring to FIG. 7, the subframes included in a radio frame of each system frame number (SFN) are illustrated. The MBSFN subframes of this example are the same as the MBSFN subframes illustrated in FIG. 3. In this example, the MCCH repetition period is 32 and the MCCH offset is 5. Therefore, a radio frame of the SFN satisfying "SFN mod 32=5" (that is, the SFN of 5, 37, or the like) is a radio frame in which the MCCH is disposed. In this example, the subframe allocation information is "010000." When the FDD is adopted, bits of the subframe allocation indicate subframes #1, #2, #3, #6, #7, and #8. Therefore, of the radio frames, subframe #2 is a subframe in which the MCCH is disposed. In this way, the MCCH is periodically disposed in the MBSFN subframe.

The MCCH and the MTCH are multiplexed in a media access control (MAC) layer, but the terminal apparatus can demodulate the MCCH and the MTCH by multiplexing information of an MAC header.

MBSFN Area Configuration Message

The MBSFN area configuration message is mapped to the MCCH.

Common Subframe Allocation (CSA)

First, the MBSFN area configuration message includes a common subframe allocation (CSA) pattern list and a CSA period. The information indicates the MBSFN subframes of the MBSFN area. The CSA pattern list includes a radio frame allocation period, a radio frame allocation offset, and a subframe allocation. Hereinafter, specific examples of the MBSFN subframes indicated by the information will be described with reference to FIG. 8.

Figure 8:
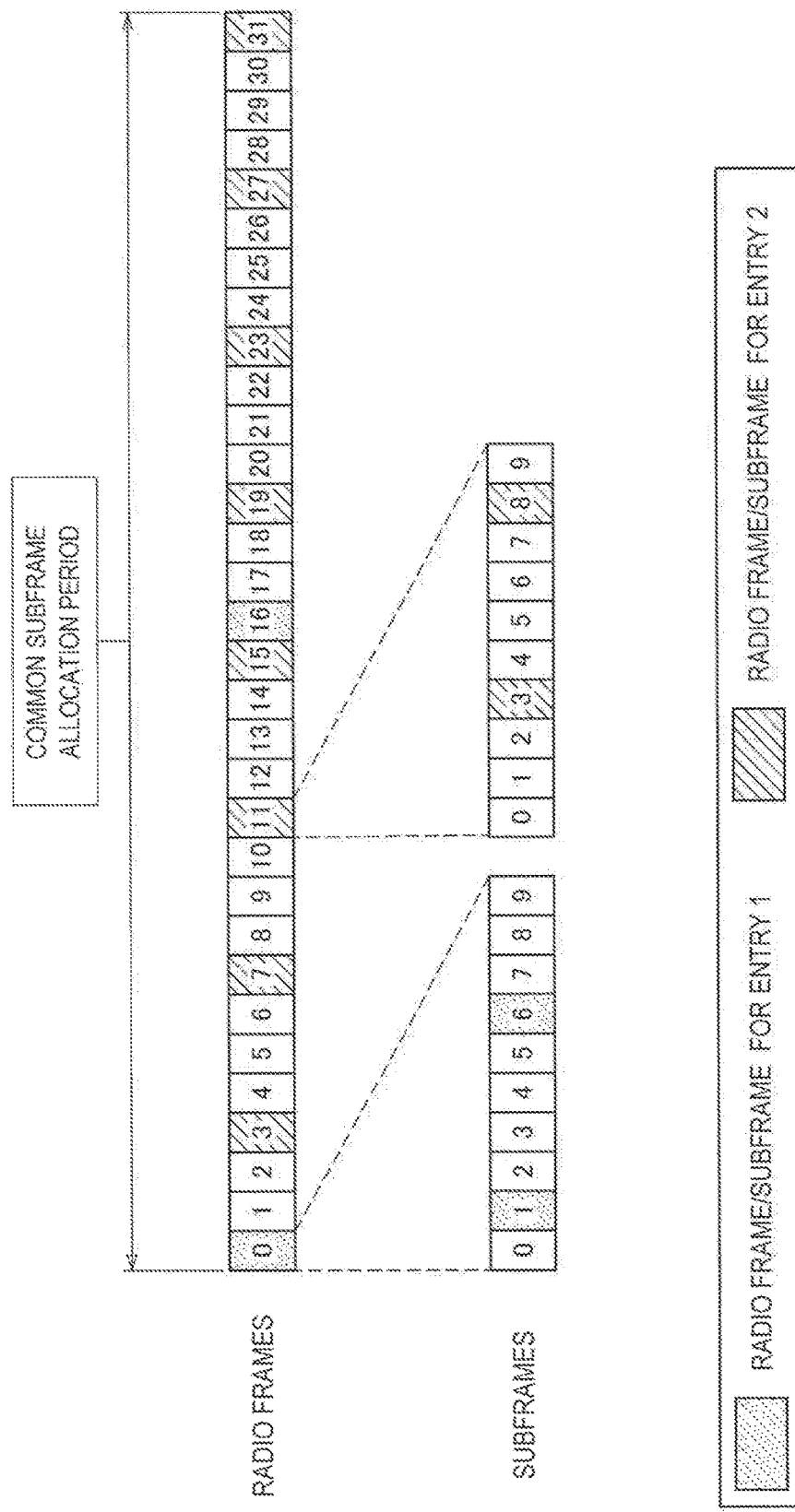
FIG. 8 is an explanatory diagram illustrating examples of MBSFN subframes.

FIG. 8 is an explanatory diagram illustrating examples of the MBSFN subframes. Referring to FIG. 8, radio frames extending over the CSA period are illustrated. In this example, the CSA period is 32 radio frames. In this example, the CSA pattern list includes entries 1 and 2. In the entry 1, the radio frame allocation period is 16, the radio frame allocation offset is 0, and the subframe allocation is "100100" of 1 frame pattern (6 bits). Thus, the MBSFN subframes of the entry 1 are subframes #1 and #6 in 2 radio frames in which the SFN is 0 and 16. In the entry 2, the radio frame allocation period is 4, the radio frame allocation offset is 3, and the subframe allocation is "001001" of 1 frame pattern (6 bits). Thus, the MBSFN subframes of the entry 2 are subframes #3 and #8 in 8 radio frames in which the SFN is 3, 7, 11, 15, 19, 23, 27, and 31. Thus, in this example, a total of 20 subframes in the CSA period are illustrated as the MBSFN subframes.

PMCH Information

Further, the MBSFN area configuration message includes a PMCH information list. The PMCH information list indicates the MBSFN subframes in which each PMCH is disposed and one or more MTCHs mapped to each PMCH. In the first subframe in the PMCH, MCH scheduling information (MSI) which is scheduling information of the MTCH mapped to the PMCH is transmitted. The PMCH information list also indicates a transmission period of the MSI. The period is referred to as an MCH scheduling period (MSP). Hereinafter, examples of the PMCH and the MTCH mapped to the PMCH will be described with reference to FIG. 9.

FIG. 9 is an explanatory diagram illustrating examples of the PMCH and an MTCH mapped to the PMCH. Referring to FIG. 9, four sets of 20 MBSFN subframes described with reference to FIG. 8 are illustrated. That is, 80 MBSFN subframes over four CSA periods (that is, CSA periods 1 to 4) are illustrated. In this example, of the 20 MBSFN subframes in the CSA periods (32 radio frames), the first to seventh subframes are allocated to a PMCH 1. The eighth to eleventh subframes are allocated to a PMCH 2, the twelfth to fifteenth subframes are allocated to a PMCH 3, and the sixteenth to twentieth subframes are allocated to a PMCH 4. Logical channels 1 and 2 (that is, MTCHs 1 and 2) are mapped to the PMCH 1. A logical channel 3 (that is, an MTCH 3) is mapped to the PMCH 2, a logical channel 4 (that is, an MTCH 4) is mapped to the PMCH 3, and a logical channel 5 (that is, an MTCH 5) is mapped to the PMCH 4. When attention is paid to the PMCH 1, the MSP of the PMCH 1 is 64 radio frames and the MSI is transmitted with the PMCH 1 every two CSA periods. During the CSA periods 1 and 2, the logical channel 1 (that is, the MTCH 1) is disposed in the first to ninth subframes among the MBSFN subframes allocated to the PMCH 1. The logical channel 2 (that is, the MTCH 2) is disposed in the tenth to the thirteenth subframes. No logical channel (MTCH) is disposed in the fourteenth subframe. During the CSA periods 3 and 4, the logical channel 1 is disposed in the first to eighth subframes among the MBSFN subframes allocated to the PMCH 1. The logical channel 2 is disposed in the ninth to the twelfth subframes. No logical channel (MTCH) is disposed in the thirteenth and fourteenth subframe. As illustrated in FIG. 9, the MCCH is also disposed in the MBSFN subframe.

(Notification of Change in MCCH)

When information regarding the MCCH is changed, all of the terminal apparatuses are notified of the change in the information regarding the MCCH with downlink control information (DCI) to be transmitted over a physical downlink control channel (PDCCH) in the non-MBSFN region of the MBSFN subframe. Specifically, the DCI includes an MCCH change notification indicator. The MCCH change notification indicator is an 8-bit bitmap corresponding to each MBSFN area. In this notification, radio network temporary identity (MBMS RNTI), that is, M-RNTI, is used.

First, the change in the MCCH is notified of for an MCCH modification period and the changed information is notified of for a subsequent MCCH modification period. Hereinafter, a specific example of this point will be described with reference to FIG. 10.

Figure 10:
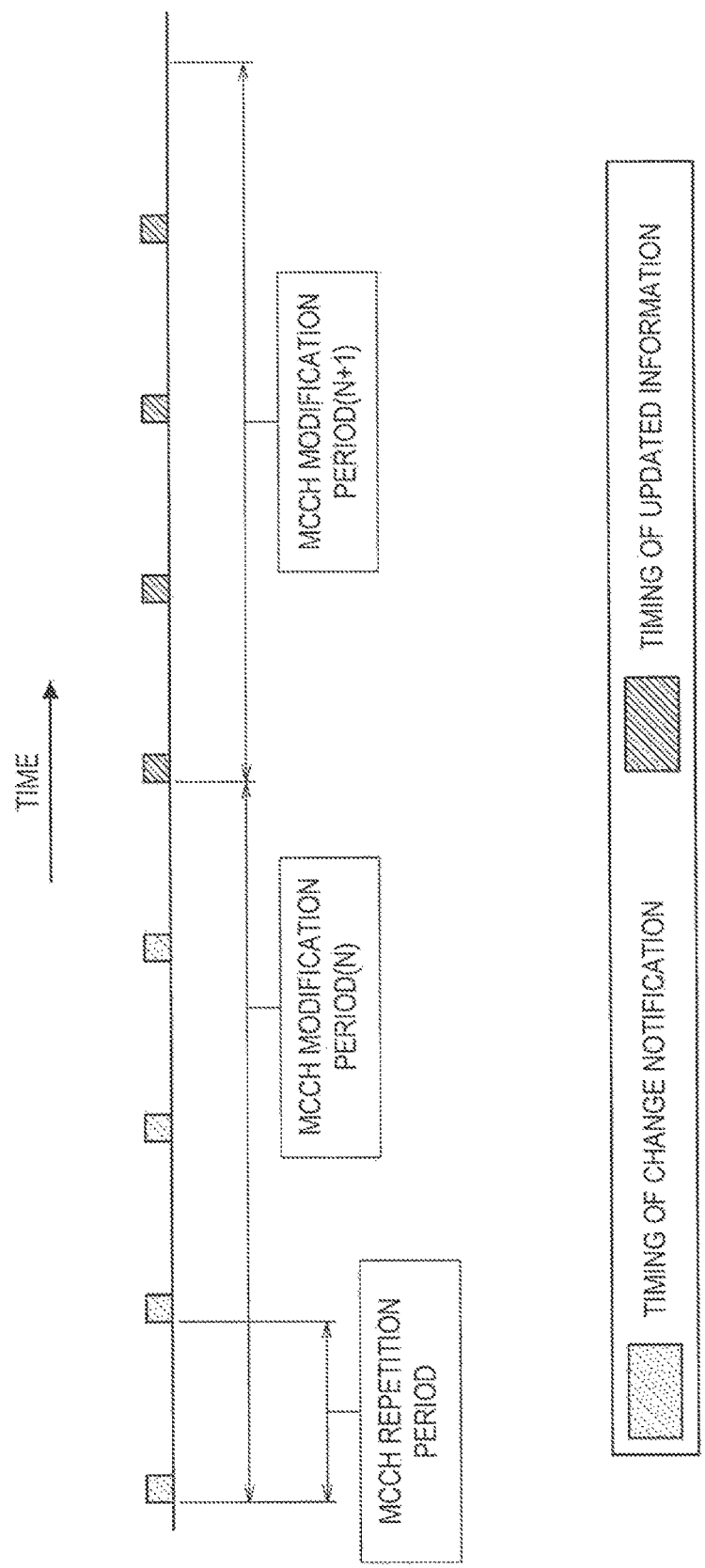
FIG. 10 is an explanatory diagram illustrating an example of a timing of notification of a change in information regarding the MCCH.

FIG. 10 is an explanatory diagram illustrating an example of a timing of notification of a change in information regarding the MCCH. Referring to FIG. 10, a first MCCH modification period (n) and a second MCCH modification period (n+1) continuing from the first MCCH modification period (n) are illustrated. In this way, the change in the information regarding the MCCH is notified of for the first MCCH modification period (n), and subsequently the changed information is notified of for the second MCCH modification period (n+1). To ensure mobility of the terminal apparatus, the changed information is transmitted not only in the first MCCH but also in subsequent MCCHs. The information regarding the MCCH is changed over a relatively long time.

(System Configuration of MBSFN)

Figure 11:
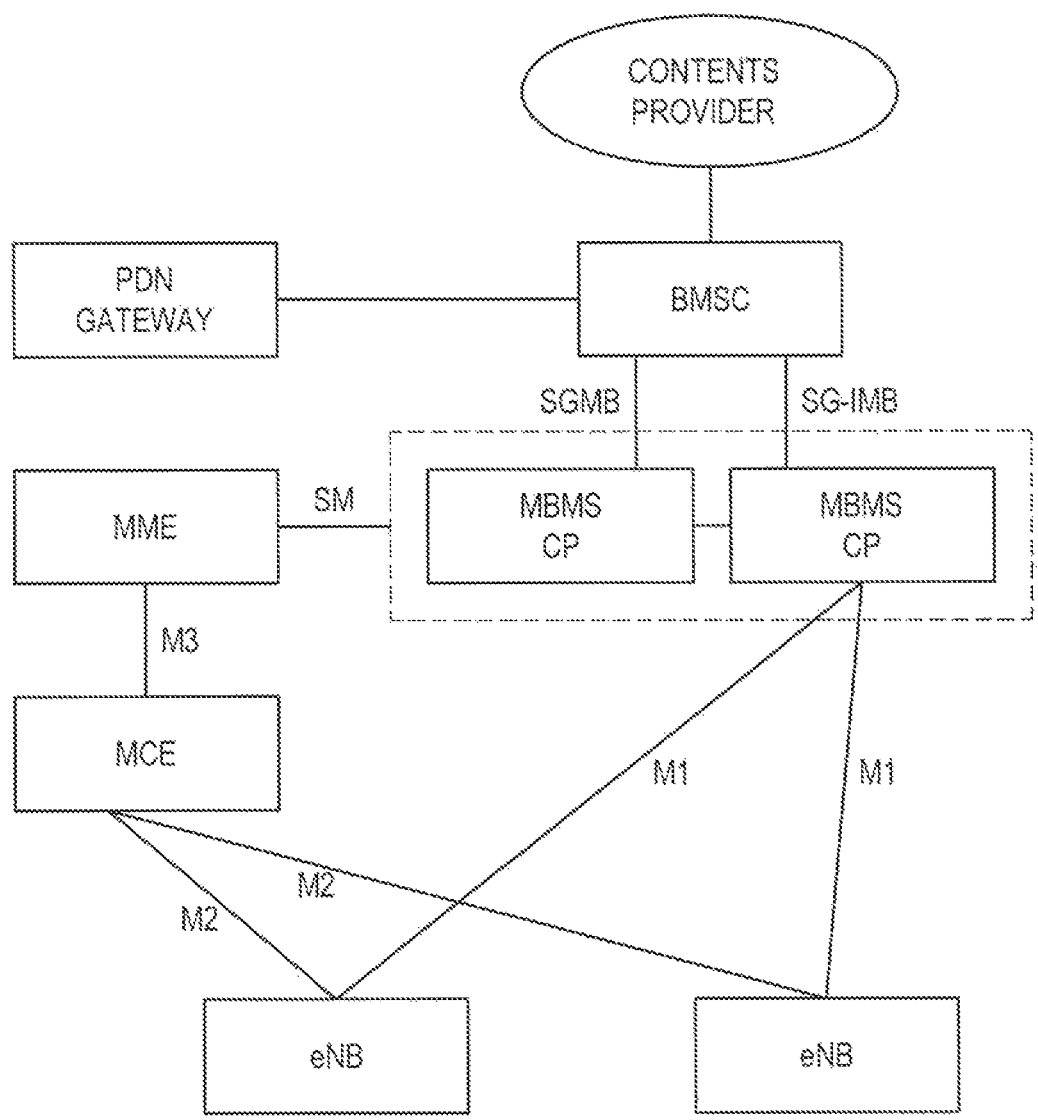
FIG. 11 is an explanatory diagram illustrating an example of the configuration of an LTE network supporting the MBSFN.

An example of the configuration of an LTE network supporting the MBSFN will be described with reference to FIG. 11. FIG. 11 is an explanatory diagram illustrating an example of the configuration of an LTE network supporting the MBSFN. Referring to FIG. 11, the LTE network includes a multi-cell/multicast coordinate entity (MCE), a broadcast/multicast service center (BM-SC), an MBMS gateway (GW), and a mobility management entity (MME). Such nodes are logical nodes. The MCE causes an evolved Node B (eNB) of a cell belonging to the MBSNF area to transmit the same data with the same radio resources. Specifically, for example, the MCE performs scheduling related to the MBSNF in the MBSNF area. The BM-SC performs data flow control in a core network, authentication, charging, and the like of a contents provider. The MBMS-GW performs transmission of multicast IP packets from the BM-SC to the eNB and a process on a session control signal via the MME. The MME performs a process on a non-access stratum (NAS).

The example in which one MCE corresponds to a plurality of eNBs has been described, but the MCE is not limited to the related example. For example, each eNB may include the MCE.

(Counting Procedure)

In the MBSFN, information regarding interest in an MBMS service is collected through an MBMS counting procedure. Hereinafter, the MBMS counting procedure will be described with reference to FIG. 12.

Figure 12:
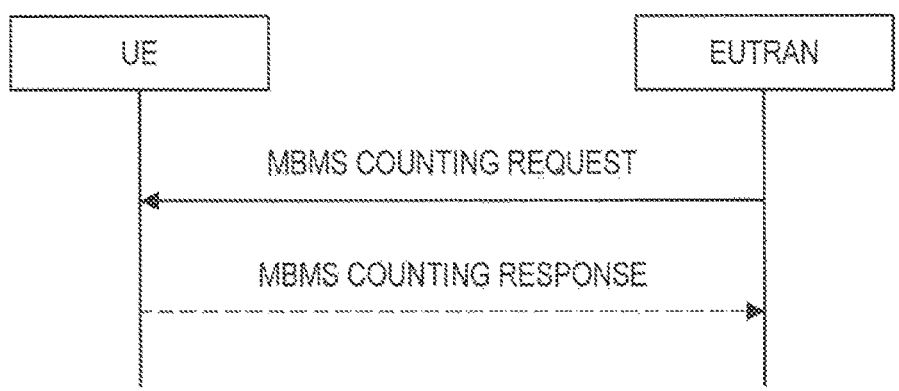
FIG. 12 is an explanatory diagram illustrating an example of an MBMS counting procedure.

FIG. 12 is an explanatory diagram illustrating an example of an MBMS counting procedure. Referring to FIG. 12, first, when the information regarding the MCCH is changed and the terminal apparatus enters the MBSFN area, the terminal apparatus receives an MBMS counting request message along with the MBSFN area configuration message. When the terminal apparatus is in an RRC connection mode and an MBMS service in which the terminal apparatus is interested is included in a list of an MBMS counting request, the terminal apparatus transmits an MBMS counting response message including an identifier of the MBMS service to a network. Accordingly, for each MBMS service, the number of terminal apparatuses which receive the MBMS service or are interested in the MBMS service can be counted. Therefore, starting and ending of the MBMS service can be controlled according to a counting result.

(Operation of Terminal)

The terminal apparatus receives the SIB 13 and specifies subframes in which the MCCH is disposed. Then, the terminal apparatus receives the MBSFN area configuration message as the information regarding the MCCH with the subframes and specifies the PMCH to which the MTCH of a desired MBMS session is mapped. Thereafter, the terminal apparatus receives the MSI of the PMCH to which the MTCH is mapped and specifies the subframes in which the MTCH is disposed. Then, the terminal apparatus receives data of the MTCH (that is, data of the desired MBMS session) with the subframes. According to such an operation, the terminal apparatus can receive the data with only necessary minimum subframes and can sleep with other subframes. Therefore, power consumption of the terminal apparatus is suppressed.

(Access Control of HeNB)

In a CSG cell such as a femtocell, the quality and/or kind of service to be provided to a terminal can be changed according to an access right of the terminal (a CSG UE or a non-CSG UE).

A home eNB (HeNB) can operate in an open access mode in which access control is not performed in addition to a closed access mode in which only a CSG UE performs access to a cell. Further, the HeNB can also operate in a hybrid access mode in which a non-CSG UE and a CSG UE are distinguished although a non-CSG UE can also perform access to a cell.

2. Schematic Configuration of Communication System

Figure 13:
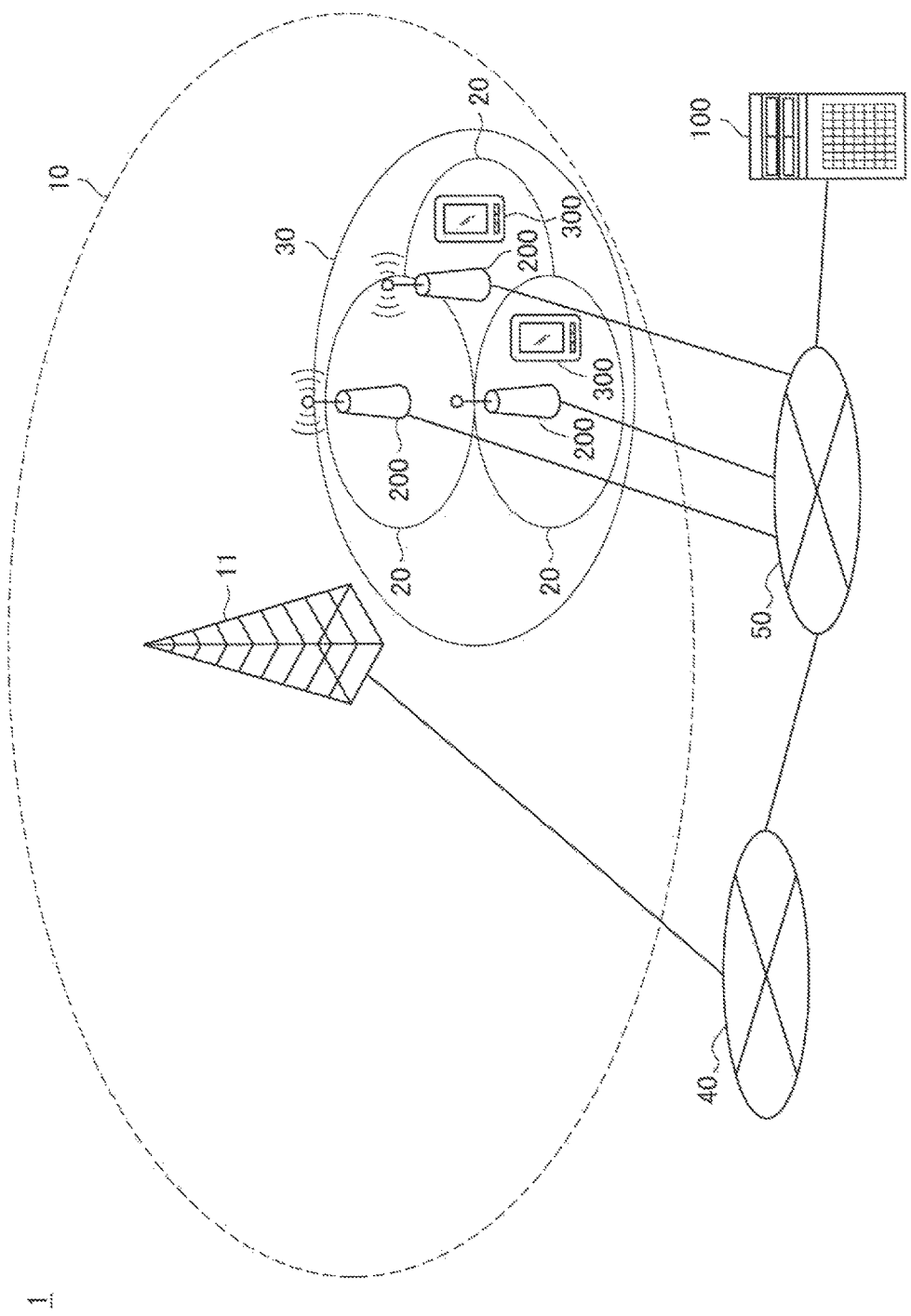
FIG. 13 is an explanatory diagram illustrating an example of a schematic configuration of a communication system according to an embodiment of the present disclosure.

Next, a schematic configuration of a communication system 1 according to an embodiment of the present disclosure will be described with reference to FIG. 13. FIG. 13 is an explanatory diagram illustrating an example of a schematic configuration of the communication system 1 according to the embodiment. Referring to FIG. 13, the communication system 1 includes a macro base station 11, a control apparatus 100, small base stations 200, and terminal apparatuses 300. The communication system 1 is, for example, a system that conforms to LTE, LTE-Advanced, or a communication standard equivalent thereto.

The macro base station 11 performs radio communication with a terminal apparatus located in a macro cell 10. The macro base station 11 is connected to a core network 40.

The small base station 200 performs radio communication with a terminal apparatus located in a small cell 20. For example, the small cell 20 partially or entirely overlaps the macro cell 10. The plurality of small cells 20 belong to an identical MBSNF area 30. In the MBSNF area 30, the plurality of small base stations 200 transmits the same signal with the same radio resources in the MBSNF subframes. For example, the small cells 20 are femtocells and the small base stations 200 are connected to the Internet 50.

The control apparatus 100 operates as an MCE in the plurality of small base stations 200. For example, the control apparatus 100 also operates as an MBMS-GW. For example, the control apparatus 100 is connected to the Internet 50 and communicates with the small base stations 200 via the Internet 50. The control apparatus 100 can communicate with a core network node (for example, an MME) located in the core network 40 and/or the macro base station 11 via the Internet 50.

The terminal apparatus 300 performs radio communication with the base station. For example, when the terminal apparatus 300 is located in the macro cell 10, the terminal apparatus 300 performs radio communication with the macro base station 11. When the terminal apparatus 300 is located in the small cell 20, the terminal apparatus 300 performs radio communication with the small base station 200.

The schematic configuration of the communication system 1 according to the embodiment of the present disclosure has been described. According to the embodiment of the present disclosure, the small base station 200 notifies a specific terminal group of channel configuration information indicating the configuration of multicast channels disposed in the MBSFN subframes for the specific terminal group. Accordingly, for example, multicast to a specific terminal group can be performed. The terminal apparatus 300 belongs to the specific terminal group. For example, the specific terminal group is a CSG.

3. First Embodiment

Next, a first embodiment of the present disclosure will be described with reference to FIGS. 14 to 26. As described above, according to the embodiment of the present disclosure, the small base station 200 notifies a specific terminal group of the channel configuration information indicating the configuration of multicast channels disposed in the MBSFN subframes for the specific terminal group. In particular, in the first embodiment, the multicast channel is the MCCH. That is, according to the first embodiment, the small base station 200 notifies the specific terminal group of channel configuration information indicating the configuration of the MCCHs disposed in the MBSNF subframes for the specific terminal group.

3.1. Configuration of Control Apparatus

Figure 14:
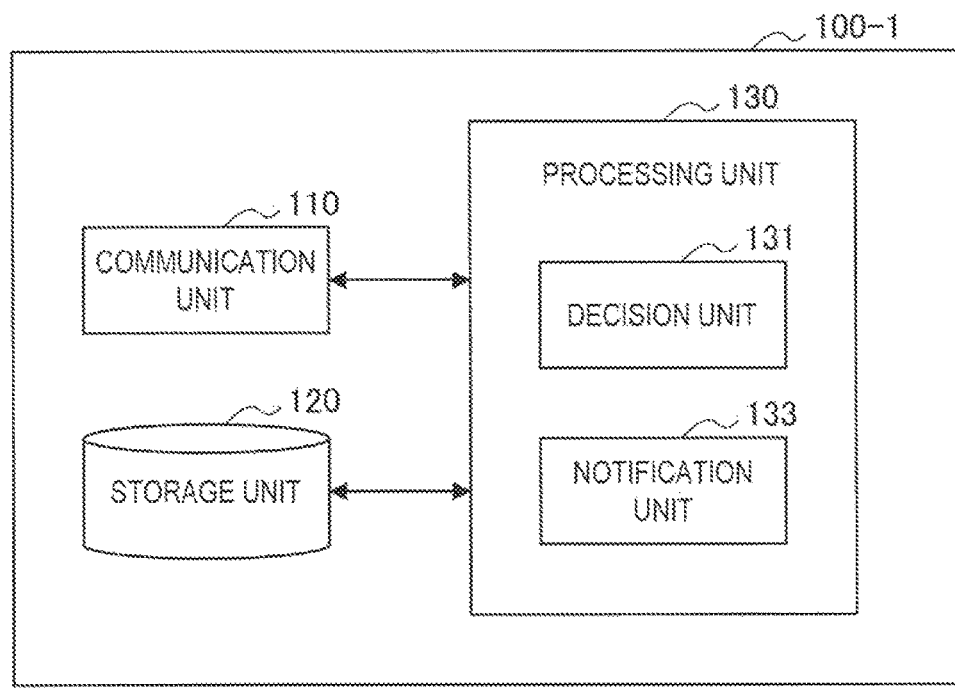
FIG. 14 is a block diagram illustrating an example of the configuration of a control apparatus according to a first embodiment.

First, the configuration of a control apparatus 100-1 according to the first embodiment will be described with reference to FIGS. 14 to 17. FIG. 14 is a block diagram illustrating an example of the configuration of the control apparatus 100-1 according to the first embodiment. Referring to FIG. 14, the control apparatus 100-1 includes a communication unit 110, a storage unit 120, and a processing unit 130.

(Communication Unit 110)

The communication unit 110 communicates with another apparatus. For example, the communication unit 110 communicates with a small base station 200-1. More specifically, for example, the communication unit 110 communicates with the small base station 200-1 via the Internet 50. The communication unit 110 can communicates with a core network node (for example, an MME) located in the core network and/or the macro base station 11 via the Internet 50.

(Storage Unit 120)

The storage unit 120 temporarily or permanently stores a program and data for an operation of the control apparatus 100-1.

(Processing Unit 130)

The processing unit 130 supplies various functions of the control apparatus 100-1. The processing unit 130 includes a decision unit 131 and a notification unit 133.

(Decision Unit 131)

Decision of MBSFN Subframes

For example, the decision unit 131 decides the MBSFN subframes.

Specifically, for example, the decision unit 131 decides the MBSFN subframes for a specific terminal group (hereinafter referred to as "group MBSFN subframes"). The specific terminal group is, for example, a CSG. For example, the decision unit 131 also decides normal MBSFN subframes (that is, the MBSFN subframes for all the terminal apparatuses). Hereinafter, a specific example of this point will be described with reference to FIG. 15.

Figure 15:
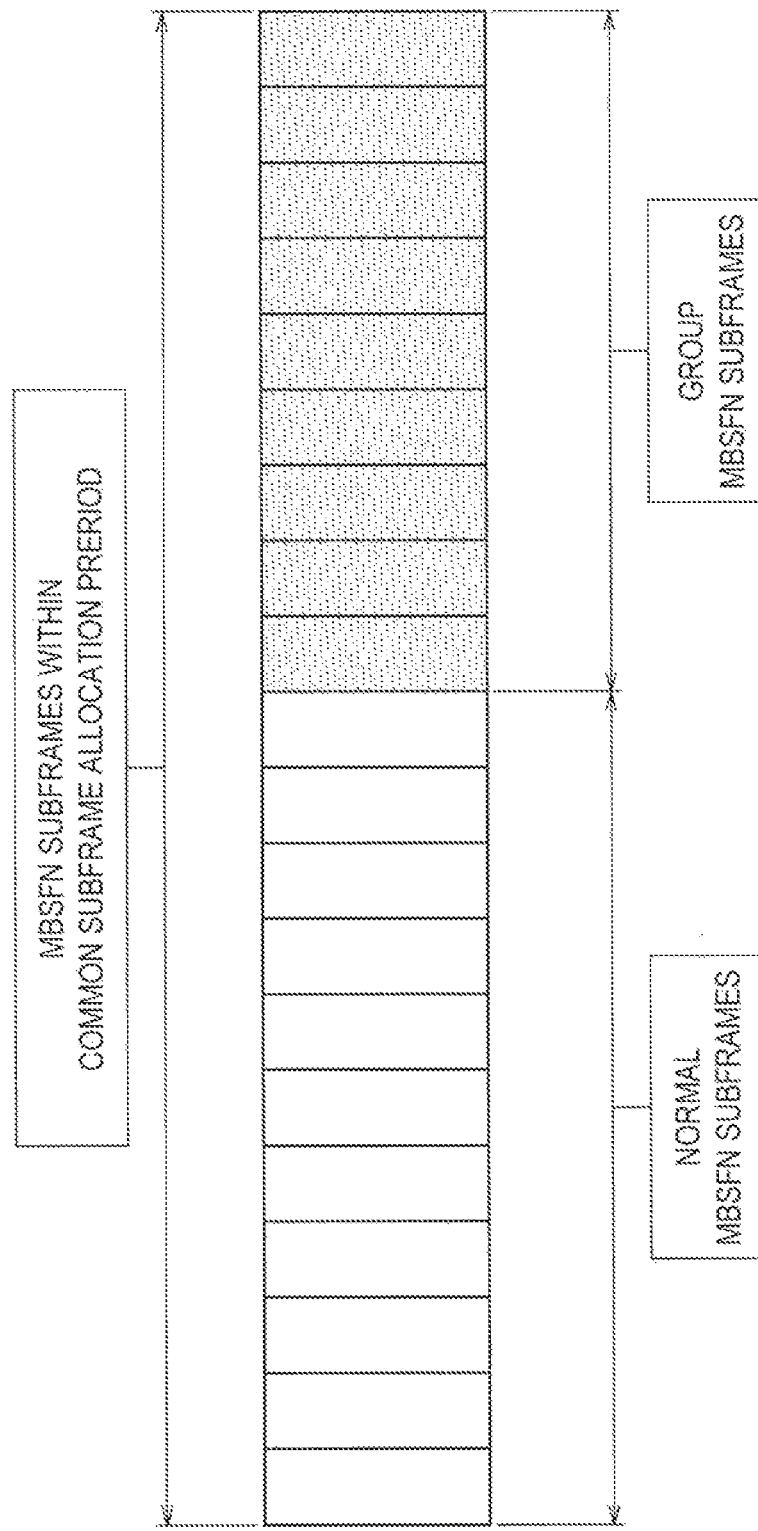
FIG. 15 is an explanatory diagram illustrating examples of group MBSFN subframes.

FIG. 15 is an explanatory diagram illustrating examples of the group MBSFN subframes. Referring to FIG. 15, 20 MBSFN subframes within a common subframe allocation (CSA) period are illustrated. For example, the decision unit 131 decides 20 subframes in 32 radio frames as MBSFN subframes by the scheme described with reference to FIG. 8. Then, the decision unit 131 decides 11 MBSFN subframes among the 20 MBSFN subframes as normal MBSFN subframes (that is, the MBSFN subframes for all the terminal apparatuses). The decision unit 131 decides the 9 remaining MBSFN subframes among the 20 MBSFN subframes as group MBSFN subframes.

The example in which the MBSFN subframes are decided, some of the MBSFN subframes are decided as the normal subframes, and the remaining subframes of the MBSFN subframes are decided as the group MBSFN subframes has been described, but a scheme of deciding the group MBSFN subframes is not limited to the related example. For example, the group MBSFN subframes may be decided independently from the normal MBSFN subframes. Specifically, for example, the decision unit 131 may decide a radio frame allocation period, a radio frame allocation offset, and a subframe allocation (and a CSA period) for the group MBSFN subframes. In this case, the decision unit 131 may further decide a radio frame allocation period, a radio frame allocation offset, and a subframe allocation (and a CSA period) for the normal MBSFN subframes. Alternatively, multicast to only the specific terminal group may be performed, and the decision unit 131 may not decide the normal MBSFN subframes and may decide only the group MBSFN subframes.

Decision of Disposition of Multicast Channels

The decision unit 131 decides disposition of the multicast channels in the MBSFN subframes.

For example, the decision unit 131 decides the disposition of the multicast channels in the group MBSFN subframes. For example, the decision unit 131 decides the disposition of the multicast channels in the normal MBSFN subframes.

PMCHs

For example, the multicast channel is the PMCH. That is, the decision unit 131 decides disposition of the PMCHs in the MBSFN subframes. In other words, the decision unit 131 allocates the MBSFN subframes to the PMCHs.

Specifically, for example, the decision unit 131 decides the disposition of the PMCHs in the group MBSFN subframes. For example, the decision unit 131 decides the disposition of the PMCHs in the normal MBSFN subframes. Hereinafter, a specific example of this point will be described with reference to FIG. 16.

Figure 16:
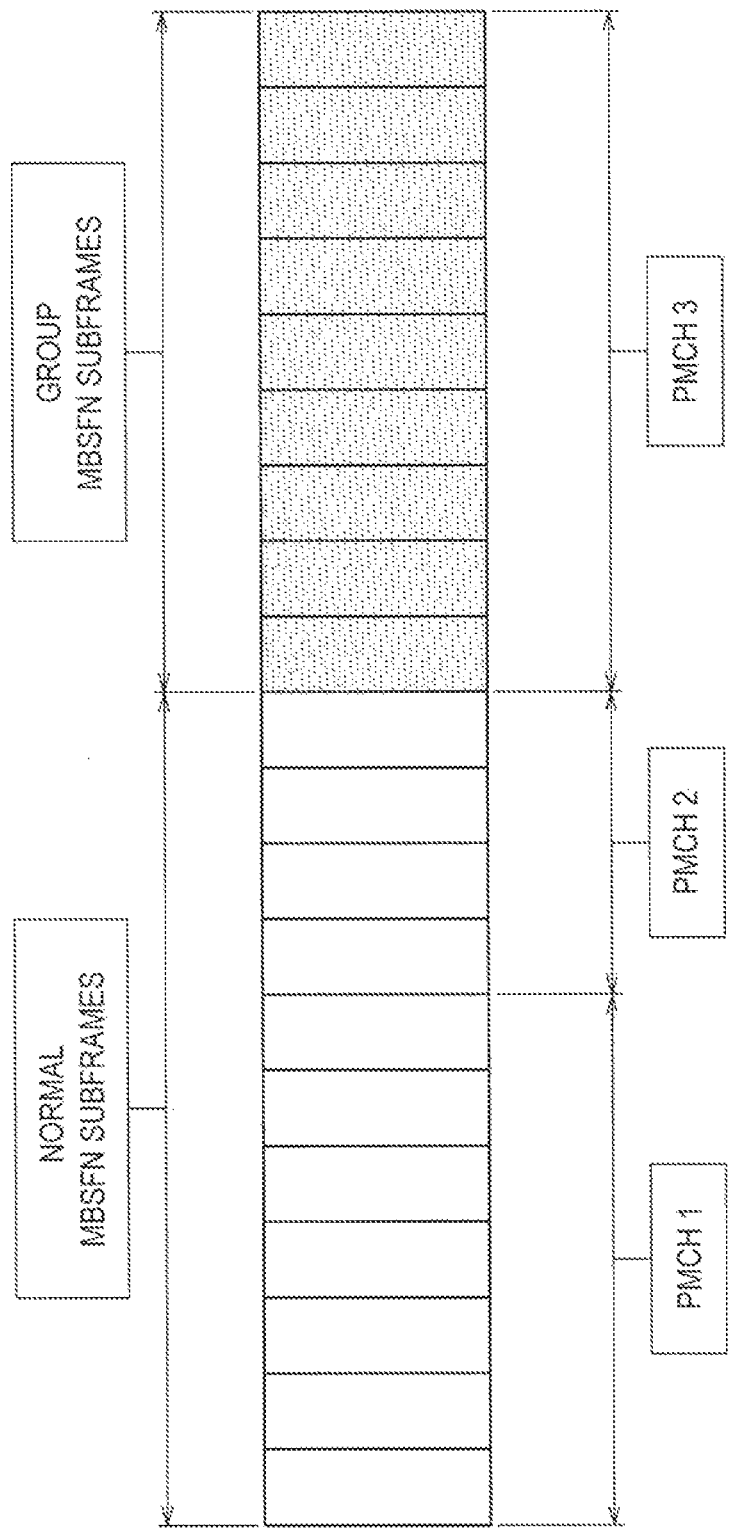
FIG. 16 is an explanatory diagram illustrating an example of disposition of PMCHs in the MBSFN subframes.

FIG. 16 is an explanatory diagram illustrating an example of disposition of a PMCH in the MBSFN subframes. Referring to FIG. 16, the 20 MBSFN subframes described with reference to FIG. 15 are illustrated. As described above, the 11 MBSFN subframes are the normal MBSFN subframes and the 9 MBSFN subframes are the group MBSFN subframes. In this example, the PMCH 1 is disposed in 7 MBSFN subframes among the normal MBSFN subframes and the PMCH 2 is disposed in 4 MBSFN subframes among the normal MBSFN subframes. In other words, the 7 MBSFN subframes are allocated to the PMCH 1 and the 4 MBSFN subframes are allocated to the PMCH 2. The PMCH 3 is disposed in all of the group MBSFN subframes. In other words, all of the group MBSFN subframes are allocated to the PMCH 3. The PMCH 1 and PMCH 2 are said to be normal PMCHs (the PMCHs for all the terminal apparatuses) and the PMCH 3 is said to be the PMCH for the specific terminal group.

MTCHs

For example, the multicast channel is the MTCH. That is, the decision unit 131 decides disposition of the MTCHs in the MBSFN subframes. In other words, the decision unit 131 allocates the MBSFN subframes to each MTCH.

Specifically, for example, the decision unit 131 decides the disposition of the MTCHs in the group MBSFN subframes. For example, the decision unit 131 decides the disposition of the MTCHs in the normal MBSFN subframes. Hereinafter, a specific example of this point will be described with reference to FIG. 17.

Figure 17:
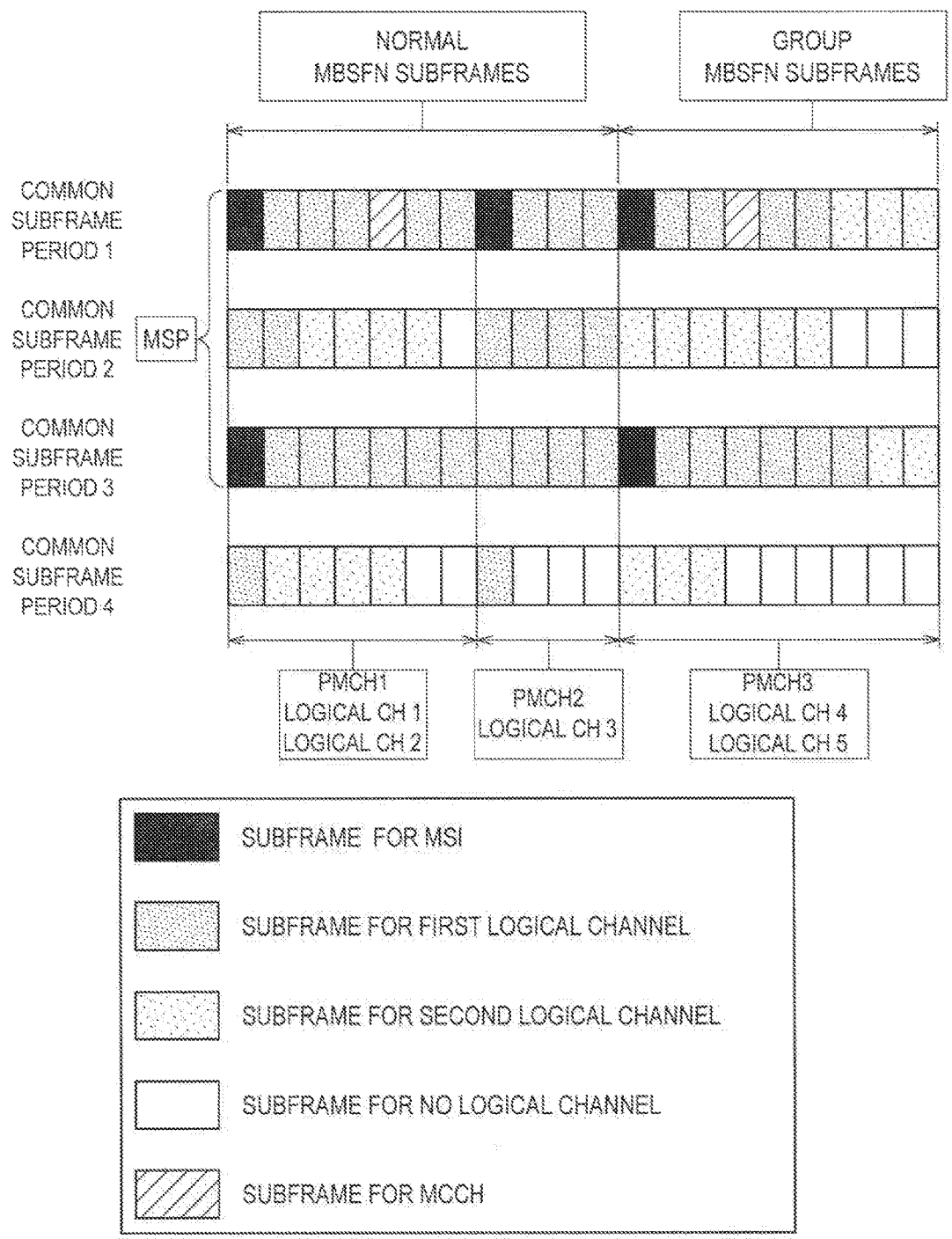
FIG. 17 is an explanatory diagram illustrating an example of disposition of MTCHs in the MBSFN subframes.

FIG. 17 is an explanatory diagram illustrating an example of disposition of the MTCHs in the MBSFN subframes. Referring to FIG. 17, 4 sets of the 20 MBSFN subframes described with reference to FIGS. 15 and 16 are illustrated. That is, 80 MBSFN subframes extending over 4 CSA periods (that is, CSA periods 1 to 4) are illustrated. As described with reference to FIG. 16, the PMCHs 1 and 2 are disposed in the normal MBSFN subframes and the PMCH 3 is disposed in the group MBSFN subframes. The logical channels 1 and 2 (that is, the MTCHs 1 and 2) are mapped to the PMCH 1 and the logical channel 3 (that is, the MTCH 3) is mapped to the PMCH 2. The logical channels 4 and 5 (that is, the MTCHs 4 and 5) are mapped to the PMCH 3 which is the PMCH for the specific terminal group. When attention is paid to the PMCH 3, the MSP of the PMCH 3 is 64 radio frames and the MSI is transmitted with the PMCH 3 for every two CSA periods (64 radio frames). During the CSA periods 1 and 2, the logical channel 4 is disposed in the first to sixth subframes among the group MBSFN subframes in which the PMCH 3 is disposed. The logical channel 5 is disposed in the seventh to the fifteenth subframes among the group MBSFN subframes. That is, the first to sixth subframes are allocated to the logical channel 4 and the seventh to fifteenth subframes are allocated to the logical channel 5. No logical channel (MTCH) is disposed in the sixteenth to eighteenth subframes. During the CSA periods 3 and 4, the logical channel 4 is disposed in the first to seventh subframes among the group MBSFN subframes in which the PMCH 3 is disposed. The logical channel 5 is disposed in the eighth to the twelfth subframes among the group MBSFN subframes. That is, the first to seventh subframes are allocated to the logical channel 4 and the eighth to twelfth subframes are allocated to the logical channel 5. No logical channel (MTCH) is disposed in the thirteenth to eighteenth subframes.

MCCHs

For example, the multicast channel is the MCCH. That is, the decision unit 131 decides disposition of the MCCHs in the MBSFN subframes.

Specifically, for example, the decision unit 131 decides disposition of the MCCHs in the group MBSFN subframes. For example, the decision unit 131 decides the disposition of the MCCHs in the normal MBSFN subframes.

(Notification Unit 133)

Notification of MBSFN Subframes

For example, the notification unit 133 notifies the small base station 200-1 of the MBSFN subframes. For example, the notification unit 133 notifies the small base station 200-1 of the group MBSFN subframes. For example, the notification unit 133 notifies the small base station 200-1 of the normal MBSFN subframes.

Specifically, for example, the notification unit 133 notifies the small base station 200-1 of the MBSFN subframes in an MBMS scheduling information message transmitted to the small base station 200-1. For example, the MBMS scheduling information message includes a radio frame allocation period, a radio frame allocation offset, a subframe allocation, and a CSA period. Accordingly, the MBSFN subframes are indicated within the CSA period. Further, for example, the MBMS scheduling information message further includes information for distinguishing the group MBSFN subframes and the normal MBSFN subframes included in the MBSFN subframes.

The MBMS scheduling information message may separately include the information (the radio frame allocation period, the radio frame allocation offset, the subframe allocation, and the CSA period) for the group MBSFN subframes and the information for the normal MBSFN subframes.

Notification of Disposition of Multicast Channels in MBSFN Subframes

For example, the notification unit 133 notifies the small base station 200-1 of the disposition of the multicast channels in the MBSFN subframes.

For example, the notification unit 133 notifies the small base station 200-1 of the disposition of the multicast channels in the group MBSFN subframes. For example, the notification unit 133 notifies the small base station 200-1 of the disposition of the multicast channels in the described normal MBSFN subframes.

Notification of Disposition of PMCHs

For example, the notification unit 133 notifies the small base station 200-1 of the disposition of the PMCHs in the MBSFN subframes. More specifically, for example, the notification unit 133 notifies the small base station 200-1 of the disposition of the PMCHs in the MBMS scheduling information message transmitted to the small base station 200-1. For example, the MBMS scheduling information message includes information indicating the final subframe among the subframes in which the PMCH is disposed for each PMCH.

For example, the notification unit 133 further notifies the small base station 200-1 of the MSP of each PMCH in the MBMS scheduling information message. For example, the MBMS scheduling information message includes the MSP of each PMCH.

Notification of Disposition of MTCHs

For example, the notification unit 133 notifies the small base station 200-1 of the disposition of the MTCHs in the MBSFN subframes. For example, the notification unit 133 notifies the small base station 200-1 of the PMCHs to which the MTCHs are mapped and the MBSFN subframes in which the MTCHs are disposed among the MBSFN subframes of the PMCH.

Specifically, for example, the notification unit 133 notifies the small base station 200-1 of the PMCHs to which the MTCHs are mapped in the MBMS scheduling information message. For example, the MBMS scheduling information message includes identification information (logical channel ID) regarding the MTCHs associated with the PMCHs.

For example, the notification unit 133 notifies the MBSFN subframes in which the MTCHs mapped to the PMCHs are disposed in the MBMS scheduling information message or another message. For example, the MBMS scheduling information message or the other message includes the final subframe among the subframes in which the MTCHs are disposed.

Notification of Disposition of MCCHs

For example, the notification unit 133 notifies the small base station 200-1 of the disposition of the MCCHs in the MBSFN subframes. For example, the notification unit 133 notifies the small base station 200-1 of the disposition of the MCCHs in the group MBSFN subframes (that is, the disposition of the MCCHs for the specific terminal group). For example, the notification unit 133 notifies the small base station 200-1 of the disposition of the MCCHs in the normal MBSFN subframes (that is, the configuration of the normal MCCHs).

More specifically, for example, the notification unit 133 notifies the small base station 200-1 of the disposition of the normal MCCHs and the disposition of the MCCHs for the specific terminal group in the MBMS scheduling information message or another message transmitted to the small base station 200-1. For example, the MBMS scheduling information message or the other message includes an MCCH repetition period, an MCCH offset, and subframe allocation information in regard to each of the normal MCCHs and the MCCHs for the specific terminal group.

As described above, the notification unit 133 notifies the small base station 200-1 of the MBSFN subframes and/or the multicast channels disposed in the MBSFN subframes. Of course, the notification unit 133 can notify the small base station 200-1 of other information without being limited to such information.

3.2. Configuration of Small Base Station

Figure 18:
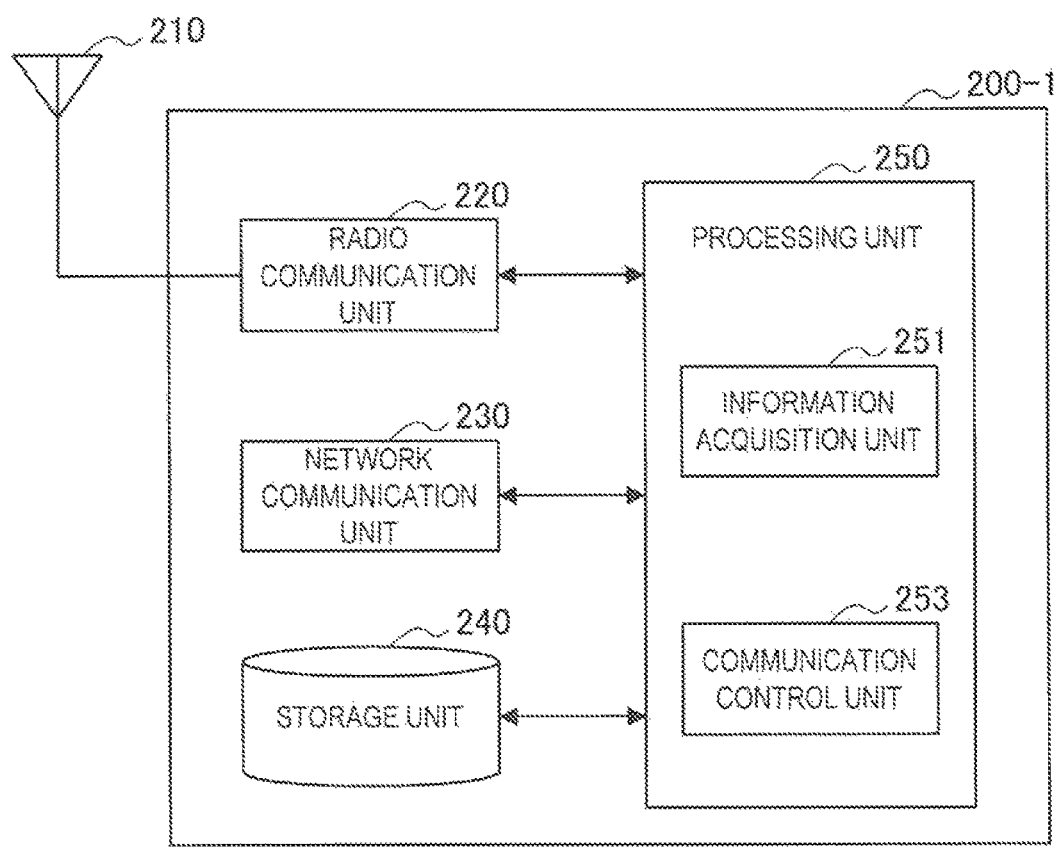
FIG. 18 is a block diagram illustrating an example of the configuration of a small base station according to the first embodiment.

Next, the configuration of the small base station 200-1 according to the first embodiment will be described with reference to FIGS. 18 to 22. FIG. 18 is a block diagram illustrating an example of the configuration of the small base station 200-1 according to the first embodiment. Referring to FIG. 18, the small base station 200-1 includes an antenna unit 210, a radio communication unit 220, a network communication unit 230, a storage unit 240, and a processing unit 250.

(Antenna Unit 210)

The antenna unit 210 radiates a signal output by the radio communication unit 220 as radio waves to a space. The antenna unit 210 converts space radio waves into a signal and outputs the signal to the radio communication unit 220.

(Radio Communication Unit 220)

The radio communication unit 220 performs radio communication. For example, the radio communication unit 220 transmits a downlink signal to the terminal apparatus located in the small cell 20 and receives an uplink signal from a terminal apparatus located in the small cell 20.

(Network Communication Unit 230)

The network communication unit 230 communicates with another node. For example, the network communication unit 230 communicates with a control apparatus 100-1. For example, the network communication unit 230 communicates with another small base station 200-1. For example, the network communication unit 230 communicates with a core network node located in the core network 40 and/or the macro base station 11. The network communication unit 230 communicates with another node via the Internet 50.

(Storage Unit 240)

The storage unit 240 temporarily or permanently stores a program and data for an operation of the small base station 200-1.

(Processing Unit 250)

The processing unit 250 supplies various functions of the small base station 200-1. The processing unit 250 includes an information acquisition unit 251 and a communication control unit 253.

(Information Acquisition Unit 251)

Acquisition of Group MCCH Configuration Information

The information acquisition unit 251 acquires channel configuration information indicating the configuration of the multicast channels disposed in the MBSFN subframes for the specific terminal group (that is, the group MBSFN subframes). As described above, the specific terminal group is, for example, the CSG.

In particular, in the first embodiment, the multicast channel is the MCCH. That is, the information acquisition unit 251 acquires channel configuration information indicating the configuration of the MCCHs disposed in the group MBSFN subframes (hereinafter referred to as "group MCCH configuration information").

The multicast channels (MCCHs) are disposed in the group MBSFN subframes, and thus can be said to be multicast channels (MCCHs) for a specific terminal group.

Specific Content

For example, the group MCCH configuration information includes information indicating the subframes in which the multicast channels (that is, the MCCHs) are disposed. More specifically, for example, the group MCCH configuration information includes an MCCH repetition period, an MCCH offset, and subframe allocation information.

Further, for example, the group MCCH configuration information includes, for example, an MCCH modification period and/or a signaling modulation and coding scheme (MCS).

The group MCCH configuration information may further include an MBSFN area ID and a non-MBSFN region length. The group MCCH configuration information may further include information regarding notification of change in the information regarding the MCCH.

In this way, the MCCH configuration information generally includes some or all of the information included in the SIB 13.

Acquisition of Group PMCH Configuration Information

For example, the information acquisition unit 251 further acquires group PMCH configuration information indicating the configuration of the PMCHs disposed in the group MBSFN subframes. As described above, the specific terminal group is, for example, the CSG.

The PMCHs are disposed in the group MBSFN subframes, and thus can be said to be the PMCHs for a specific terminal group.

Specific Content

For example, the group PMCH configuration information is an MBSFN area configuration message.

More specifically, for example, the group PMCH configuration information includes a common subframe allocation (CSA) pattern list and a CSA period. As one example, the CSA pattern list and the CSA period indicate the MBSFN subframes including the normal MBSFN subframes and the group MBSFN subframes. In this case, for example, the group PMCH configuration information further includes information for distinguishing the normal MBSFN subframes and the group MBSFN subframes included in the MBSFN subframes indicated by the CSA pattern list and the CSA period. As another example, the CSA pattern list and the CSA period may indicate the group MBSFN subframes.

For example, the group PMCH configuration information includes the PMCH information list. The PMCH information list indicates, for example, the group MBSFN subframes in which the PMCHs for the specific terminal group are disposed. That is, the PMCH information list includes, for example, subframe allocation end of each PMCH. Further, the PMCH information list also includes, for example, an MCH scheduling period (MSP) of each PMCH. The PMCH information list indicates, for example, one or more MTCHs mapped to the PMCHs for the specific terminal group (that is, one or more MTCHs for the specific terminal group). That is, the PMCH information list includes, for example, an MBMS session information list. The MBMS session information list includes a temporary mobile group identify (TMGI), a session ID, and a logical channel ID.

Acquisition of Normal MCCH Configuration Information

For example, the information acquisition unit 251 further acquires the normal MCCH configuration information indicating the configuration of the MCCHs disposed in the normal MBSFN subframes.

Specific Content

The normal MCCH configuration information includes, for example, the same information items as information items (the MCCH repetition period, the MCCH offset, and the subframe allocation information) included in the group MCCH configuration information.

More specifically, the normal MCCH configuration information is information included in a system information block (for example, an SIB). In this case, the information acquisition unit 251 acquires the system information block including the normal MCCH configuration information.

Acquisition of Normal PMCH Configuration Information

For example, the information acquisition unit 251 further acquires normal PMCH configuration information indicating the configuration of the PMCHs disposed in the normal MBSFN subframes.

Specific Content

For example, the normal PMCH configuration information is an MBSFN area configuration message.

More specifically, for example, the normal PMCH configuration information includes a common subframe allocation (CSA) pattern list and a CSA period. As one example, the CSA pattern list and the CSA period indicate the MBSFN subframes including the normal MBSFN subframes and the group MBSFN subframes. In this case, for example, the normal PMCH configuration information further includes information for distinguishing the normal MBSFN subframes and the group MBSFN subframes included in the MBSFN subframes indicated by the CSA pattern list and the CSA period. As another example, the CSA pattern list and the CSA period may indicate the normal MBSFN subframes.

For example, the normal PMCH configuration information includes the PMCH information list. The PMCH information list indicates, for example, the normal MBSFN subframes in which the PMCHs are disposed and one or more MTCHs mapped to the PMCHs.

(Communication Control Unit 253)

Notification of Group MCCH Configuration Information

The communication control unit 253 notifies the specific terminal group of the channel configuration information indicating the configuration of the multicast channels disposed in the group MBSFN subframes. In particular, in the first embodiment, the channel configuration information is the group MCCH configuration information. The communication control unit 253 notifies the specific terminal group of the group MCCH configuration information.

Notification by Use of Identification Information for Specific Terminal Group

For example, the communication control unit 253 notifies the specific terminal group of the group MCCH configuration information using identification information for the specific terminal group.

More specifically, for example, the identification information for the specific terminal group is a radio network temporary identifier (RNTI) for the specific terminal group (hereinafter referred to as a "group RNTI"). Accordingly, for example, only the terminal apparatuses belonging to the specific terminal groups can be notified of the group MCCH configuration information.

For example, the communication control unit 253 notifies the terminal apparatuses belonging to the specific terminal group of the identification information. Accordingly, the terminal apparatuses belonging to the specific terminal group can actually acquire the group MCCH configuration information.

Specific Notification Scheme

For example, the communication control unit 253 notifies the specific terminal group of the group MCCH configuration information through the DCI to be transmitted over the PDCCHs using the group RNTI. Accordingly, for example, the specific terminal group can be quickly notified of the group MCCH configuration information when it is necessary. The PDCCH may be a normal PDCCH or may be an enhanced physical downlink control channel (ePDCCH).

First Example

As a first example, the communication control unit 253 notifies the specific terminal group of the group MCCH configuration information in the DCI to be transmitted over the PDCCHs using the group RNTI.

More specifically, for example, the communication control unit 253 generates a DCI including cyclic redundancy check (CRC) bits scrambled by the group RNTI and the group MCCH configuration information (that is, the DCI for the specific terminal group). Then, the communication control unit 253 maps the DCI to the radio resources of the PDCCHs. As a result, the DCI is transmitted over the PDCCH. Accordingly, the terminal apparatuses belonging to the specific terminal group can acquire the group MCCH configuration information using the group RNTI. In particular, according to this scheme, for example, since the terminal apparatus can acquire the group MCCH configuration information from only the DCI, a burden on the terminal apparatuses can be reduced. Hereinafter, a specific example will be described with reference to FIGS. 19 and 20.

Figure 19:
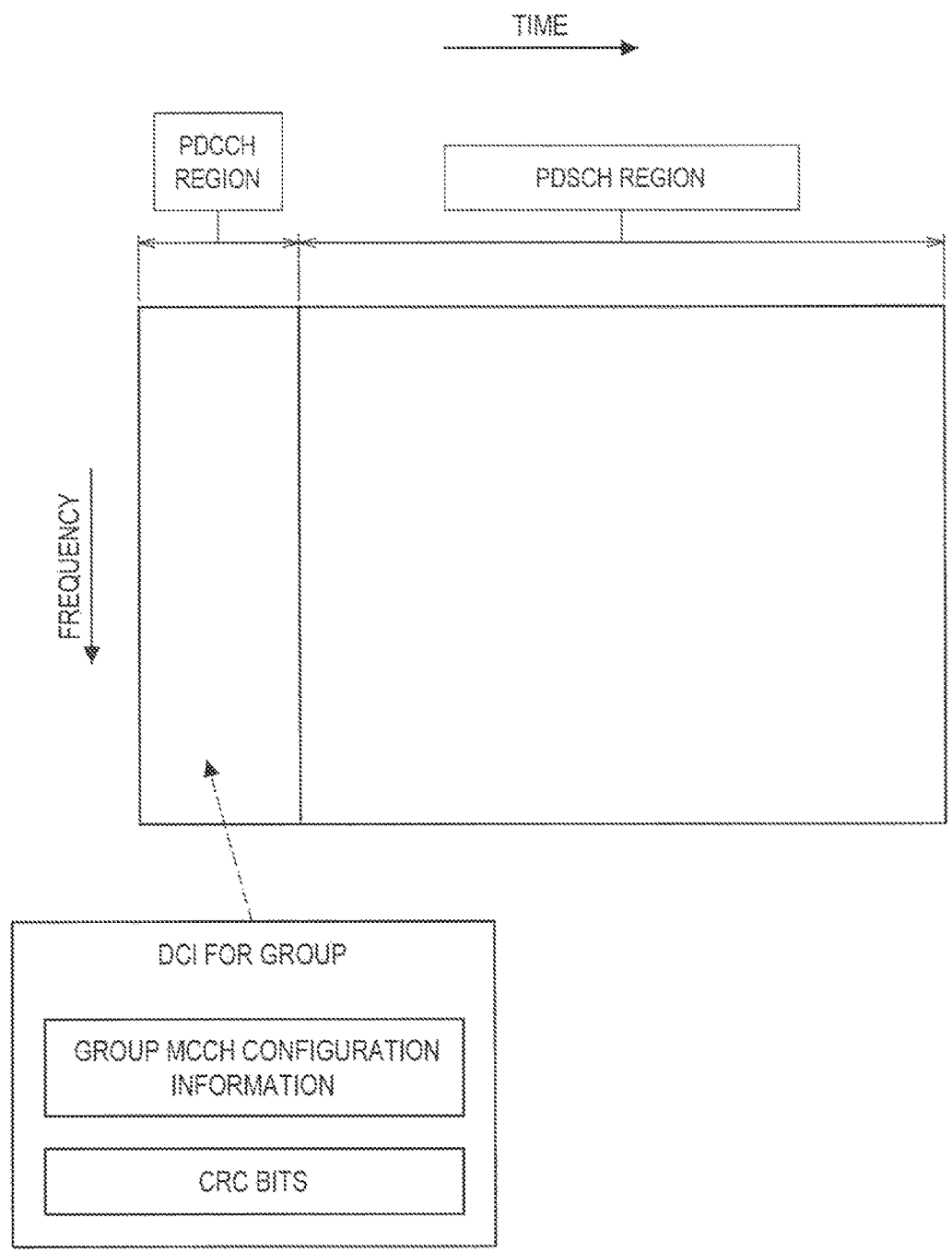
FIG. 19 is an explanatory diagram illustrating an example of notification of group MCCH configuration information in a DCI.

FIG. 19 is an explanatory diagram illustrating an example of notification of the group MCCH configuration information in the DCI. Referring to FIG. 19, radio resources of non-MBSFN subframes are illustrated. For example, the DCI (the DCI for the specific terminal group) including the CRC bits and the group MCCH configuration information is transmitted over the PDCCHs in a PDCCH region (for example, a region of 3 OFDM symbols or 2 OFDM symbols) in which the PDCCHs or the like are disposed.

Figure 20:
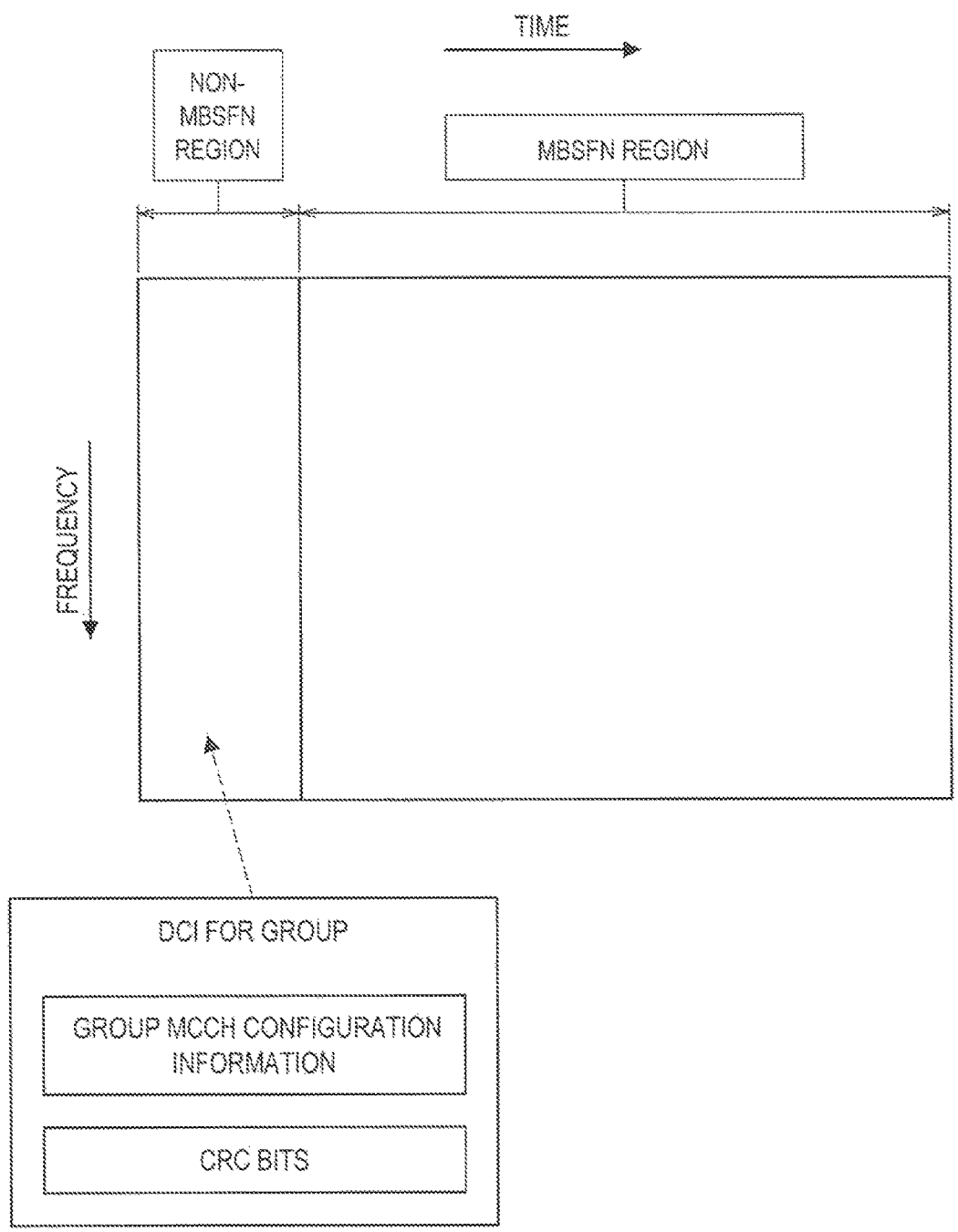
FIG. 20 is an explanatory diagram illustrating another example of the notification of the group MCCH configuration information in a DCI.

FIG. 20 is an explanatory diagram illustrating another example of the notification of the group MCCH configuration information in the DCI. Referring to FIG. 20, radio resources of the MBSFN subframes are illustrated. For example, the DCI (the DCI for the specific terminal group) including the CRC bits and the group MCCH configuration information is transmitted over the PDCCHs in the non-MBSFN subframes.

Second Example

As a second example, the communication control unit 253 notifies the specific terminal group of the group MCCH configuration information by notifying the specific terminal group of resource allocation information indicating the radio resources with which the group MCCH configuration information is transmitted in the DCI to be transmitted over the PDCCHs using the group RNTI.

More specifically, for example, the communication control unit 253 generates a DCI including CRC bits scrambled by the group RNTI and the radio resources with which the group MCCH configuration information is transmitted (that is, the DCI for the specific terminal group). Then, the communication control unit 253 maps the DCI to the radio resources of the PDCCHs in the non-MBSFN subframes. Accordingly, the terminal apparatuses belonging to the specific terminal group can specify the radio resources (that is, the radio resources of the PDSCHs) with which the group MCCH configuration information is transmitted using the group RNTI. Thus, the terminal apparatuses can acquire the group MCCH configuration information transmitted with the radio resources. In particular, according to this scheme, for example, it is possible to prevent the number of bits of the DCI from increasing. According to this scheme, for example, it is possible to transmit the group MCCH configuration information with a large size. For example, the communication control unit 253 maps the group MCCH configuration information to the radio resources (the radio resources of the PDSCHs) indicated by the resource allocation information. Accordingly, the group MCCH configuration information is actually transmitted with the radio resources. Hereinafter, a specific example will be described with reference to FIG. 21.

Figure 21:
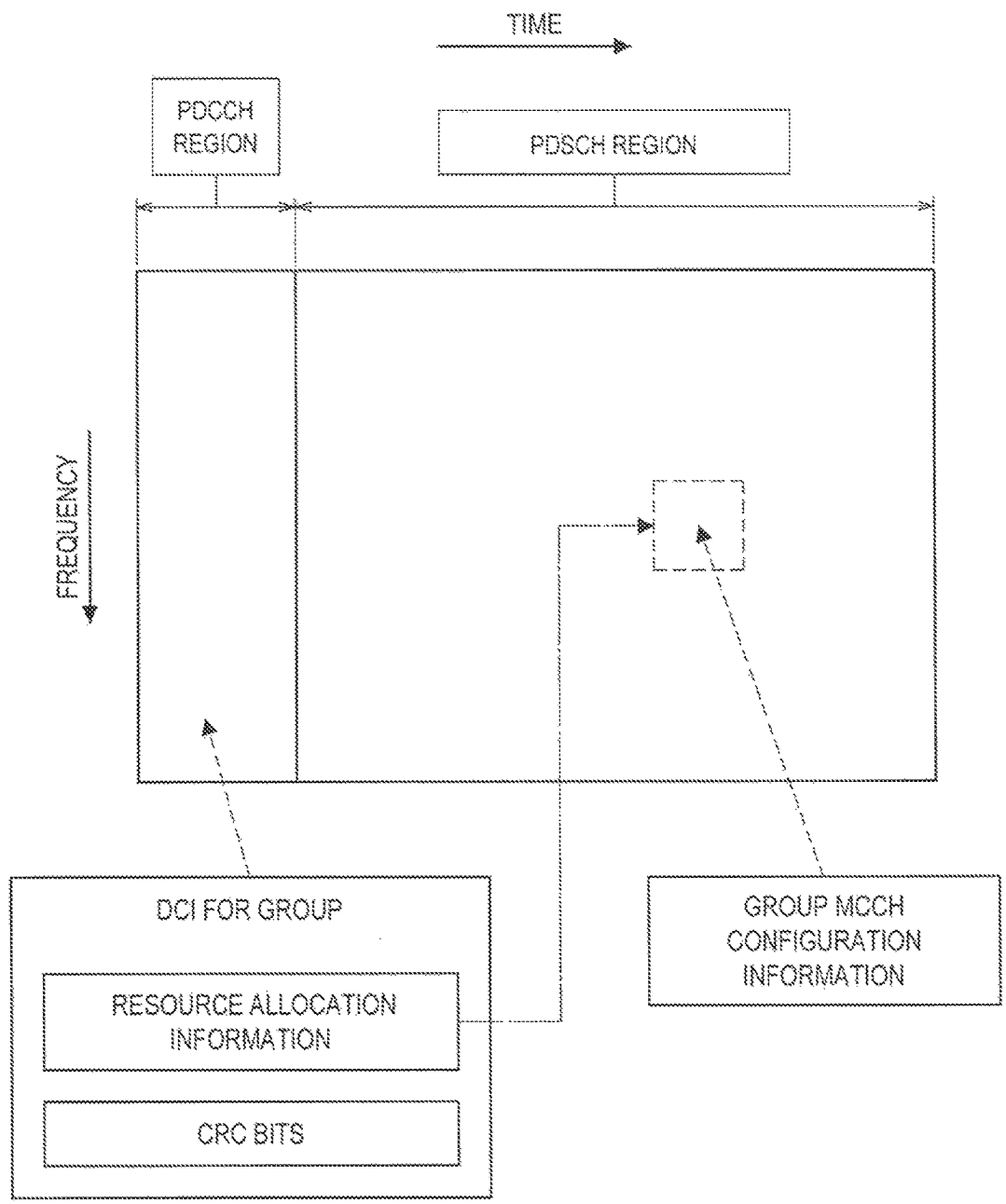
FIG. 21 is an explanatory diagram illustrating an example of notification of the group MCCH configuration information in allocated radio resources.

FIG. 21 is an explanatory diagram illustrating an example of notification of the group MCCH configuration information in the allocated radio resources. Referring to FIG. 21, radio resources of non-MBSFN subframes are illustrated. For example, the DCI (the DCI for the specific terminal group) including the CRC bits and the resource allocation information is transmitted over the PDCCHs in a PDCCH region (for example, a region of 3 OFDM symbols or 2 OFDM symbols) in which the PDCCHs or the like are disposed. The group MCCH configuration information is transmitted with the radio resources (radio resources of the PDSCHs) indicated by the resource allocation information.

For example, according to the above-described notification scheme, the specific terminal group is notified of the group MCCH configuration information. The multicast to a specific terminal group can also be realized by providing an encryption key to the specific terminal group and encrypting data to be multicast to the specific terminal group by the encryption key. However, according to such a scheme, a terminal apparatus not belonging to the specific terminal group also attempts to receive the encrypted data. Therefore, power of the terminal apparatus is wasted, and service quality in the terminal apparatus may deteriorate. For this reason, according to the above-described notification scheme, it is possible to avoid the waste of the power of the terminal apparatus not belonging to the specific terminal group and/or the deterioration in the service quality in the terminal apparatus.

Notification Timing

First, for example, the communication control unit 253 notifies the specific terminal group of the group MCCH configuration information when the MCCH information is changed. Accordingly, for example, since the terminal apparatus does not repeatedly acquire the same group MCCH configuration information and the same information regarding the MCCHs, it is possible to reduce the burden on the terminal apparatus.

Second, for example, the communication control unit 253 notifies the terminal apparatus of the group MCCH configuration information when the terminal apparatus belonging to the specific terminal group is connected in the MBSFN area 30. More specifically, for example, when handover of the terminal apparatus is performed from a cell outside of the MBSFN area to a cell inside the MBSFN area, the communication control unit 253 notifies the terminal apparatus of the group MCCH configuration information. For example, when a mode of the terminal apparatus transitions from an RRC idle mode to an RRC connection mode in the cell inside the MBSFN area, the communication control unit 253 notifies the terminal apparatus of the group MCCH configuration information. Accordingly, for example, even when the specific terminal group is not repeatedly notified of the group MCCH configuration information, the terminal apparatus belonging to the specific terminal group can acquire the group MCCH configuration information quickly at the time of connection in the MBSFN area 30.

When the terminal apparatus is connected in the MBSFN area, the communication control unit 253 may notify the terminal apparatus of the group MCCH configuration information using the identification information for the terminal apparatus. The identification information may be, for example, cell-RNTI (C-RNTI). Accordingly, for example, since only the terminal apparatus connected in the MBSFN area is notified, it is possible to reduce a burden on other terminal apparatuses belonging to the specific terminal group.

As described above, the communication control unit 253 notifies the specific terminal group of the group MCCH configuration information. Accordingly, for example, the terminal apparatus belonging to the specific terminal group can acquire information regarding the MCCHs for the specific terminal group. Therefore, the terminal apparatus can specify the PMCHs for the specific terminal group and the MTCHs mapped to the PMCHs (that is, the MTCHs for the specific terminal group). That is, the multicast to the specific terminal group can be performed.

For example, the communication control unit 253 does not report the group MCCH configuration information in a system information block (for example, the SIB 13). Accordingly, for example, the terminal apparatus not belonging to the specific terminal group does not acquire the group MCCH configuration information. Therefore, the multicast to only the specific terminal group can be performed.

Notification of Group PMCH Configuration Information

For example, the communication control unit 253 notifies the specific terminal group of the group PMCH configuration information indicating the configuration of the PMCHs disposed in the group MBSFN subframes.

For example, the communication control unit 253 notifies the specific terminal group of the group PMCH configuration information over the MCCHs disposed in the group MBSFN subframes (that is, the MCCHs for the specific terminal group).

Notification of Normal MCCH Configuration Information

For example, the communication control unit 253 notifies the terminal apparatus of the MCCH configuration information indicating the configuration of the MCCHs disposed in the normal MBSFN subframes. For example, the communication control unit 253 reports a system information block (for example, the SIB 13) including the normal MCCH configuration information.

Notification of Normal PMCH Configuration Information

For example, the communication control unit 253 notifies the terminal apparatus of the normal PMCH configuration information indicating the configuration of the PMCHs disposed in the normal MBSFN subframes. For example, the communication control unit 253 notifies the terminal apparatus of the normal PMCH configuration information over the MCCHs disposed in the normal MBSFN subframes.

Notification of MBSFN Subframes

For example, the communication control unit 253 notifies the terminal apparatus of the MBSFN subframes.

For example, the communication control unit 253 notifies the terminal apparatus of the radio frame allocation period, the radio frame allocation offset, and the subframe allocation for the MBSFN subframes including the normal MBSFN subframes and the group MBSFN subframes. More specifically, for example, the communication control unit 253 reports an SIB 2 including such information.

Accordingly, for example, the terminal apparatus can know all of the MBSFN subframes regardless of whether the terminal apparatus belongs to the specific terminal group. Therefore, the terminal apparatus know subframes to be set as CRS measurement targets. Thus, the CRS measurement can be appropriately performed.

(Others: MBSFN Region)

The small base station 200-1 can use one format among several kinds of formats as the format of MBMS subframes of the MBSNF area 30.

As a first example, the MBMS subframes of the MBSNF area 30 include 12 OFDM symbols in the time direction, as illustrated in FIG. 4. A non-MBMS region may be a region which extends over the first two OFDM symbols among the 12 OFDM symbols.

As a second example, the MBMS subframes of the MBSNF area 30 include 14 OFDM symbols in the time direction. This is because a cyclic prefix (CP) may be short in some cases in consideration of the fact that the MBSNF area 30 is formed by a small cell. A non-MBMS region may be a region which extends over the first three OFDM symbols among the 14 OFDM symbols. Hereinafter, the MBSFN subframes will be described with reference to FIG. 22.

Figure 22:
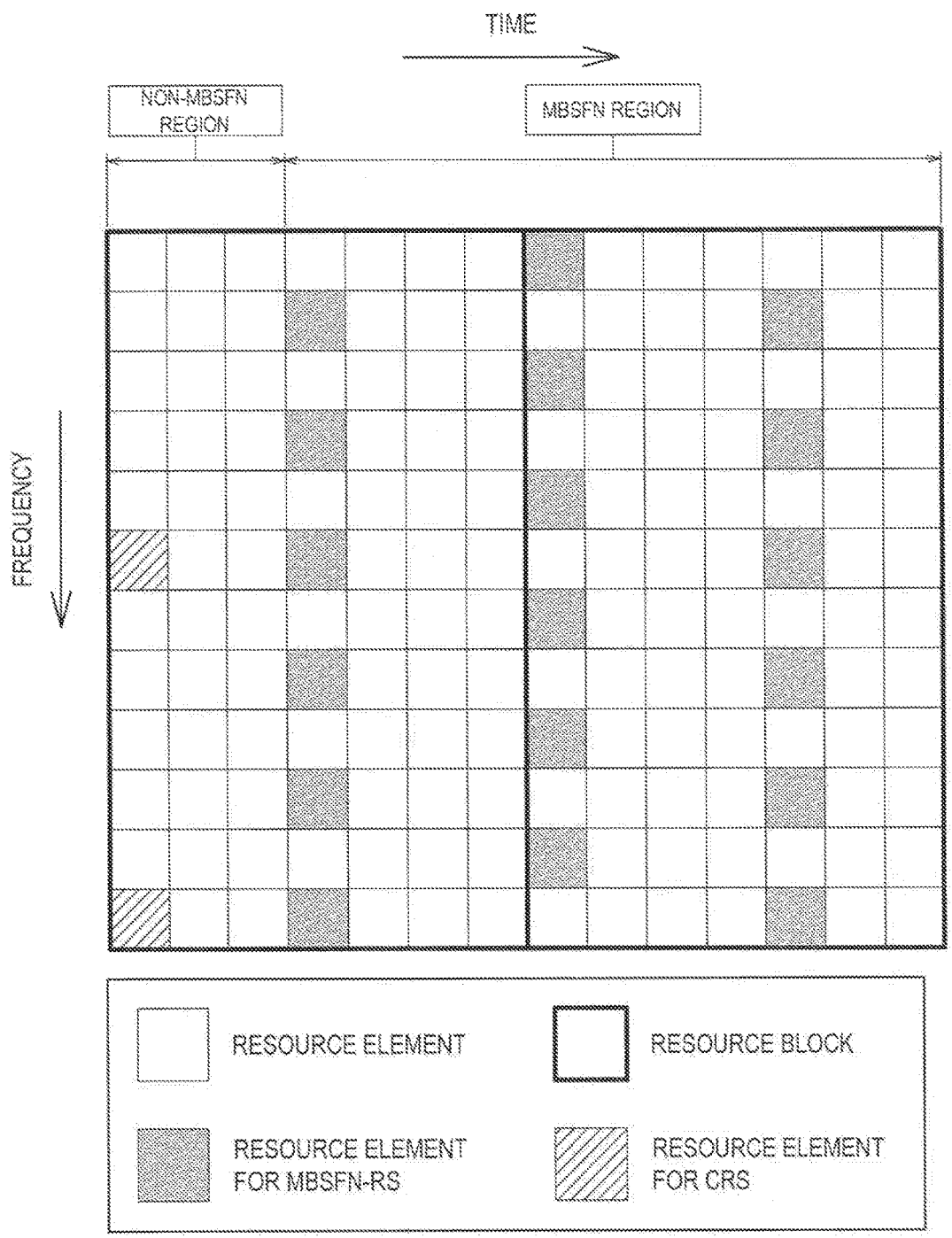
FIG. 22 is an explanatory diagram illustrating examples of MBMS subframes.

FIG. 22 is an explanatory diagram illustrating examples of the MBMS subframes. Referring to FIG. 22, two resource blocks (RB) arranged in the time direction in the MBSFN subframes are illustrated. In this example, the MBSFN subframes include 14 OFDM symbols in the time direction. The MBSFN subframes includes a non-MBSFN region extending over the first three OFDM symbols among the 14 OFDM symbols and an MBSFN region continuing after the non-MBSFN region. In the non-MBSFN region, the CRS can be transmitted. On the other hand, in the MBSFN region, a common MBSFN-RS between cells belonging to the MBSFN area is transmitted. In the MBSFN region, the control information mapped to the MCCH or the data mapped to the MTCH is transmitted.

Of course, as the format of the MBMS subframes of the MBSNF area 30, a format other than the formats of the MBSFN subframes described in the above-described first and second examples may be used.

3.3. Configuration of Terminal Apparatus

Figure 23:
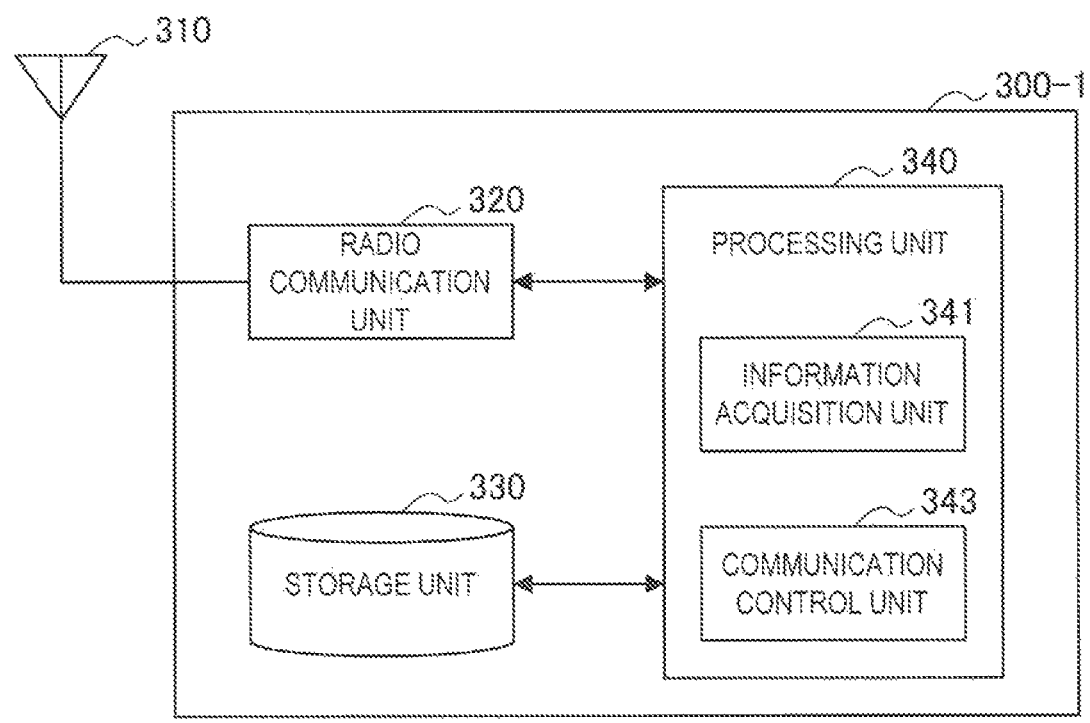
FIG. 23 is a block diagram illustrating an example of the configuration of the terminal apparatus according to the first embodiment.

Next, the configuration of a terminal apparatus 300-1 according to the first embodiment will be described with reference to FIG. 23. FIG. 23 is a block diagram illustrating an example of the configuration of the terminal apparatus 300-1 according to the first embodiment. Referring to FIG. 23, the terminal apparatus 300-1 includes an antenna unit 310, a radio communication unit 320, a storage unit 330, and a processing unit 340.

(Antenna Unit 310)

The antenna unit 310 radiates a signal output by the radio communication unit 320 as radio waves to a space. The antenna unit 310 converts space radio waves into a signal and outputs the signal to the radio communication unit 320.

(Radio Communication Unit 220)

The radio communication unit 320 performs radio communication. For example, when the terminal apparatus 300-1 is located in the macro cell 10, the radio communication unit 320 receives a downlink signal from the macro base station 11 and transmits an uplink signal to the macro base station 11. For example, when the terminal apparatus 300-1 is located in the small cell 20, the radio communication unit 320 receives a downlink signal from the small base station 200-1 and transmits an uplink signal to the small base station 200-1.

(Storage Unit 330)

The storage unit 33 temporarily or permanently stores a program and data for an operation of the terminal apparatus 300-1.

(Processing Unit 340)

The processing unit 340 supplies various functions of the terminal apparatus 300-1. The processing unit 340 includes an information acquisition unit 341 and a communication control unit 343.

(Information Acquisition Unit 341)

Acquisition of Identification Information for Specific Terminal Group

The information acquisition unit 341 acquires identification information for a specific terminal group. For example, the identification information for the specific terminal group is an RNTI for the specific terminal group (that is, the group RNTI). As described above, the terminal apparatus 300-1 belongs to the specific terminal group.

Specifically, for example, the small base station 200-1 notifies the terminal apparatus 300-1 of the group RNTI and the terminal apparatus 300-1 stores the group RNTI in the storage unit 330. Then, the information acquisition unit 341 acquires the group RNTI from the storage unit 330.

Acquisition of Identification Information for Terminal Apparatus 300-1

For example, the information acquisition unit 341 acquires the identification information for the terminal apparatus 300-1. For example, the identification information for the terminal apparatus 300-1 is the C-RNTI for the terminal apparatus 300-1.

Specifically, for example, the small base station 200-1 notifies the terminal apparatus 300-1 of the C-RNTI for the terminal apparatus 300-1 and the terminal apparatus 300-1 stores the C-RNTI in the storage unit 330. Then, the information acquisition unit 341 acquires the C-RNTI from the storage unit 330.

(Communication Control Unit 343)

Acquisition of Group MCCH Configuration Information

The communication control unit 343 acquires channel configuration information indicating the configuration of multicast channels disposed in the MBSFN subframes for the specific terminal group (that is, the group MBSFN subframes) using the identification information for the specific terminal group. As described above, the small base station 200-1 notifies the specific terminal group of the channel configuration information.

In particular, in the first embodiment, as described above, the multicast channel is the MCCH and the channel configuration information is the group MCCH configuration information indicating the configuration of the MCCHs disposed in the group MBSFN subframes. That is, the communication control unit 343 acquires the group MCCH configuration information using the identification information (for example, the group RNTI) for the specific terminal group.

Specific Notification Scheme

For example, the small base station 200-1 notifies the specific terminal group of the group MCCH configuration information through the DCI to be transmitted over the PDCCHs using the group RNTI. In this case, the communication control unit 343 acquires the group MCCH configuration information through the DCI to be transmitted over the PDCCHs using the group RNTI. The PDCCH may be a normal PDCCH or may be an ePDCCH.

First Example

As a first example, the small base station 200-1 notifies the specific terminal group of the group MCCH configuration information in the DCI to be transmitted over the PDCCHs using the group RNTI. In this case, the communication control unit 343 acquires the group MCCH configuration information from the DCI using the group RNTI.

More specifically, for example, the communication control unit 343 performs descrambling of the CRC bits included in the DCI transmitted with the PDCCHs using the group RNTI. As a result, when there is no error in the CRC bits, the DCI is the DCI for the specific terminal group and includes the group MCCH configuration information. Therefore, the communication control unit 343 acquires the group MCCH configuration information from the DCI.

The subframes with which the DCI is transmitted may be, for example, non-MBSFN subframes illustrated in FIG. 19 or may be, for example, the MBSFN subframes illustrated in FIG. 20.

Second Example

As a second example, the small base station 200-1 notifies the specific terminal group of the resource allocation information indicating the radio resources with which the group MCCH configuration information is transmitted in the DCI to be transmitted over the PDCCHs using the group RNTI. In this case, the communication control unit 343 acquires the resource allocation information from the DCI using the group RNTI and acquires the group MCCH configuration information transmitted with the radio resources.

More specifically, for example, the communication control unit 343 performs descrambling of the CRC bits included in the DCI transmitted with the PDCCHs using the group RNTI. As a result, when there is no error in the CRC bits, the DCI is the DCI for the specific terminal group and includes the resource allocation information indicating the radio resources in which the group MCCH configuration information is transmitted. Therefore, the communication control unit 343 acquires the resource allocation information from the DCI and acquires the group MCCH configuration information transmitted with the radio resources indicated by the resource allocation information.

The subframes with which the DCI is transmitted are, for example, the non-MBSFN subframes illustrated in FIG. 21.

As described above, the communication control unit 343 acquires the group MCCH configuration information using the group RNTI. Accordingly, for example, the terminal apparatus 300-1 can specify the MCCHs for the specific terminal group and specify the PMCHs for the specific terminal group and the MTCHs mapped to the PMCHs (that is, the MTCHs for the specific terminal group) from information regarding the MCCHs. Therefore, the terminal apparatus 300-1 can acquire an MBMS session to be multicast to the specific terminal group.

When the terminal apparatus 300-1 is connected in the MBSFN area 30, the small base station 200-1 may notify the terminal apparatus 300-1 of the group MCCH configuration information using the C-RNTI for the terminal apparatus 300-1. In this case, the communication control unit 343 may acquire the group MCCH configuration information using the C-RNTI for the terminal apparatus 300-1.

Acquisition of Group PMCH Configuration Information

For example, the communication control unit 343 further acquires the group PMCH configuration information indicating the configuration of the PMCHs disposed in the group MBSFN subframes. As described above, the small base station 200-1 notifies the specific terminal group of the group PMCH configuration information.

For example, the small base station 200-1 notifies the specific terminal group of the group PMCH configuration information over the MCCHs disposed in the group MBSFN subframes (that is, the MCCHs for the specific terminal group). In this case, the communication control unit 343 specifies the group MBSFN subframes in which the MCCHs are disposed from the group MCCH configuration information and acquires the group PMCH configuration information from the MCCHs disposed in the group MBSFN subframes.

Acquisition of Normal MCCH Configuration Information

For example, the communication control unit 343 further acquires the normal MCCH configuration information indicating the configuration of the MCCHs disposed in the normal MBSFN subframes. As described above, the small base station 200-1 notifies the terminal apparatus of the normal MCCH configuration information.

For example, the small base station 200-1 reports a system information block (for example, the SIB 13) including the normal MCCH configuration information. Then, the communication control unit 343 acquires the normal MCCH configuration information from the system information block.

Acquisition of Normal PMCH Configuration Information

For example, the communication control unit 343 further acquires the normal PMCH configuration information indicating the configuration of the PMCHs disposed in the normal MBSFN subframes. As described above, the small base station 200-1 notifies the terminal apparatus of the normal PMCH configuration information.

For example, the small base station 200-1 notifies the terminal apparatus of the normal PMCH configuration information over the MCCHs disposed in the normal MBSFN subframes. In this case, the communication control unit 343 specifies the normal MBSFN subframes in which the MCCHs are disposed from the normal MCCH configuration information and acquires the normal PMCH configuration from the MCCHs disposed in the normal MBSFN subframes.

3.4. Flow of Process

Next, each process according to the first embodiment will be described with reference to FIGS. 24 to 26.

(Process on Network Side)

Figure 24:
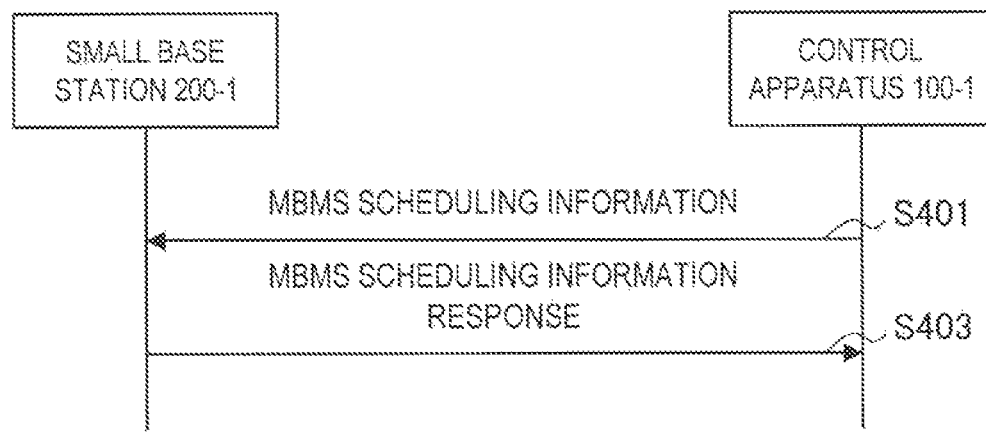
FIG. 24 is a sequence diagram illustrating an example of a schematic flow of a process on a network side according to the first embodiment.

FIG. 24 is a sequence diagram illustrating an example of a schematic flow of a process on a network side according to the first embodiment.

In step S401, the control apparatus 100-1 notifies the small base station 200-1 of the MBMS scheduling information message. Then, the small base station 200-1 acquires the MBMS scheduling information message.

Thereafter, in step S403, the small base station 200-1 notifies the control apparatus 100-1 of an MBMS scheduling information response message. Then, the control apparatus 100-1 acquires the MBMS scheduling information response message.

The MBMS scheduling information message indicates, for example, the group MBSFN subframes and the normal MBSFN subframes. The MBMS scheduling information message indicates, for example, disposition of the multicast channels (the PMCHs, the MTCHs, and the MCCHs) in the group MBSFN subframes and disposition of the multicast channels (the PMCHs, the MTCHs, and the MCCHs) in the normal MBSFN subframes.

(Process Related to Multicast)

Multicast to Specific Terminal Group

Figure 25:
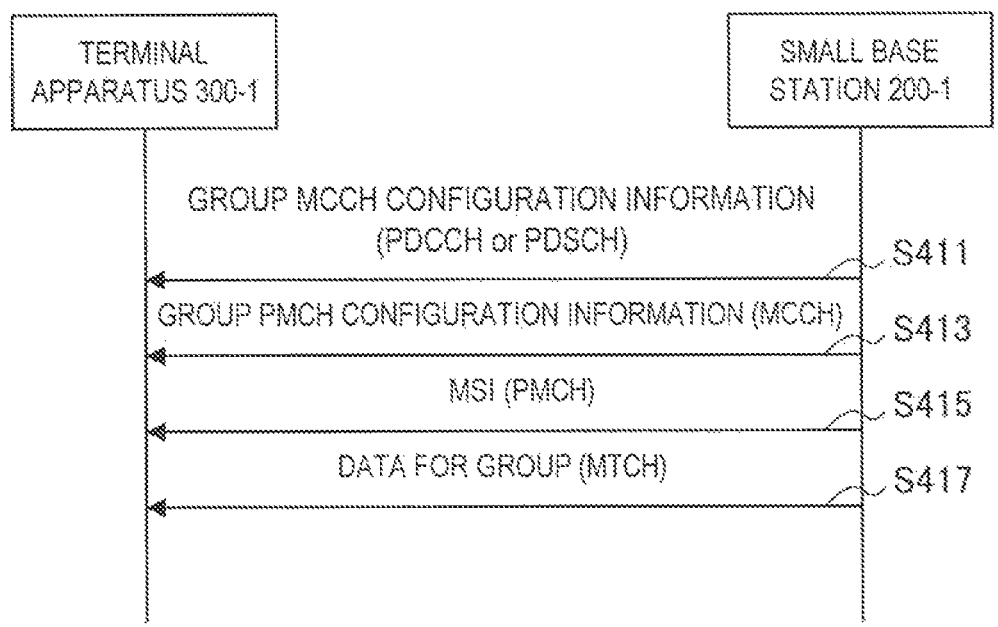
FIG. 25 is a sequence diagram illustrating an example of a schematic flow of a first process related to multicast according to the first embodiment.

FIG. 25 is a sequence diagram illustrating an example of a schematic flow of a first process related to multicast according to the first embodiment. The first process is a process related to the multicast to the specific terminal group.

In step S411, the small base station 200-1 transmits the group MCCH configuration information over the PDCCHs or the PDSCHs using the group RNTI. Then, the terminal apparatus 300-1 receives and acquires the group MCCH configuration information using the group RNTI. Then, the terminal apparatus 300-1 specifies the group MBSFN subframes in which the MCCHs are disposed.

In step S413, the small base station 200-1 transmits the group PMCH configuration information (for example, the MBSFN area configuration message) over the MCCHs disposed in the group MBSFN subframes. Then, the terminal apparatus 300-1 receives and acquires the group PMCH configuration information. The terminal apparatus 300-1 specifies the group MBSFN subframes in which the PMCHs to which the MTCHs of a desired MBMS session are mapped are disposed.

In step S415, the small base station 200-1 transmits the MSI of the PMCH in the first subframe among the group MBSFN subframes in which the PMCHs are disposed. Then, the terminal apparatus 300-1 receives and acquires the MSI. The terminal apparatus 300-1 specifies the subframes in which the MTCHs of the desired MBMS session are disposed.

In step S417, the small base station 200-1 transmits data of the desired MBMS session over the MTCHs disposed in the subframes. Then, the terminal apparatus 300-1 receives and acquires the data.

Multicast to all Terminal Apparatuses

Figure 26:
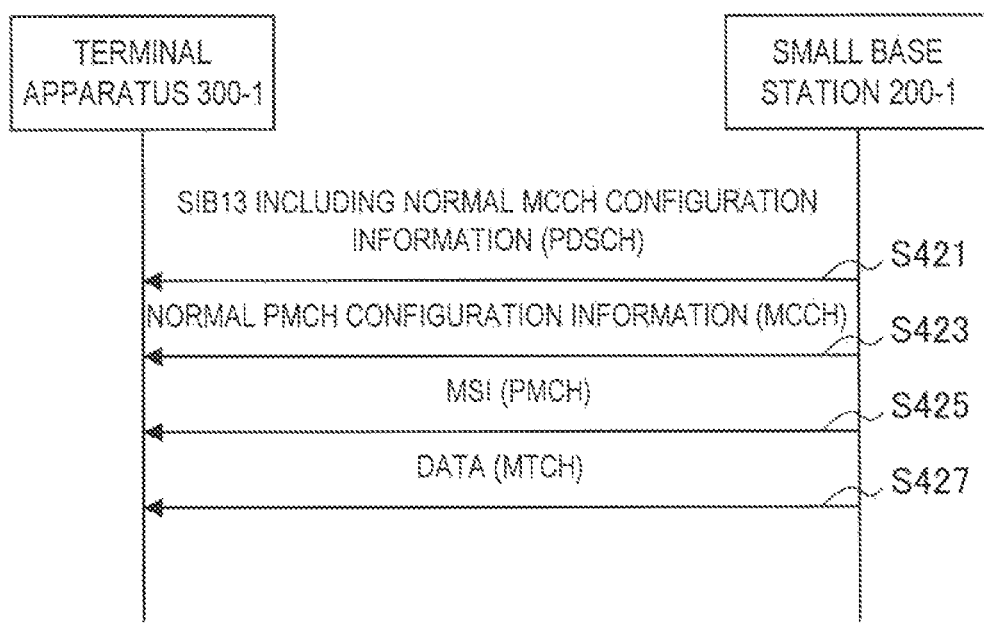
FIG. 26 is a sequence diagram illustrating an example of a schematic flow of a second process related to multicast according to the first embodiment.

FIG. 26 is a sequence diagram illustrating an example of a schematic flow of a second process related to multicast according to the first embodiment. The second process is a process related to the multicast to all the terminal apparatuses.

In step S421, the small base station 200-1 transmits the SIB 13 including the normal MCCH configuration information over the PDSCHs. Then, the terminal apparatus 300-1 receives and acquires the SIB 13. The terminal apparatus 300-1 specifies the normal MBSFN subframes in which the MCCHs are disposed.

In step S423, the small base station 200-1 transmits the normal PMCH configuration information (the MBSFN area configuration message) over the MCCHs disposed in the normal MBSFN subframes. Then, the terminal apparatus 300-1 receives and acquires the normal PMCH configuration information. The terminal apparatus 300-1 specifies the normal MBSFN subframes in which the PMCHs to which the MTCHs of a desired MBMS session are mapped are disposed.

In step S425, the small base station 200-1 transmits the MSI of the PMCH in the first subframe among the normal MBSFN subframes in which the PMCHs are disposed. Then, the terminal apparatus 300-1 receives and acquires the MSI. The terminal apparatus 300-1 specifies the subframes in which the MTCHs of the desired MBMS session are disposed.

In step S427, the small base station 200-1 transmits data of the desired MBMS session over the MTCHs disposed in the subframes. Then, the terminal apparatus 300-1 receives and acquires the data.

3.5. Modification Example

Next, a modification example of the first embodiment will be described. According to the modification example of the first embodiment, a counting result in the terminal apparatuses belonging to the specific terminal group is acquired through an MBMS counting procedure. Then, an MBMS service to be multicast to the specific terminal group is decided based on the counting result.

(Counting Related to Terminal Apparatus Belonging to Specific Terminal Group)

Small Base Station 200-1

The small base station 200-1 (for example, the communication control unit 253) generates a counting result in the terminal apparatuses belonging to the specific terminal group through the MBMS counting procedure. Then, the small base station 200-1 (for example, the communication control unit 253) supplies the counting result to the control apparatus 100-1.

Control Apparatus 100-1

The control apparatus 100-1 (for example, the decision unit 131) acquires the counting result from the small base station 200 of the small cell 20 belonging to the MBSFN area 30. Then, the control apparatus 100-1 (for example, the decision unit 131) decides the MBMS service to be multicast to the specific terminal group based on the counting result.

Specifically, for example, the control apparatus 100-1 aggregates the counting results. Then, the control apparatus 100-1 (for example, the decision unit 131) decides an MBMS service accompanied with a number exceeding a threshold value as an MBMS service to be multicast. Conversely, the control apparatus 100-1 (for example, the decision unit 131) decides an MBMS service accompanied with a number (excluding 0) equal to or less than the threshold value as an MBMS service to be unicast.

Thereafter, for example, the control apparatus 100-1 (for example, the decision unit 131) maps the data of the MBMS session of the MBMS service to be multicast to the specific terminal group to the MTCHs and allocates the group MBSFN subframes to the MTCHs. Based on the counting result, the control apparatus 100-1 may decide the number of MBMS subframes allocated to the MTCHs.

As described above, based on the counting result in the terminal apparatuses belonging to the specific terminal group, the MBMS service to be multicast to the specific terminal group is decided. Accordingly, for example, it is possible to provide the MBMS service according to interest in the specific terminal group.

(Counting Related to Terminal Apparatuses not Belonging to Specific Terminal Group)

Small Base Station 200-1

For example, the small base station 200-1 (for example, the communication control unit 253) may further generate a counting result in the terminal apparatuses not belonging to the specific terminal group through the MBMS counting procedure. The small base station 200-1 (for example, the communication control unit 253) may further supply the counting result to the control apparatus 100-1.

Control Apparatus 100-1

The control apparatus 100-1 (for example, the decision unit 131) may acquire a counting result from the small base station 200-1 of the small cell 20 belonging to the MBSFN area 30. The control apparatus 100-1 (for example, the decision unit 131) may decide an MBMS service to be multicast to all of the terminal apparatuses (that is, multicast with the normal MBSFN subframes) based on the counting result. A specific decision scheme is the same as the above-described scheme.

Thereafter, for example, the control apparatus 100-1 (for example, the decision unit 131) may map data of the MBMS session of the MBMS service to be multicast to all the terminal apparatuses to the MTCHs and allocate the normal MBSFN subframes to the MTCHs. Based on the counting result, the control apparatus 100-1 may decide the number of MBMS subframes allocated to the MTCHs.

As described above, based on the counting result in the terminal apparatuses not belonging to the specific terminal group, the MBMS service to be multicast to all the terminal apparatuses is decided. Accordingly, for example, it is possible to further provide the MBMS service according to interest of the terminal apparatuses not belonging to the specific terminal group.

The first embodiment has been described. According to the first embodiment, the specific terminal group is notified of the group MCCH configuration information indicating the configuration of the MCCHs disposed in the MBSNF subframes for the specific terminal group. Accordingly, for example, it is possible to perform the multicast to the specific terminal group.

4. Second Embodiment

Next, a second embodiment of the present disclosure will be described with reference to FIGS. 27 to 31. As described above, according to the embodiment of the present disclosure, a small base station 200 notifies a specific terminal group of channel configuration information indicating the configuration of multicast channels disposed in MBSFN subframes for the specific terminal group. In particular, in the second embodiment, the multicast channel is a PMCH. That is, according to the second embodiment, the small base station 200 notifies the specific terminal group of the channel configuration information indicating the configuration of the PMCHs disposed in the MBSNF subframes for the specific terminal group.

4.1. Configuration of Control Apparatus

The description of a control apparatus 100-2 according to the second embodiment is the same as, for example, the description of the control apparatus 100-1 according to the first embodiment (excluding differences in reference numerals). Thus, the repeated description will be omitted herein.

4.2. Configuration of Small Base Station

Figure 27:
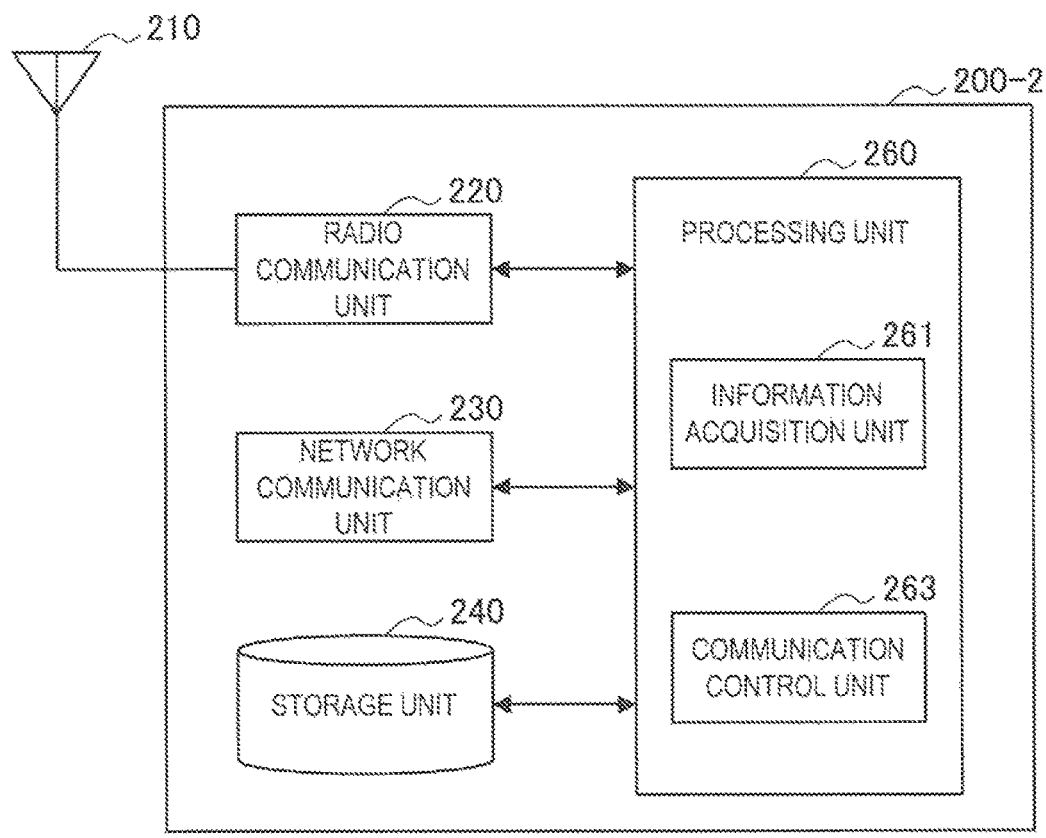
FIG. 27 is a block diagram illustrating an example of the configuration of a small base station according to a second embodiment.

Next, the configuration of a small base station 200-2 according to the second embodiment will be described with reference to FIGS. 27 to 29. FIG. 27 is a block diagram illustrating an example of the configuration of the small base station 200-2 according to the second embodiment. Referring to FIG. 27, the small base station 200-2 includes an antenna unit 210, a radio communication unit 220, a network communication unit 230, a storage unit 240, and a processing unit 260.

The description of the antenna unit 210, the radio communication unit 220, the network communication unit 230, and the storage unit 240 are no different between the first and second embodiments (excluding differences in reference numerals). Thus, only the processing unit 260 will be described herein.

(Processing Unit 260)

The processing unit 260 supplies various functions of the small base station 200-2. The processing unit 260 includes an information acquisition unit 261 and a communication control unit 263.

(Information Acquisition Unit 261)

Acquisition of Group PMC Configuration Information

The information acquisition unit 261 acquires channel configuration information indicating the configuration of the multicast channels disposed in the MBSFN subframes for the specific terminal group (that is, the group MBSFN subframes). As described above, the specific terminal group is, for example, the CSG.

In particular, in the second embodiment, the multicast channel is the PMCH. That is, the information acquisition unit 261 acquires channel configuration information indicating the configuration of the PMCHs disposed in the group MBSFN subframes (that is, group PMCH configuration information).

The multicast channels (PMCHs) are disposed in the group MBSFN subframes, and thus can be said to be multicast channels (PMCHs) for a specific terminal group.

Specific Content

For example, the group PMCH configuration information is an MBSFN area configuration message.

More specifically, for example, the group PMCH configuration information includes a common subframe allocation (CSA) pattern list and a CSA period. As one example, the CSA pattern list and the CSA period indicate the MBSFN subframes including the normal MBSFN subframes and the group MBSFN subframes. In this case, for example, the group PMCH configuration information further includes information for distinguishing the normal MBSFN subframes and the group MBSFN subframes included in the MBSFN subframes indicated by the CSA pattern list and the CSA period. As another example, the CSA pattern list and the CSA period may indicate the group MBSFN subframes.

For example, the group PMCH configuration information includes the PMCH information list. The PMCH information list indicates, for example, the group MBSFN subframes in which the PMCHs for the specific terminal group are disposed. That is, the PMCH information list includes, for example, subframe allocation end of each PMCH. Further, the PMCH information list also includes, for example, an MCH scheduling period (MSP) of each PMCH. The PMCH information list indicates, for example, one or more MTCHs mapped to the PMCHs for the specific terminal group (that is, one or more MTCHs for the specific terminal group). That is, the PMCH information list includes, for example, an MBMS session information list. The MBMS session information list includes a TMGI, a session ID, and a logical channel ID.

Acquisition of Normal MCCH Configuration Information

For example, the information acquisition unit 261 further acquires the normal MCCH configuration information indicating the configuration of the MCCHs disposed in the normal MBSFN subframes.

The specific content of the normal MCCH configuration information is no different between the first and second embodiments. Thus, the repeated description will be omitted herein.

Acquisition of Normal PMCH Configuration Information

For example, the information acquisition unit 261 further acquires normal PMCH configuration information indicating the configuration of the PMCHs disposed in the normal MBSFN subframes.

The specific content of the normal PMCH configuration information is no different between the first and second embodiments. Thus, the repeated description will be omitted herein.

(Communication Control Unit 263)

Notification of Group PMCH Configuration Information

The communication control unit 263 notifies the specific terminal group of the channel configuration information indicating the configuration of the multicast channels disposed in the group MBSFN subframes. In particular, in the second embodiment, the channel configuration information is the group PMCH configuration information. The communication control unit 263 notifies the specific terminal group of the group PMCH configuration information.

Notification by Use of Identification Information for Specific Terminal Group

For example, the communication control unit 263 notifies the specific terminal group of the group PMCH configuration information using identification information for the specific terminal group.

More specifically, for example, the identification information for the specific terminal group is an RNTI for the specific terminal group (that is, the "group RNTI"). Accordingly, for example, only the terminal apparatuses belonging to the specific terminal groups can be notified of the group PMCH configuration information.

For example, the communication control unit 263 notifies the terminal apparatuses belonging to the specific terminal group of the identification information. Accordingly, for example, the terminal apparatuses belonging to the specific terminal group can actually acquire the group PMCH configuration information.

Specific Notification Scheme

For example, the communication control unit 263 notifies the specific terminal group of the group PMCH configuration information through the DCI to be transmitted over the PDCCHs using the group RNTI. Accordingly, for example, the specific terminal group can be quickly notified of the group PMCH configuration information when it is necessary. Therefore, for example, the group MBSFN subframes can also be dynamically allocated to the PMCHs and the MTCHs. The PDCCH may be a normal PDCCH or may be an ePDCCH.

First Example

As a first example, the communication control unit 263 notifies the specific terminal group of the group PMCH configuration information by notifying the specific terminal group of the resource allocation information indicating the radio resources with which the group PMCH configuration information is transmitted in the DCI to be transmitted over the PDCCHs using the group RNTI.

More specifically, for example, the communication control unit 263 generates a DCI including the CRC bits scrambled by the group RNTI and the resource allocation information indicating the radio resources with which the group PMCH configuration information is transmitted (that is, the DCI for the specific terminal group). Then, the communication control unit 263 maps the DCI to the radio resources of the PDCCHs in the non-MBSFN subframes. Accordingly, the terminal apparatus belonging to the specific terminal group can specify the radio resources (that is, the radio resources of the PDSCHs) in which the group PMCH configuration information is transmitted using the group RNTI. Thus, the terminal apparatus can acquire the group PMCH configuration information transmitted with the radio resources. For example, the communication control unit 263 maps the group PMCH configuration information to the radio resources (the radio resources of the PDSCHs) indicated by the resource allocation information. Accordingly, the group PMCH configuration information is actually transmitted with the radio resources. Hereinafter, a specific example will be described with reference to FIG. 28.

Figure 28:
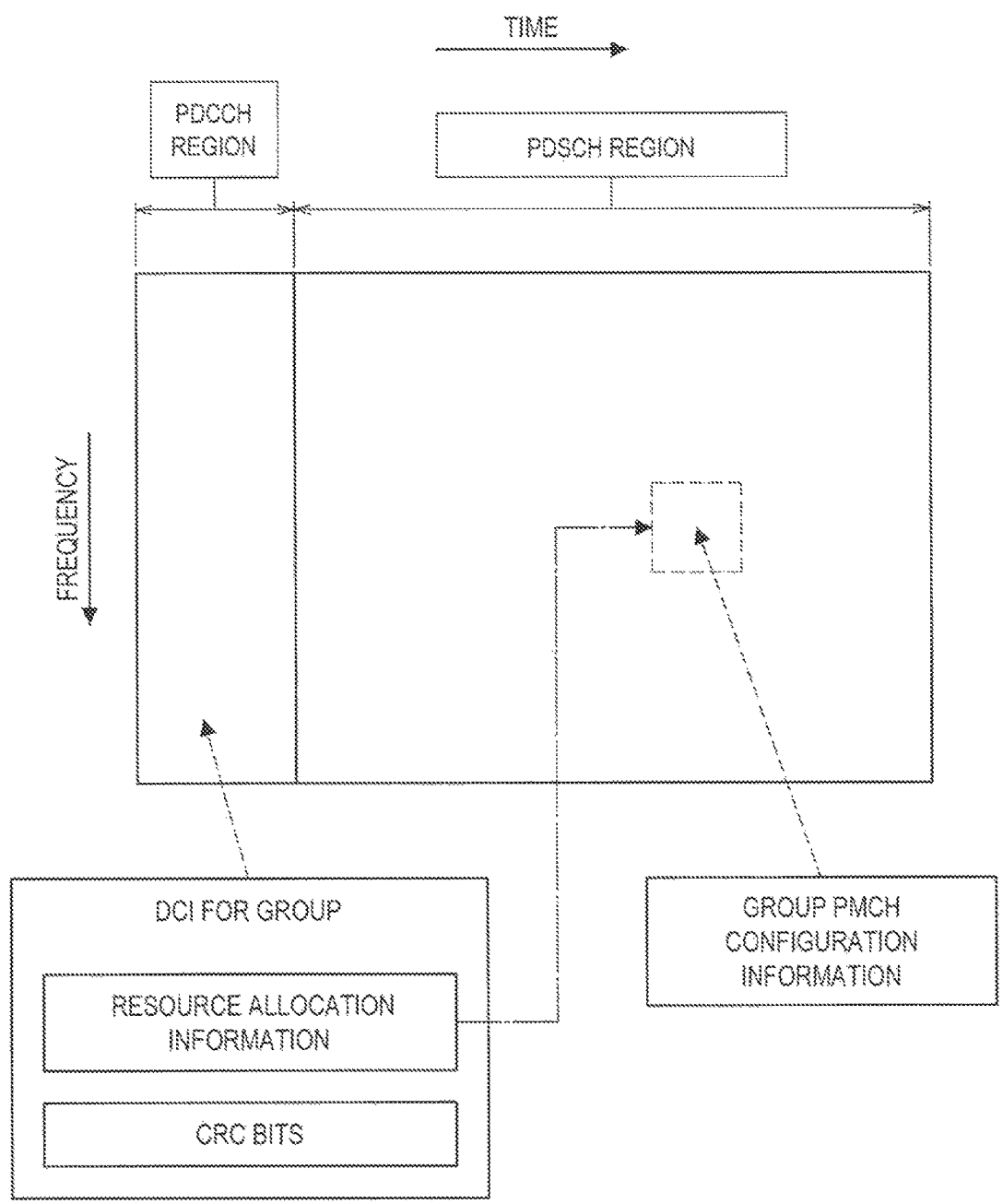
FIG. 28 is an explanatory diagram illustrating an example of notification of the group MCCH configuration information in allocated radio resources.

FIG. 28 is an explanatory diagram illustrating an example of notification of the group PMCH configuration information in the allocated radio resources. Referring to FIG. 28, radio resources of non-MBSFN subframes are illustrated. For example, the DCI (the DCI for the specific terminal group) including the CRC bits and the resource allocation information is transmitted over the PDCCHs in the PDCCH region (for example, the region of 3 OFDM symbols or 2 OFDM symbols) in which the PDCCHs or the like are disposed. The group PMCH configuration information is transmitted with the radio resources (the radio resources of the PDSCHs) indicated by the resource allocation information.

The DCI may include information regarding the MBSFN area ID and/or a non-MBSFN region length. Alternatively, the group PMCH configuration information may include such information.

When the above-described notification scheme is adopted, the MCCHs may not be disposed in the group MBSFN subframes. That is, the MCCHs for the specific terminal group may not be present. In this case, an operation of each apparatus in regard to the MCCHs for the specific terminal group may not be necessary.

Second Example

As a second example, the communication control unit 263 notifies the specific terminal group of the group PMCH configuration information by notifying the specific terminal group that the MCCHs are disposed in the subframes in the DCI transmitted over the PDCCHs of the subframes in which the MCCHs are disposed among the group MBSFN subframes, using the group RNTI.

More specifically, for example, the communication control unit 263 generates the DCI including the CRC bits scrambled by the group RNTI (that is, the DCI for the specific terminal group). Then, the communication control unit 263 maps the DCI to the radio resources of the PDCCHs in the subframes in which the MCCHs are disposed among the group MBSFN subframes. Accordingly, the terminal apparatus belonging to the specific terminal group recognize that the MCCHs (that is, the MCCHs for the specific terminal group) are disposed in the subframes using the group RNTI. That is, the terminal apparatus belonging to the specific terminal group is implicitly notified with the DCI (more specifically, the CRC bits of the DCI) that the MCCHs are disposed in the subframes. Thus, the terminal apparatus can acquire the group PMCH configuration information transmitted over the MCCHs for the specific terminal group. For example, the communication control unit 263 maps the group PMCH configuration information to the MCCHs disposed in the group MBSFN subframes (that is, the MCCHs for the specific terminal group). Accordingly, the group PMCH configuration information is actually transmitted. Hereinafter, a specific example will be described with reference to FIG. 29.

Figure 29:
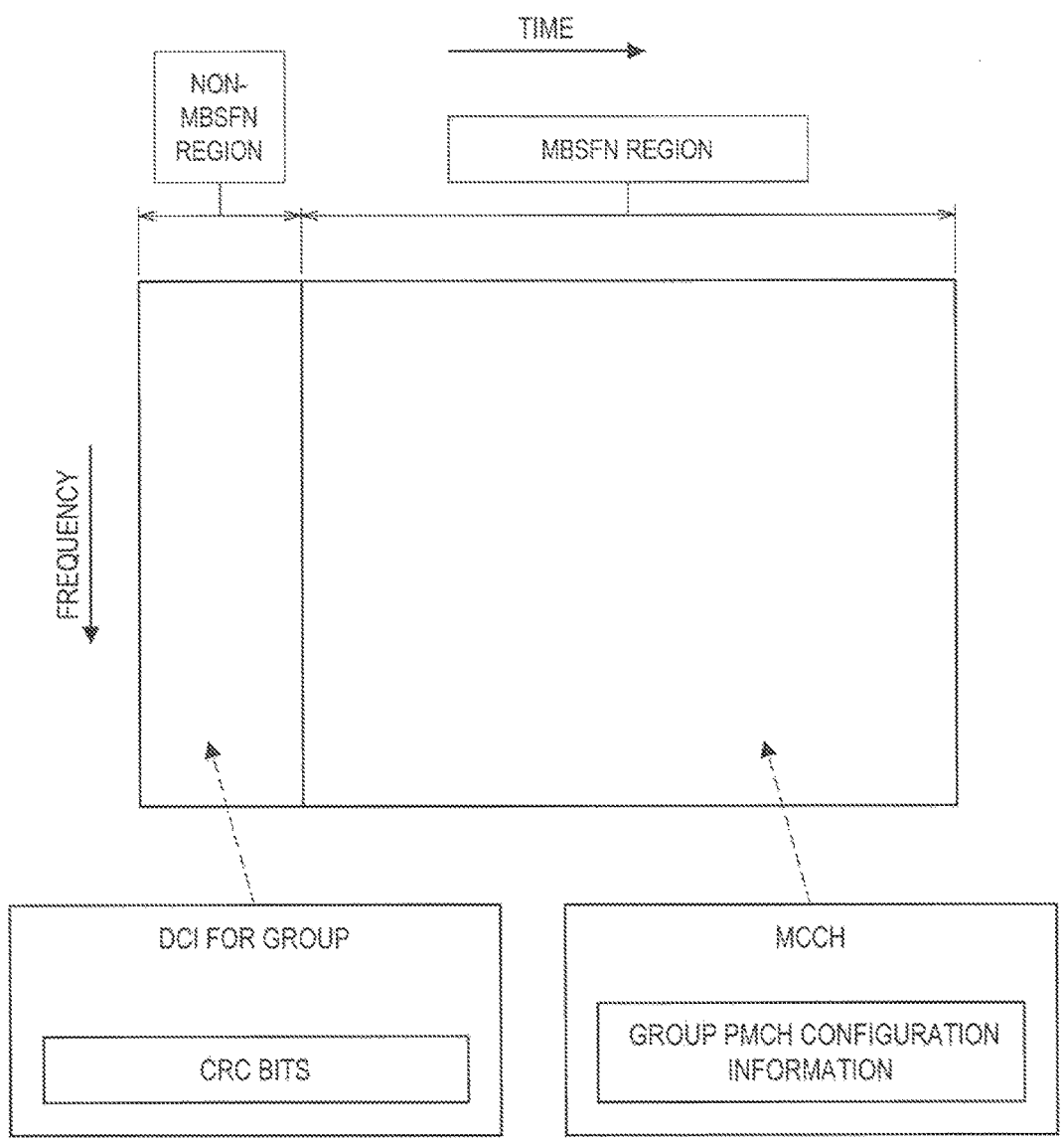
FIG. 29 is an explanatory diagram illustrating an example of notification of group PMCH configuration information over the MCCHs.

FIG. 29 is an explanatory diagram illustrating an example of notification of the group PMCH configuration information over the MCCHs. Referring to FIG. 29, the radio resources of the MBSFN subframes are illustrated. For example, for example, the DCI (the DCI for the specific terminal group) including the CRC bits is transmitted over the PDCCHs in a PDCCH region (for example, a region of 3 OFDM symbols or 2 OFDM symbols) in which the PDCCHs or the like are disposed. The group MCCH configuration information is transmitted over the MCCHs for the specific terminal group.

The DCI may include information regarding the MBSFN area ID and/or a non-MBSFN region length. Alternatively, the group PMCH configuration information may include such information.

For example, according to the above-described notification scheme, the specific terminal group is notified of the group MCCH configuration information. The multicast to a specific terminal group can also be realized by providing an encryption key to the specific terminal group and encrypting data to be multicast to the specific terminal group by the encryption key. However, according to such a scheme, a terminal apparatus not belonging to the specific terminal group also attempts to receive the encrypted data. Therefore, power of the terminal apparatus is wasted, and service quality in the terminal apparatus may deteriorate. For this reason, according to the above-described notification scheme, it is possible to avoid the waste of the power of the terminal apparatus not belonging to the specific terminal group and/or the deterioration in the service quality in the terminal apparatus.

Notification Timing

First, for example, the communication control unit 263 notifies the specific terminal group of the group PMCH configuration information when the PMCH configuration information is changed. Accordingly, for example, since the terminal apparatus does not repeatedly acquire the same group PMCH configuration information, it is possible to reduce the burden on the terminal apparatus.

Second, for example, the communication control unit 263 notifies the terminal apparatus of the group PMCH configuration information when the terminal apparatus belonging to the specific terminal group is connected in the MBSFN area 30. More specifically, for example, when handover of the terminal apparatus is performed from a cell outside of the MBSFN area to a cell inside the MBSFN area, the communication control unit 263 notifies the terminal apparatus of the group PMCH configuration information. For example, when a mode of the terminal apparatus transitions from an RRC idle mode to an RRC connection mode in the cell inside the MBSFN area, the communication control unit 263 notifies the terminal apparatus of the group PMCH configuration information. Accordingly, for example, even when the specific terminal group is not repeatedly notified of the group PMCH configuration information, the terminal apparatus belonging to the specific terminal group can acquire the group PMCH configuration information quickly at the time of connection in the MBSFN area 30.

When the terminal apparatus is connected in the MBSFN area, the communication control unit 263 may notify the terminal apparatus of the group PMCH configuration information using the identification information for the terminal apparatus. The identification information may be, for example, C-RNTI. Accordingly, for example, since only the terminal apparatus connected in the MBSFN area is notified, it is possible to reduce a burden on other terminal apparatuses belonging to the specific terminal group.

As described above, the communication control unit 263 notifies the specific terminal group of the group PMCH configuration information. Accordingly, for example, the terminal apparatus belonging to the specific terminal group can specify the PMCHs for the specific terminal group and the MTCHs mapped to the PMCHs (that is, the MTCHs for the specific terminal group). That is, the multicast to the specific terminal group can be performed.

For example, the communication control unit 263 does not report the group MCCH configuration information indicating the configuration of the MCCHs disposed in the group MBSFN subframes in a system information block (for example, the SIB 13). Accordingly, for example, the terminal apparatus not belonging to the specific terminal group does not acquire the group MCCH configuration information and consequently does not acquire the group PMCH configuration information. Therefore, the multicast to only the specific terminal group can be performed.

Notification of Normal MCCH Configuration Information

For example, the communication control unit 263 notifies the terminal apparatus of the normal MCCH configuration information indicating the configuration of the MCCHs disposed in the normal MBSFN subframes. For example, the communication control unit 263 reports a system information block (for example, the SIB 13) including the normal MCCH configuration information.

Notification of Normal PMCH Configuration Information

For example, the communication control unit 263 notifies the terminal apparatus of the normal PMCH configuration information indicating the configuration of the PMCHs disposed in the normal MBSFN subframes. For example, the communication control unit 263 notifies the terminal apparatus of the normal PMCH configuration information over the MCCHs disposed in the normal MBSFN subframes.

Notification of MBSFN Subframes

For example, the communication control unit 253 notifies the terminal apparatus of the MBSFN subframes. This point is no different between the first and second embodiments. Thus, the repeated description will be omitted herein.

(Others: MBSFN Region)

The small base station 200-2 can use one format among several kinds of formats as the format of MBMS subframes of the MBSNF area 30. This point is no different between the first and second embodiments. Thus, the repeated description will be omitted herein.

4.3. Configuration of Terminal Apparatus

Figure 30:
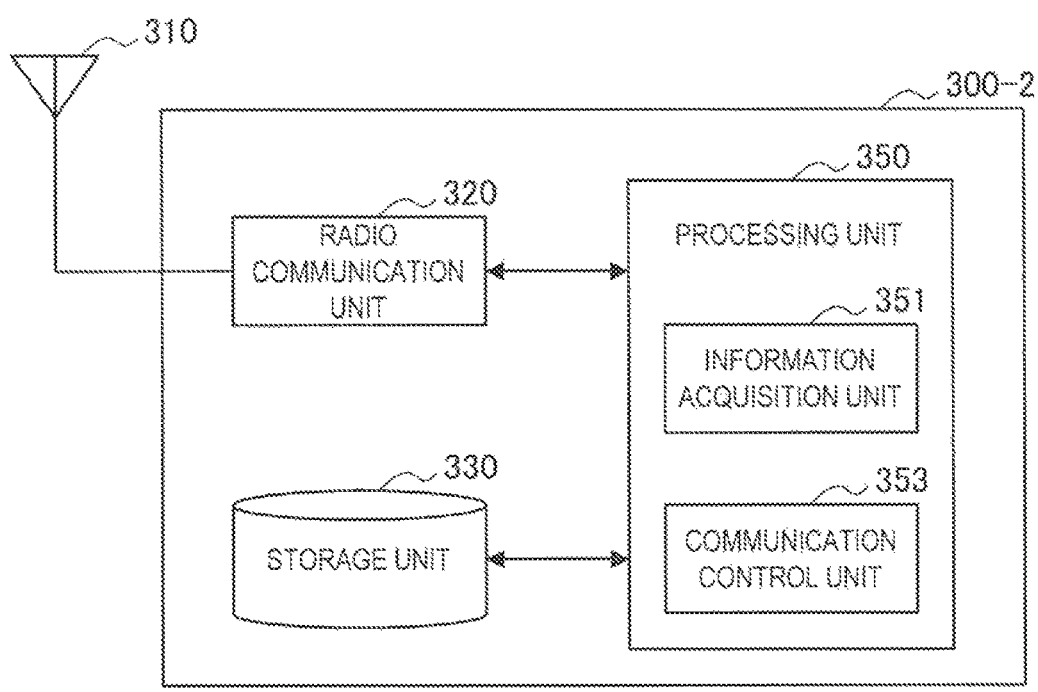
FIG. 30 is a block diagram illustrating an example of the configuration of the terminal apparatus according to the second embodiment.

Next, the configuration of a terminal apparatus 300-2 according to the second embodiment will be described with reference to FIG. 30. FIG. 30 is a block diagram illustrating an example of the configuration of the terminal apparatus 300-2 according to the second embodiment. Referring to FIG. 30, the terminal apparatus 300-2 includes an antenna unit 310, a radio communication unit 320, a storage unit 330, and a processing unit 340.

The description of the antenna unit 310, the radio communication unit 320, and the storage unit 330 are no different between the first and second embodiments (excluding differences in reference numerals). Thus, only the processing unit 350 will be described herein.

(Processing Unit 350)

The processing unit 350 supplies various functions of the terminal apparatus 300-2. The processing unit 350 includes an information acquisition unit 351 and a communication control unit 353.

(Information Acquisition Unit 351)

Acquisition of Identification Information for Specific Terminal Group

The information acquisition unit 351 acquires identification information for a specific terminal group. For example, the identification information for the specific terminal group is an RNTI for the specific terminal group (that is, the group RNTI). As described above, the terminal apparatus 300-2 belongs to the specific terminal group.

Acquisition of Identification Information for Terminal Apparatus 300-2

For example, the information acquisition unit 351 acquires the identification information for the terminal apparatus 300-2. For example, the identification information for the terminal apparatus 300-2 is the C-RNTI for the terminal apparatus 300-2.

A specific scheme of acquiring the group RNTI and the C-RNTI is no different between the first and the second embodiments. Accordingly, the repeated description will be omitted herein.

(Communication Control Unit 353)

Acquisition of Group PMCH Configuration Information

The communication control unit 353 acquires channel configuration information indicating the configuration of multicast channels disposed in the MBSFN subframes for the specific terminal group (that is, the group MBSFN subframes) using the identification information for the specific terminal group. As described above, the small base station 200-2 notifies the specific terminal group of the channel configuration information.

In particular, in the second embodiment, as described above, the multicast channel is the PMCH and the channel configuration information is the group PMCH configuration information indicating the configuration of the PMCHs disposed in the group MBSFN subframes. That is, the communication control unit 353 acquires the group PMCH configuration information using the identification information (for example, the group RNTI) for the specific terminal group.

Specific Notification Scheme

For example, the small base station 200-2 notifies the specific terminal group of the group PMCH configuration information through the DCI to be transmitted over the PDCCHs using the group RNTI. In this case, the communication control unit 353 acquires the group PMCH configuration information through the DCI to be transmitted over the PDCCHs using the group RNTI. The PDCCH may be a normal PDCCH or may be an ePDCCH.

First Example

As a first example, the small base station 200-2 notifies the specific terminal group of the resource allocation information indicating the radio resources in which the group PMCH configuration information is transmitted in the DCI to be transmitted over the PDCCHs, using the group RNTI. In this case, the communication control unit 353 acquires the resource allocation information from the DCI and acquires the group PMCH configuration information transmitted with the radio resources using the group RNTI.

More specifically, for example, the communication control unit 353 performs descrambling of the CRC bits included in the DCI transmitted with the PDCCHs using the group RNTI. As a result, when there is no error in the CRC bits, the DCI is the DCI for the specific terminal group and includes the resource allocation information indicating the radio resources in which the group PMCH configuration information is transmitted. Therefore, the communication control unit 353 acquires the resource allocation information from the DCI and acquires the group PMCH configuration information transmitted with the radio resources indicated by the resource allocation information.

The subframes in which the DCI is transmitted are, for example, the non-MBSFN subframes illustrated in FIG. 28. The DCI may include information regarding the MBSFN area ID and/or a non-MBSFN region length. The communication control unit 353 may acquire such information from the DCI. Alternatively, the group PMCH configuration information may include such information.

Second Example

As a second example, when the small base station 200-2 notifies the specific terminal group that the MCCHs are disposed in the subframes in the DCI transmitted over the PDCCHs of the subframes in which the MCCHs are disposed among the group MBSFN subframes using the group RNTI, the communication control unit 353 recognizes that the MCCHs are disposed in the subframes from the DCI using the group RNTI and acquires the group PMCH configuration information transmitted over the MCCHs in the subframes.

More specifically, for example, the communication control unit 353 performs descrambling of the CRC bits included in the DCI transmitted with the PDCCHs of the group MBSFN subframes using the group RNTI. As a result, when there is no error in the CRC bits, the DCI is the DCI for the specific terminal group and the MCCHs (that is the MCCHs for the specific terminal group) are disposed in the subframes in which the DCI is transmitted. Therefore, the communication control unit 353 acquires the group PMCH configuration information transmitted over the MCCHs disposed in the subframes.

The subframes in which the DCI is transmitted are, for example, the MBSFN subframes illustrated in FIG. 29. The DCI may include information regarding the MBSFN area ID and/or a non-MBSFN region length. The communication control unit 353 may acquire such information from the DCI. Alternatively, the group PMCH configuration information may include such information.

As described above, the communication control unit 353 acquires the group PMCH configuration information using the group RNTI. Accordingly, for example, the terminal apparatus 300-2 can specify the PMCHs for the specific terminal group and the MTCHs mapped to the PMCHs (that is, the MTCHs for the specific terminal group). Therefore, the terminal apparatus 300-2 can acquire an MBMS session to be multicast to the specific terminal group.

When the terminal apparatus 300-2 is connected in the MBSFN area 30, the small base station 200-2 may notify the terminal apparatus 300-2 of the group PMCH configuration information using the C-RNTI for the terminal apparatus 300-2. In this case, the communication control unit 353 may acquire the group PMCH configuration information using the C-RNTI for the terminal apparatus 300-2.

Acquisition of Normal MCCH Configuration Information

For example, the communication control unit 353 further acquires the normal MCCH configuration information indicating the configuration of the MCCHs disposed in the normal MBSFN subframes. The description of this point is no different between the first and second embodiments. Thus, the repeated description will be omitted herein.

Acquisition of Normal PMCH Configuration Information

For example, the communication control unit 343 further acquires the normal PMCH configuration information indicating the configuration of the PMCHs disposed in the normal MBSFN subframes. The description of this point is no different between the first and second embodiments. Thus, the repeated description will be omitted herein.

4.4. Flow of Process

Next, each process according to the second embodiment will be described with reference to FIG. 31.
(Process on Network Side)

For example, a process on a network side according to the second embodiment is the same as the process according to the first embodiment described with reference to FIG. 24.
(Process Related to Multicast)

Multicast to Specific Terminal Group

Figure 31:
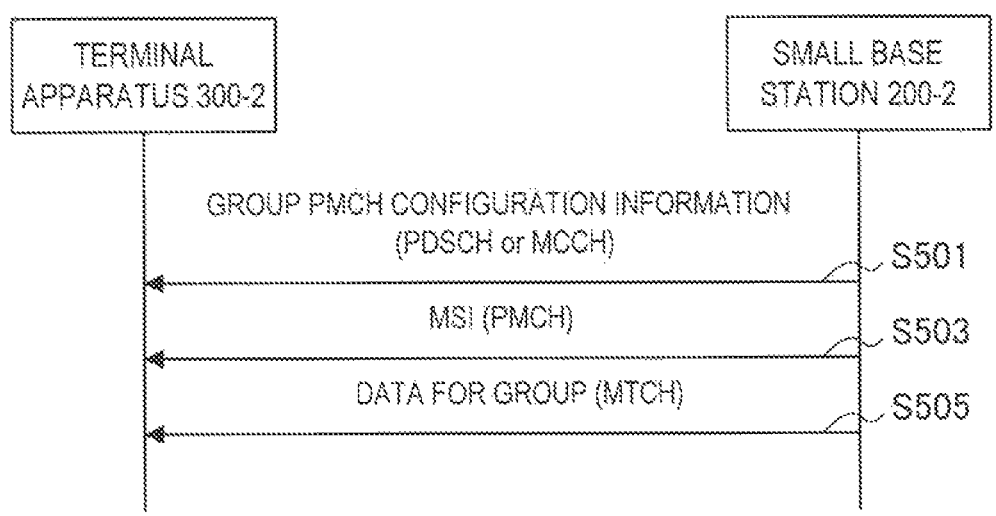
FIG. 31 is a sequence diagram illustrating an example of a schematic flow of a first process related to multicast according to the second embodiment.

FIG. 31 is a sequence diagram illustrating an example of a schematic flow of a first process related to multicast according to the second embodiment. The first process is a process related to the multicast to the specific terminal group.

In step S501, the small base station 200-2 transmits the group PMCH configuration information over the PDSCHs or the MCCHs using the group RNTI. Then, the terminal apparatus 300-2 receives and acquires the group PMCH configuration information using the group RNTI. Then, the terminal apparatus 300-2 specifies the group MBSFN subframes in which the PMCHs to which the MTCHs of a desired MBMS session are mapped are disposed.

In step S503, the small base station 200-2 transmits the MSI of the PMCH in the first subframe among the group MBSFN subframes in which the PMCHs are disposed. Then, the terminal apparatus 300-2 receives and acquires the MSI. The terminal apparatus 3002 specifies the subframes in which the MTCHs of the desired MBMS session are disposed.

In step S505, the small base station 200-2 transmits data of the desired MBMS session over the MTCHs disposed in the subframes. Then, the terminal apparatus 300-2 receives and acquires the data.

Multicast to all Terminal Apparatuses

A second process related to the multicast according to the second embodiment (that is, the process related to the multicast to all the terminal apparatuses) is the same as, for example, the process according to the first embodiment described with reference to FIG. 26.

4.5. Modification Example

According to a modification example of the second embodiment, a counting result in the terminal apparatuses belonging to the specific terminal group is acquired through an MBMS counting procedure. Then, an MBMS service to be multicast to the specific terminal group is decided based on the counting result.

The description of the modification example according to the second embodiment is the same as the description of the modification example of the first embodiment (excluding differences in reference numerals). Thus, the repeated description will be omitted herein.

The second embodiment has been described. According to the second embodiment, the specific terminal group is notified of the group PMCH configuration information indicating the configuration of the PMCHs disposed in the MBSNF subframes for the specific terminal group. Accordingly, for example, it is possible to perform the multicast to the specific terminal group.

5. Third Embodiment

Next, a third embodiment of the present disclosure will be described.

5.1. Overview

As described above, one or more MBSFN subframes are allocated to each PMCH. The one or more MBSFN subframes are further allocated to one or more MTCHs mapped to the PMCHs.

However, when the plurality of MBSFN subframes are allocated to the PMCHs, the MBSFN subframes not allocated to any MTCH can also be present among the plurality of MBSFN subframes. In this case, for example, no data is transmitted with the MBSFN subframes. In particular, since the same data is transmitted with the same radio resources by a plurality of cells in the MBSFN, for example, no data is transmitted in the MBSFN subframes in the plurality of cells. As a result, large radio resources may be wasted.

Accordingly, it is desirable to provide a structure capable of using MBSFN radio resources more efficiently.

According to the third embodiment, a small base station 200 allocates radio resources of subframes not allocated to any MTCH among the MBSFN subframes to the terminal apparatus. A terminal apparatus 300 determines whether the radio resources of the subframes are allocated to the terminal apparatus 300. Accordingly, for example, it is possible to use the MBSFN radio resources more efficiently.

5.2. Configuration of Small Base Station

Figure 32:
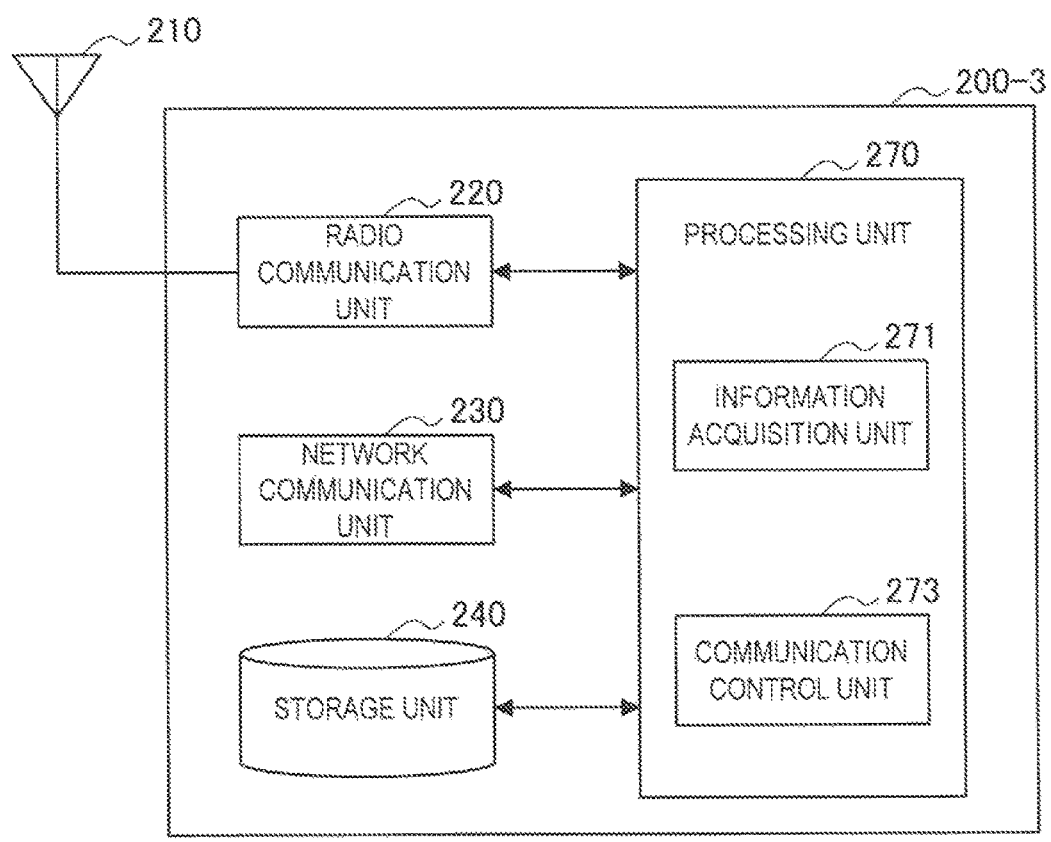
FIG. 32 is a block diagram illustrating an example of the configuration of a small base station according to a third embodiment.

Next, the configuration of a small base station 200-3 according to the third embodiment will be described with reference to FIG. 32. FIG. 32 is a block diagram illustrating an example of the configuration of the small base station 200-3 according to the third embodiment. Referring to FIG. 32, the small base station 200-3 includes an antenna unit 210, a radio communication unit 220, a network communication unit 230, a storage unit 240, and a processing unit 270.

The description of the antenna unit 210, the radio communication unit 220, the network communication unit 230, and the storage unit 240 are no different between the first (or second) embodiment and third embodiments (excluding differences in reference numerals). Thus, only the processing unit 270 will be described herein.

(Processing Unit 260)

The processing unit 270 supplies various functions of the small base station 200-3. The processing unit 270 includes an information acquisition unit 271 and a communication control unit 273.

(Information Acquisition Unit 271)

The information acquisition unit 271 acquires information (hereinafter referred to as "vacant subframe information") indicating subframes not allocated to any MTCH (hereinafter referred to as "vacant subframes") among the MBSFN subframes.

For example, in regard to each PMCH, information (for example, a PMCH information list) indicating one or more MBSFN subframes allocated to the PMCHs and one or more MTCHs mapped to the PMCHs is stored in the storage unit 240. Information indicating the MBSFN subframes allocated to the one or more MTCHs among the one or more MBSFN subframes is stored in the storage unit 240. For example, the subframes not allocated to any MTCH (that is, the vacant subframes) among the MBSFN subframes are specified based on such information. Then, information indicating the vacant subframes (that is, the vacant subframe information) is stored in the storage unit 240. The information acquisition unit 271 acquires the vacant subframe information from the storage unit 240.

Referring back to FIG. 9, for example, the final subframe among the MBSFN subframes allocated to the PMCH 1 during the CSA period 2 is not allocated to any MTCH. The final two subframes among the MBSFN subframes allocated to the PMCH 3 during the CSA period 2 are not allocated to any MTCH either. Such subframes are specified as vacant subframes and vacant subframe information indicating these subframes is acquired.

(Communication Control Unit 273)

Allocation of Vacant Subframes

The communication control unit 273 allocates the radio resources of the subframes not allocated to any MTCH (that is, the vacant subframes) among the MBSFN subframes to a terminal apparatus. That is, the radio resources of the vacant subframes are allocated for unicast.

Referring back to FIG. 9, as described above, for example, the final subframe among the MBSFN subframes allocated to the PMCH 1 during the CSA period 2 is the vacant subframe. Thus, the communication control unit 273 allocates the radio resources (for example, the resource blocks) of this subframe to one or more terminal apparatuses. As described above, for example, the final two subframes among the MBSFN subframes allocated to the PMCH 3 during the CSA period 2 are the vacant subframes. Thus, the communication control unit 273 allocates the radio resources (for example, the resource blocks) of these subframes to one or more terminal apparatuses.

Accordingly, for example, it is possible to use MBSFN radio resources more efficiently.

Since MBSFN transmission is not performed in the vacant subframes, the MBSFN-RS may not be disposed in the vacant subframes. The CRS may be disposed in the vacant subframes.

Notification of Vacant Subframe Information

The communication control unit 273 may notify the terminal apparatus of the vacant subframes. As one example, the communication control unit 273 may notify the terminal apparatus of the vacant subframe information in the MBSFN area configuration message. As another example, the communication control unit 273 may notify the terminal apparatus of the vacant subframe information in the system information block (for example, the SIB 13). Accordingly, for example, the terminal apparatus can more easily use the vacant subframes.

5.3. Configuration of Terminal Apparatus

Figure 33:
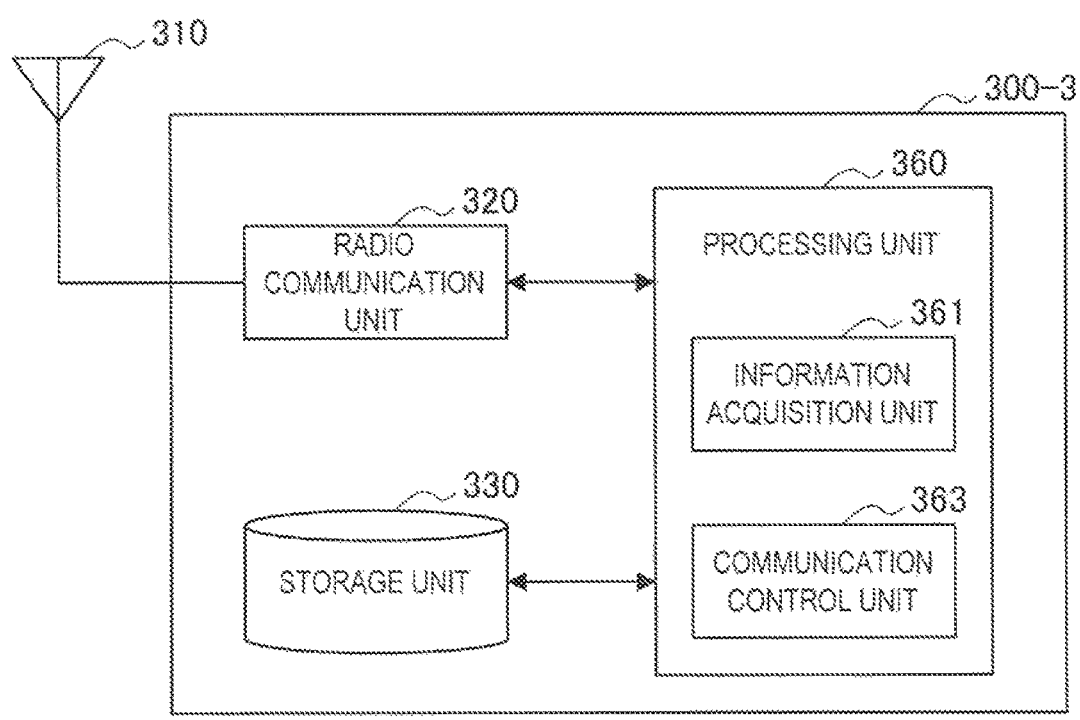
FIG. 33 is a block diagram illustrating an example of the configuration of the terminal apparatus according to the third embodiment.

Next, the configuration of the terminal apparatus 300-3 according to the third embodiment will be described with reference to FIG. 33. FIG. 33 is a block diagram illustrating an example of the configuration of the terminal apparatus 300-3 according to the third embodiment. Referring to FIG. 33, the terminal apparatus 300-3 includes an antenna unit 310, a radio communication unit 320, a storage unit 330, and a processing unit 360.

The description of the antenna unit 310, the radio communication unit 320, and the storage unit 330 are no different between the first (or second) and third embodiments (excluding differences in reference numerals). Thus, only the processing unit 360 will be described herein.
(Processing Unit 360)

The processing unit 360 supplies various functions of the terminal apparatus 300-3. The processing unit 360 includes an information acquisition unit 361 and a communication control unit 363.
(Information Acquisition Unit 361)

The information acquisition unit 361 acquires the information (that is, the vacant subframe information) indicating the subframes not allocated to any MTCH (that is, the vacant subframes) among the MBSFN subframes.

For example, the information acquisition unit 361 acquires the MSI of the PMCHs disposed in the MBSFN subframes and specifies the subframes not allocated to any MTCH (that is, the vacant subframes) among the MBSFN subframes from the MSI. The information acquisition unit 361 acquires the vacant subframe information indicating the vacant subframes by specifying the vacant subframes in this way.

The small base station 200-3 may notify the vacant subframe information to the terminal apparatus. The information acquisition unit 361 may acquire the vacant subframe information.
(Communication Control Unit 363)

The communication control unit 363 determines whether the radio resources of the subframes not allocated to any MTCH (that is, the vacant subframes) among the MBSFN subframes are allocated to the terminal apparatus 300-3.

For example, the communication control unit 363 performs descrambling of the CRC bits included in the DCI transmitted with the PDCCHs of the vacant subframes. As a result, when there is no error in the CRC bits, the communication control unit 363 determines that the radio resources of the vacant subframes are allocated to the terminal apparatus 300-3. Then, the communication control unit 363 acquires the resource allocation information included in the DCI and acquires information transmitted with the radio resources indicated by the resource allocation information (that is, information destined for the terminal apparatus 300-3). When there is no error in the CRC bits, the information acquisition unit 3631 determines that the radio resources of the vacant subframes are not allocated to the terminal apparatus 300-3.

Accordingly, for example, it is possible to use MBSFN radio resources more efficiently.

5.4. Flow of Process

Figure 34:
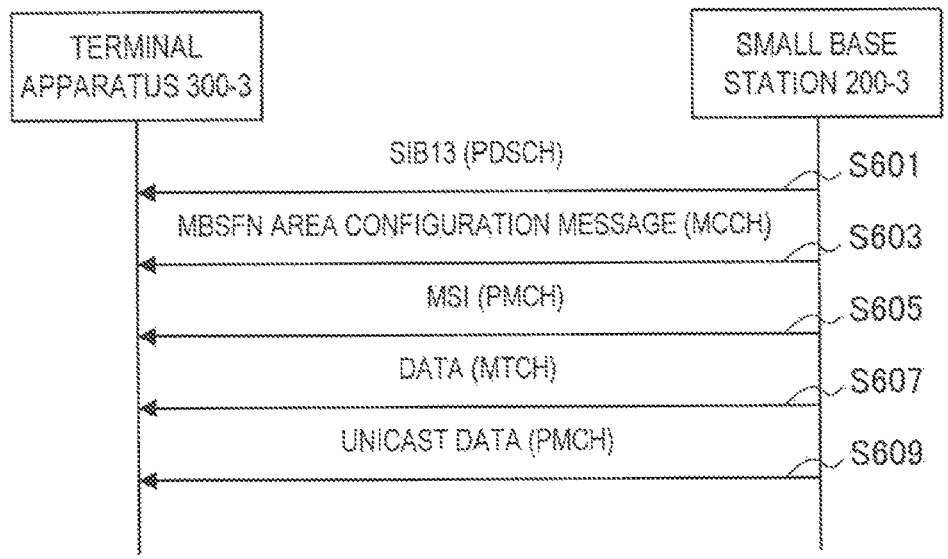
FIG. 34 is a sequence diagram illustrating an example of a schematic flow of a process according to the third embodiment.

Next, a process according to the third embodiment will be described with reference to FIG. 34. FIG. 34 is a sequence diagram illustrating an example of a schematic flow of the process according to the third embodiment.

In step S601, the small base station 200-3 transmits the SIB 13 over the PDSCH. Then, the terminal apparatus 300-3 receives and acquires the SIB 13. The terminal apparatus 300-3 specifies the MBSFN subframes in which the MCCHs are disposed.

In step S603, the small base station 200-3 transmits the MBSFN area configuration message over the MCCHs disposed in the MBSFN subframes. Then, the terminal apparatus 300-3 receives and acquires the MBSFN area configuration message. The terminal apparatus 300-3 specifies the MBSFN subframes in which the PMCHs to which the MTCHs of a desired MBMS session are mapped are disposed.

In step S605, the small base station 200-3 transmits the MSI of the PMCH in the first subframe among the MBSFN subframes in which the PMCHs are disposed. Then, the terminal apparatus 300-3 receives and acquires the MSI. The terminal apparatus 300-3 specifies the subframes in which the MTCHs of the desired MBMS session are disposed. The terminal apparatus 300-3 also specifies the vacant subframes in which no MTCH is disposed.

In step S607, the small base station 200-3 transmits data of the desired MBMS session over the MTCHs disposed in the subframes. Then, the terminal apparatus 300-3 receives and acquires the data.

In step S609, the small base station 200-3 allocates the radio resources of the vacant subframes to the terminal apparatus and transmits information destined for the terminal apparatus with the radio resources (that is, the radio resources of the PMCHs) in the vacant subframes. Then, the terminal apparatus 300-3 determines whether the radio resources of the vacant subframes are allocated to the terminal apparatus 300-3. When the radio resources are allocated to the terminal apparatus 300-3, information transmitted with the radio resources (that is, the information destined for the terminal apparatus 300-3) is acquired.

5.5. Modification Example

Next, a modification example of the third embodiment will be described. According to the modification example of the third embodiment, multicast to a specific terminal group is performed as in the first and second embodiments. The small base station 200-3 allocates the radio resources of the subframes not allocated to any MTCH among the MBSFN subframes for the specific terminal group to a terminal apparatus belonging to the specific terminal group. The terminal apparatus 300-3 belonging to the specific terminal group determines whether the radio resources of the subframes are allocated to the terminal apparatus 300-3. Accordingly, for example, it is possible to use MBSFN radio resources more efficiently.
(Small Base Station 200-3: Information Acquisition Unit 271)

The information acquisition unit 271 acquires information (hereinafter referred to as vacant subframe information)

indicating the subframes not allocated to any MTCH (that is, the vacant subframes) among the MBSFN subframes for the specific group.

For example, information (for example, a PMCH information list) indicating one or more MBSFN subframes allocated to the PMCHs for the specific terminal group and one or more MTCHs mapped to the PMCHs is stored in the storage unit 240. Information indicating the group MBSFN subframes allocated to the one or more MTCHs among the one or more MBSFN subframes is stored in the storage unit 240. For example, the subframes not allocated to any MTCH (that is, the vacant subframes) among the MBSFN subframes are specified based on such information. Then, information indicating the vacant subframes (that is, the vacant subframe information) is stored in the storage unit 240. The information acquisition unit 271 acquires the vacant subframe information from the storage unit 240.

Referring back to FIG. 17, for example, the final three subframes among the MBSFN subframes allocated to the PMCH 3 (the PMCH for the specific terminal group) during the CSA period 2 is not allocated to any MTCH. The final six subframes among the group MBSFN subframes allocated to the PMCH 3 during the CSA period 4 are not allocated to any MTCH either. Such subframes are specified as vacant subframes and vacant subframe information indicating these subframes is acquired.

(Small Base Station 200-3: Communication Control Unit 273)

Allocation of Vacant Subframes

The communication control unit 273 allocates the radio resources of the subframes not allocated to any MTCH (that is, the vacant subframes) among the group MBSFN subframes to a terminal apparatus belonging to the specific terminal group. That is, the radio resources of the vacant subframes are allocated for unicast.

Referring back to FIG. 17, as described above, for example, the final three subframes among the group MBSFN subframes allocated to the PMCH 3 (the PMCH for the specific terminal group) during the CSA period 2 are the vacant subframes. Thus, the communication control unit 273 allocates the radio resources (for example, the resource blocks) of these subframes to one or more terminal apparatuses belonging to the specific terminal group. As described above, for example, the final six subframes among the group MBSFN subframes allocated to the PMCH 3 during the CSA period 4 are the vacant subframes. Thus, the communication control unit 273 allocates the radio resources (for example, the resource blocks) of these subframes to one or more terminal apparatuses belonging to the specific terminal group.

Since MBSFN transmission is not performed in the vacant subframes, the MBSFN-RS may not be disposed in the vacant subframes. The CRS may be disposed in the vacant subframes.

Notification of Vacant Subframe Information

The communication control unit 273 may notify the terminal apparatus of the specific terminal group of the vacant subframe information. As one example, the communication control unit 273 may notify the specific terminal group of the vacant subframe information in the group MCCH configuration information or the group PMCH configuration information described in the first and second embodiments.

(Terminal Apparatus 300-3: Information Acquisition Unit 361)

The information acquisition unit 361 acquires the information (that is, the vacant subframe information) indicating the subframes not allocated to any MTCH (that is, the vacant subframes) among the group MBSFN subframes.

For example, the information acquisition unit 361 acquires the MSI of the PMCHs disposed in the group MBSFN subframes and specifies the subframes not allocated to any MTCH (that is, the vacant subframes) among the group MBSFN subframes from the MSI. The information acquisition unit 361 acquires the vacant subframe information indicating the vacant subframes by specifying the vacant subframes in this way.

The small base station 200-3 may notify the vacant subframe information to the terminal apparatus. The information acquisition unit 361 may acquire the vacant subframe information.

(Terminal Apparatus 300-3: Communication Control Unit 363)

The communication control unit 363 determines whether the radio resources of the subframes not allocated to any MTCH (that is, the vacant subframes) among the group MBSFN subframes are allocated to the terminal apparatus 300-3.

In the modification example of the third embodiment, the vacant subframes are the group MBSFN subframes, but a specific determination scheme is the same as the scheme described as the example in the third embodiments before the modification example. Thus, the repeated description will be omitted herein.

(Flow of Process)

Figure 35:
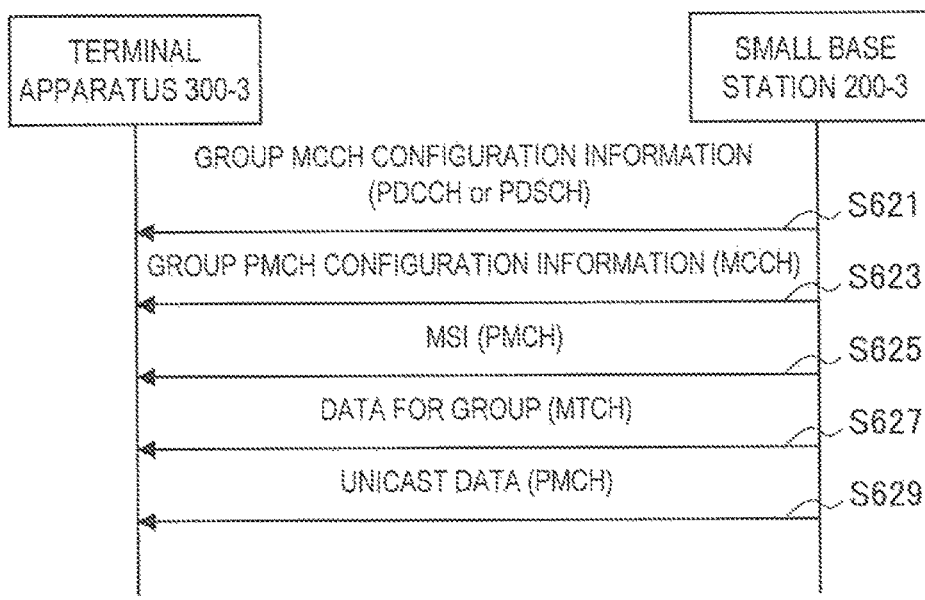
FIG. 35 is a sequence diagram illustrating an example of a schematic flow of a process according to a modification example of the third embodiment.

FIG. 35 is a sequence diagram illustrating an example of a schematic flow of a process according to the modification example of the third embodiment.

In step S621, the small base station 200-3 transmits the group MCCH configuration information over the PDCCHs or the PDSCHs using the group RNTI. Then, the terminal apparatus 300-3 receives and acquires the group MCCH configuration information using the group RNTI. Then, the terminal apparatus 300-3 specifies the group MBSFN subframes in which the MCCHs are disposed.

In step S623, the small base station 200-3 transmits the group PMCH configuration information (for example, the MBSFN area configuration message) over the MCCHs disposed in the group MBSFN subframes. Then, the terminal apparatus 300-3 receives and acquires the group PMCH configuration information. The terminal apparatus 300-3 specifies the group MBSFN subframes in which the PMCHs to which the MTCHs of a desired MBMS session are mapped are disposed.

In step S625, the small base station 200-3 transmits the MSI of the PMCH in the first subframe among the group MBSFN subframes in which the PMCHs are disposed. Then, the terminal apparatus 300-3 receives and acquires the MSI. The terminal apparatus 300-3 specifies the subframes in which the MTCHs of the desired MBMS session are disposed. The terminal apparatus 300-3 also specifies the vacant subframes in which no MTCH is disposed.

In step S627, the small base station 200-3 transmits data of the desired MBMS session over the MTCHs disposed in the subframes. Then, the terminal apparatus 300-3 receives and acquires the data.

In step S629, the small base station 200-3 allocates the radio resources of the vacant subframes to the terminal apparatus and transmits the information destined for the terminal apparatus with the radio resources (that is, the radio resources of the PMCHs) in the vacant subframes. Then, the terminal apparatus 300-3 determines whether the radio resources of the vacant subframes are allocated to the terminal apparatus 300-3. When the radio resources are allocated to the terminal apparatus 300-3, the information (that is, the information destined for the terminal apparatus 300-3) transmitted with the radio resources is acquired.

The example of the process described above is an example in which the MCCH configuration information or the like is transmitted as in the first embodiment. However, a process according to the modification example of the third embodiment is not limited to this process. Of course, as another example of the process according to the modification example of the third embodiment, the PMCH configuration information or the like may be transmitted as in the second embodiment.

The allocation of the radio resources of the vacant subframes of the group MBSFN subframes to the terminal apparatus belonging to the specific terminal group has been described above according to the modification example of the third embodiment. Of course, even in the modification example of the third embodiment, the radio resources of the vacant subframes of the normal MBSFN subframes may be allocated to the terminal apparatus.

The third embodiment has been described above. The information acquisition unit 271 and the communication control unit 273 of the small base station 200-3 according to the third embodiment may further perform the same operations as the operations of the information acquisition unit 251 and the communication control unit 253 according to the first embodiment. The information acquisition unit 361 and the communication control unit 363 of the terminal apparatus 300-3 according to the third embodiment may further perform the same operations as the operations of the information acquisition unit 341 and the communication control unit 343 according to the first embodiment. Alternatively, the information acquisition unit 271 and the communication control unit 273 of the small base station 200-3 according to the third embodiment may further perform the same operations as the operations of the information acquisition unit 261 and the communication control unit 263 according to the second embodiment. The information acquisition unit 361 and the communication control unit 363 of the terminal apparatus 300-3 according to the third embodiment may further perform the same operations as the operations of the information acquisition unit 351 and the communication control unit 353 according to the second embodiment.

6. Application Examples

The technology of the present disclosure is applicable to various products. For example, a control apparatus 100 may be realized as any type of server such as a tower server, a rack server, and a blade server. At least a part of constituent elements of the control apparatus 100 may be realized as a module (such as an integrated circuit module including a single die, and a card or a blade that is inserted into a slot of a blade server) mounted on a server.

For example, the small base station 200 may be realized as an evolved node B (eNB). In particular, the small base station 200 may be a small eNB that covers a smaller cell than a macro cell. As one example, the small base station 200 may be a home (femto) eNB. As another example, the small base station 200 may be a pico eNB or a micro eNB. Instead, the small base station 200 may be realized as any other types of base stations such as a NodeB and a base transceiver station (BTS). The small base station 200 may include a main body (that is also referred to as a base station apparatus) configured to control radio communication, and one or more remote radio heads (RRH) disposed in a different place from the main body. Additionally, various types of terminals to be discussed later may also operate as the small base station 200 by temporarily or semi-permanently executing a base station function.

For example, a terminal apparatus 300 may be realized as a mobile terminal such as a smartphone, a tablet personal computer (PC), a notebook PC, a portable game terminal, a portable/dongle type mobile router, and a digital camera, or an in-vehicle terminal such as a car navigation apparatus. At least a part of constituent elements of the terminal apparatus 300 may also be realized as a terminal (that is also referred to as a machine type communication (MTC) terminal) that performs machine-to-machine (M2M) communication. Furthermore, the terminal apparatus 300 may be a radio module (such as an integrated circuit module including a single die) mounted on each of the terminals.

6.1. Application Example Regarding Control Apparatus

Figure 36:
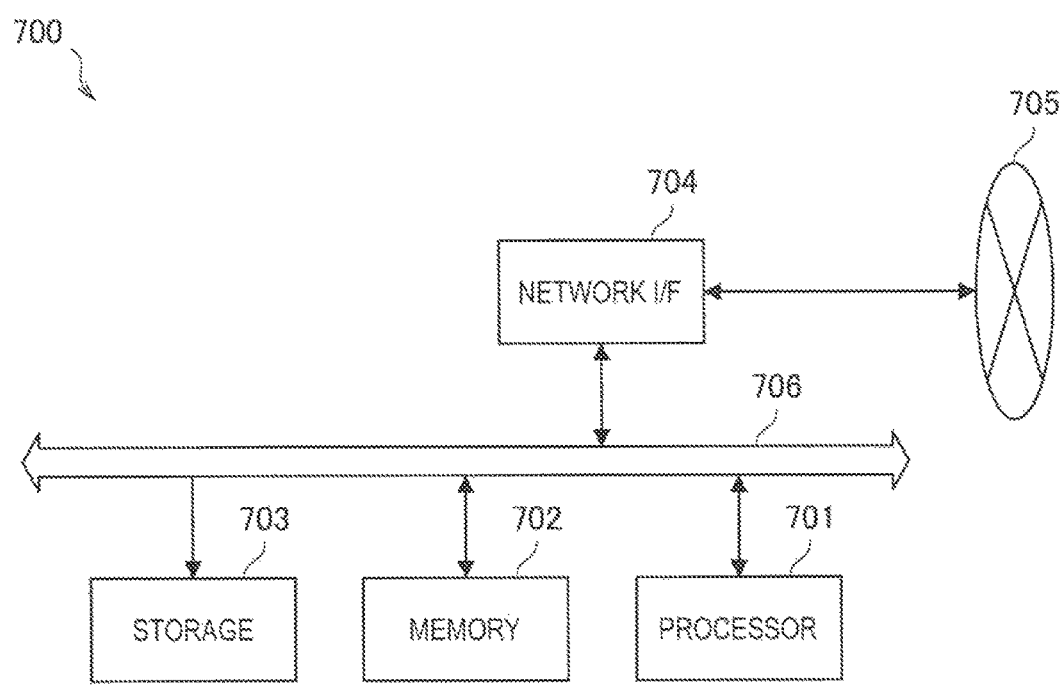
FIG. 36 is a block diagram illustrating an example of a schematic configuration of a server.

FIG. 36 is a block diagram illustrating an example of a schematic configuration of a server 700 to which the technology of the present disclosure may be applied. The server 700 includes a processor 701, a memory 702, a storage 703, a network interface 704, and a bus 706.

The processor 701 may be, for example, a central processing unit (CPU) or a digital signal processor (DSP), and controls functions of the server 700. The memory 702 includes random access memory (RAM) and read only memory (ROM), and stores a program that is executed by the processor 701 and data. The storage 703 may include a storage medium such as a semiconductor memory and a hard disk.

The network interface 704 is a wired communication interface for connecting the server 700 to a wired communication network 705. The wired communication network 705 may be a core network such as an Evolved Packet Core (EPC), or a packet data network (PDN) such as the Internet.

The bus 706 connects the processor 701, the memory 702, the storage 703, and the network interface 704 to each other. The bus 706 may include two or more buses (such as a high speed bus and a low speed bus) each of which has different speed.

In the server 700 illustrated in FIG. 36, the decision unit 131 and the notification unit 133 described with reference to FIG. 14 may be implemented in the processor 701. As one example, a program causing the processor to function as the decision unit 131 and the notification unit 133 (in other words, a program causing the processor to perform the operations of the decision unit 131 and the notification unit 133) may be installed in the server 700 so that the processor 701 can execute the program. As another example, in the server 700, a module including the processor 701 and the memory 702 may be mounted and the decision unit 131 and the notification unit 133 may be implemented in the module. In this case, the module may store a program causing the processor to function as the decision unit 131 and the notification unit 133 in the memory 702 and the processor 701 may execute the program. As described above, the server 700 or the module may be provided as an apparatus including the decision unit 131 and the notification unit 133 or the program causing the processor to function as the decision unit 131 and the notification unit 133 may be provided. A readable storage medium storing the program may be provided.

6.2. Application Examples Regarding Base Station

First Application Example

Figure 37:
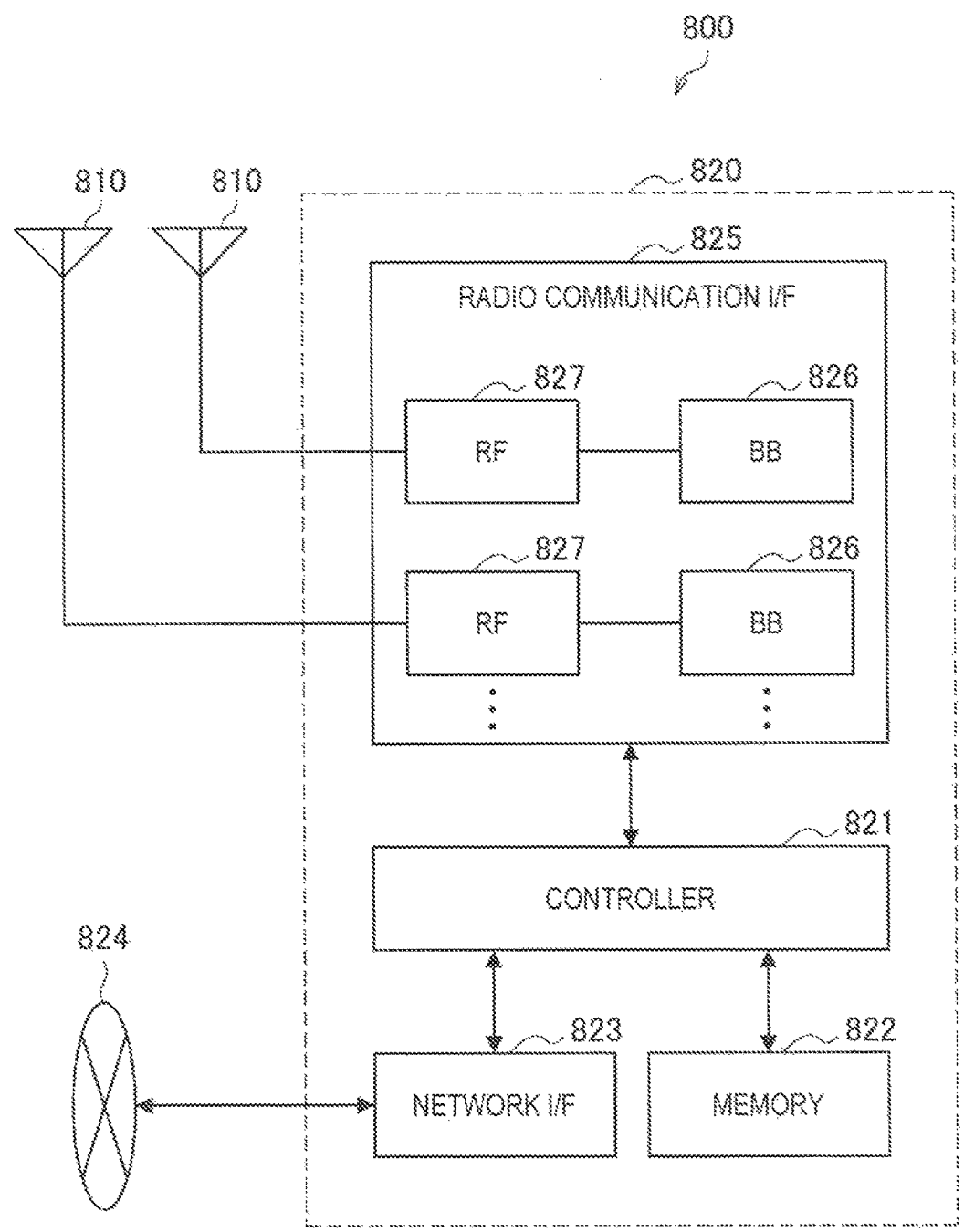
FIG. 37 is a block diagram illustrating a first example of a schematic configuration of an eNB.

FIG. 37 is a block diagram illustrating a first example of a schematic configuration of an eNB to which the technology of the present disclosure may be applied. An eNB 800 includes one or more antennas 810 and a base station apparatus 820. Each antenna 810 and the base station apparatus 820 may be connected to each other via an RF cable.

Each of the antennas 810 includes a single or multiple antenna elements (such as multiple antenna elements included in an MIMO antenna), and is used for the base station apparatus 820 to transmit and receive radio signals. The eNB 800 may include the multiple antennas 810, as illustrated in FIG. 37. For example, the multiple antennas 810 may be compatible with multiple frequency bands used by the eNB 800. Although FIG. 37 illustrates the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station apparatus 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as Long Term Evolution (LTE) and LTE-Advanced, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 37. For example, the multiple BB processors 826 may be compatible with multiple frequency bands used by the eNB 800. The radio communication interface 825 may include the multiple RF circuits 827, as illustrated in FIG. 37. For example, the multiple RF circuits 827 may be compatible with multiple antenna elements. Although FIG. 37 illustrates the example in which the radio communication interface 825 includes the multiple BB processors 826 and the multiple RF circuits 827, the radio communication interface 825 may also include a single BB processor 826 or a single RF circuit 827.

In the eNB 800 illustrated in FIG. 37, the information acquisition unit 251 and the communication control unit 253 described with reference to FIG. 18 may be implemented in the radio communication interface 825. Alternatively, at least a part of constituent elements may be implemented in the controller 821. As one example, in the eNB 800, a part (for example, the BB processor 826) or all of the radio communication interface 825 and/or a module including the controller 821 may be mounted, and the information acquisition unit 251 and the communication control unit 253 may be implemented in the module. In this case, the module may store a program causing the processor to function as the information acquisition unit 251 and the communication control unit 253 (in other words, a program causing the processor to perform the operations of the information acquisition unit 251 and the communication control unit 253) and may execute the program. As another example, a program causing the processor to function as the information acquisition unit 251 and the communication control unit 253 may be installed in the eNB 800, and the radio communication interface 825 (for example, the BB processor 826) and/or the controller 821 may execute the program. As described above, the eNB 800, the base station apparatus 820, or the module may be provided as an apparatus including the information acquisition unit 251 and the communication control unit 253, or a program causing the processor to function as the information acquisition unit 251 and the communication control unit 253 may be provided. A readable storage medium storing the program may be provided. In regard to this point, the information acquisition unit 261 and the communication control unit 263 described with reference to FIG. 27 and the information acquisition unit 271 and the communication control unit 273 described with reference to FIG. 32 are the same as the information acquisition unit 251 and the communication control unit 253.

Second Application Example

Figure 38:
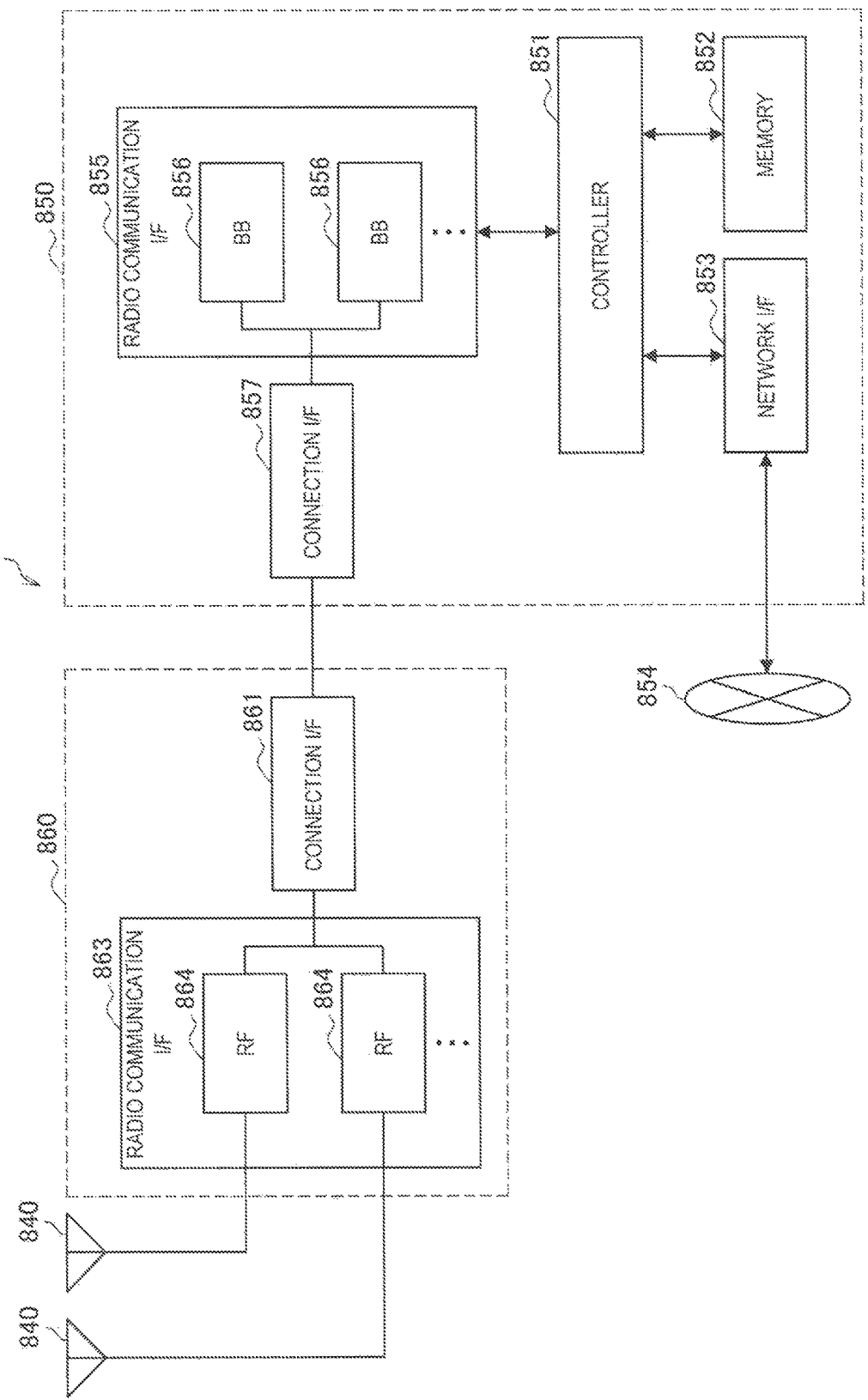
FIG. 38 is a block diagram illustrating a second example of a schematic configuration of an eNB.

FIG. 38 is a block diagram illustrating a second example of a schematic configuration of an eNB to which the technology of the present disclosure may be applied. An eNB 830 includes one or more antennas 840, a base station apparatus 850, and an RRH 860. Each antenna 840 and the RRH 860 may be connected to each other via an RF cable. The base station apparatus 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 38. For example, the multiple antennas 840 may be compatible with multiple frequency bands used by the eNB 830. Although FIG. 38 illustrates the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 37.

The radio communication interface 855 supports any cellular communication scheme such as LTE and LTE-Advanced, and provides radio communication to a terminal positioned in a sector corresponding to the RRH 860 via the RRH 860 and the antenna 840. The radio communication interface 855 may typically include, for example, a BB processor 856. The BB processor 856 is the same as the BB processor 826 described with reference to FIG. 37, except the BB processor 856 is connected to the RF circuit 864 of the RRH 860 via the connection interface 857. The radio communication interface 855 may include the multiple BB processors 856, as illustrated in FIG. 38. For example, the multiple BB processors 856 may be compatible with multiple frequency bands used by the eNB 830. Although FIG. 38 illustrates the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives radio signals via the antenna 840. The radio communication interface 863 may typically include, for example, the RF circuit 864. The RF circuit 864 may include, for example, a mixer, a filter, and an amplifier, and transmits and receives radio signals via the antenna 840. The radio communication interface 863 may include multiple RF circuits 864, as illustrated in FIG. 38. For example, the multiple RF circuits 864 may support multiple antenna elements. Although FIG. 38 illustrates the example in which the radio communication interface 863 includes the multiple RF circuits 864, the radio communication interface 863 may also include a single RF circuit 864.

In the eNB 830 illustrated in FIG. 38, the information acquisition unit 251 and the communication control unit 253 described with reference to FIG. 18 may be implemented in the radio communication interface 855 and/or the radio communication interface 863. Alternatively, at least a part of constituent elements may be implemented in the controller 851. As one example, in the eNB 830, a module including a part (for example, the BB processor 856) or all of the radio communication interface 855 and/or the controller 851 may be mounted, and the information acquisition unit 251 and the communication control unit 253 may be implemented in the module. In this case, the module may store a program causing the processor to function as the information acquisition unit 251 and the communication control unit 253 (in other words, a program causing the processor to perform the operations of the information acquisition unit 251 and the communication control unit 253) and may execute the program. As another example, a program causing the processor to function as the information acquisition unit 251 and the communication control unit 253 may be installed in the eNB 830, and the radio communication interface 855 (for example, the BB processor 856) and/or the controller 851 may execute the program. As described above, the eNB 830, the base station apparatus 850, or the module may be provided as an apparatus including the information acquisition unit 251 and the communication control unit 253, or a program causing the processor to function as the information acquisition unit 251 and the communication control unit 253 may be provided. A readable storage medium storing the program may be provided. In regard to this point, the information acquisition unit 261 and the communication control unit 263 described with reference to FIG. 27 and the information acquisition unit 271 and the communication control unit 273 described with reference to FIG. 32 are the same as the information acquisition unit 251 and the communication control unit 253.

4-3. Application Examples Regarding Terminal Apparatus

First Application Example

Figure 39:
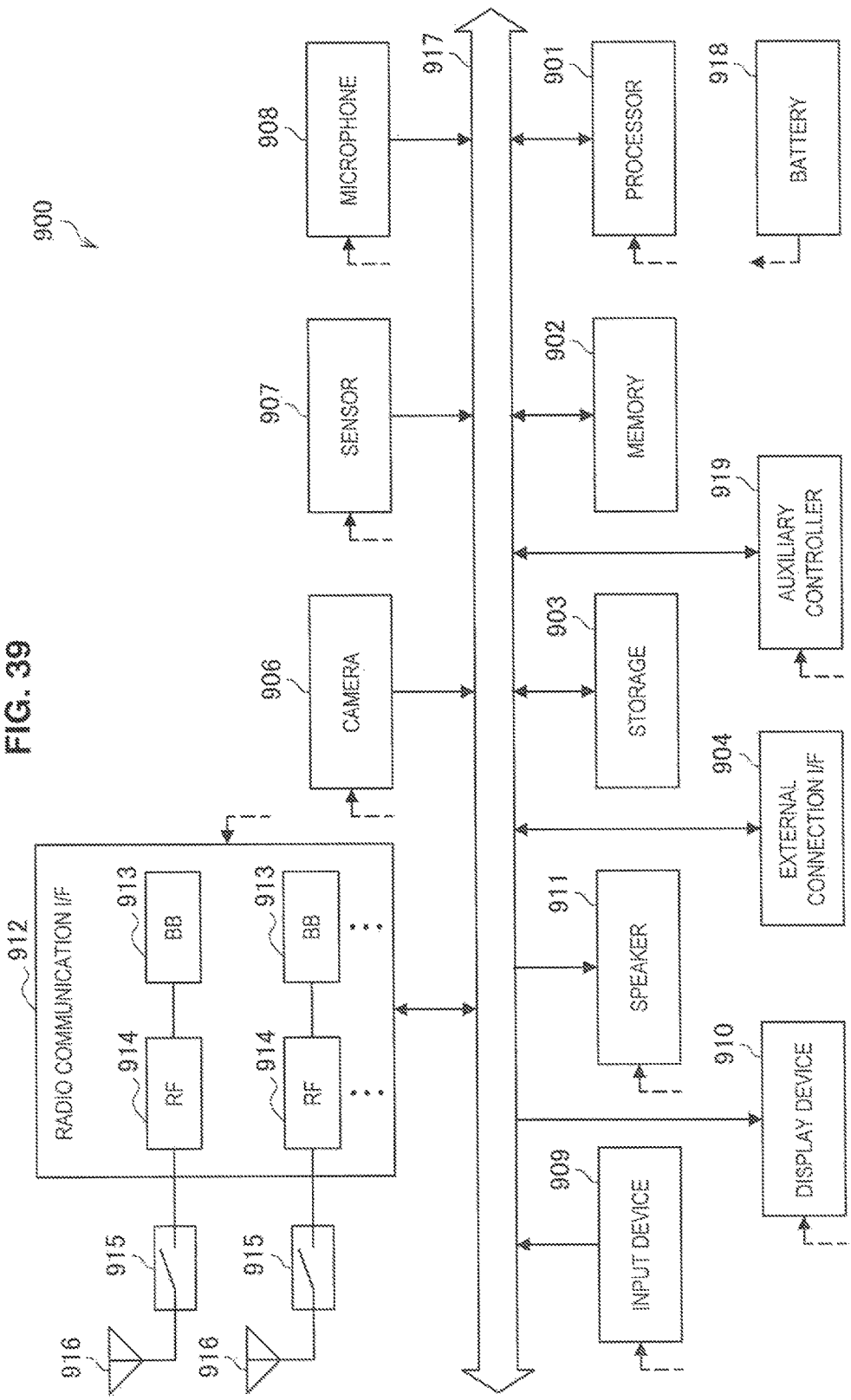
FIG. 39 is a block diagram illustrating an example of a schematic configuration of a smartphone.

FIG. 39 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image.

The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LTE and LTE-Advanced, and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 912 may also be a one chip module that has the BB processor 913 and the RF circuit 914 integrated thereon. The radio communication interface 912 may include the multiple BB processors 913 and the multiple RF circuits 914, as illustrated in FIG. 39. Although FIG. 39 illustrates the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of radio communication scheme such as a short-distance wireless communication scheme, a near field communication scheme, and a radio local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements included in an MIMO antenna), and is used for the radio communication interface 912 to transmit and receive radio signals. The smartphone 900 may include the multiple antennas 916, as illustrated in FIG. 39. Although FIG. 39 illustrates the example in which the smartphone 900 includes the multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 39 via feeder lines, which are partially shown as dashed lines in the figure. The auxiliary controller 919 operates a minimum necessary function of the smartphone 900, for example, in a sleep mode.

In the smartphone 900 illustrated in FIG. 39, the information acquisition unit 341 and the communication control unit 343 described with reference to FIG. 23 may be implemented in the radio communication interface 912. Alternatively, at least a part of constituent elements may be implemented in the processor 901 in the auxiliary controller 919. As one example, in the smartphone 900, a module including a part (for example, the BB processor 913) or all of the radio communication interface 912, the processor 901, and/or the auxiliary controller 919 may be mounted, and the information acquisition unit 341 and the communication control unit 343 may be implemented in the module. In this case, the module may store a program causing the processor to function as the information acquisition unit 341 and the communication control unit 343 (in other words, a program causing the processor to perform the operations of the information acquisition unit 341 and the communication control unit 343) and may execute the program. As another example, a program causing the processor to function as the information acquisition unit 341 and the communication control unit 343 may be installed in the smartphone 900, and the radio communication interface 912 (for example, the BB processor 913), the processor 901, and/or the auxiliary controller 919 may execute the program. As described above, the smartphone 900 or the module may be provided as an apparatus including the information acquisition unit 341 and the communication control unit 343, or a program causing the processor to function as the information acquisition unit 341 and the communication control unit 343 may be provided. A readable storage medium storing the program may be provided. In regard to this point, the information acquisition unit 351 and the communication control unit 353 described with reference to FIG. 30 and the information acquisition unit 361 and the communication control unit 363 described with reference to FIG. 33 are the same as the information acquisition unit 341 and the communication control unit 343.

Second Application Example

Figure 40:
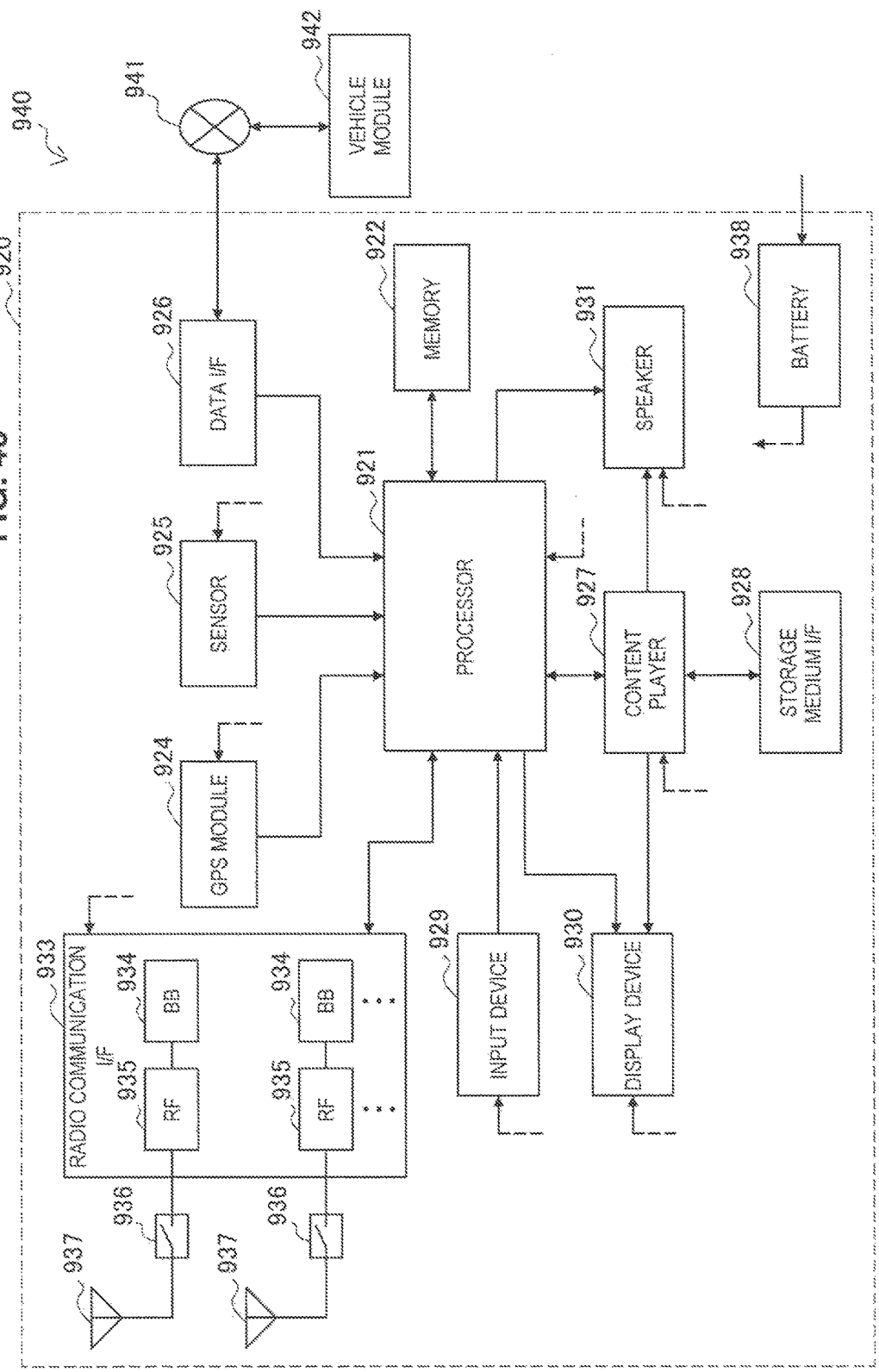
FIG. 40 is a block diagram illustrating an example of a schematic configuration of a car navigation apparatus.

FIG. 40 is a block diagram illustrating an example of a schematic configuration of a car navigation apparatus 920 to which the technology of the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and another function of the car navigation apparatus 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation apparatus 920. The sensor 925 may include a group of sensors such as a gyro sensor, a geomagnetic sensor, and an air pressure sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The radio communication interface 933 supports any cellular communication scheme such as LTE and LTE-Advanced, and performs radio communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may be a one chip module having the BB processor 934 and the RF circuit 935 integrated thereon. The radio communication interface 933 may include the multiple BB processors 934 and the multiple RF circuits 935, as illustrated in FIG. 40. Although FIG. 40 illustrates the example in which the radio communication interface 933 includes the multiple BB processors 934 and the multiple RF circuits 935, the radio communication interface 933 may also include a single BB processor 934 or a single RF circuit 935.

Furthermore, in addition to a cellular communication scheme, the radio communication interface 933 may support another type of radio communication scheme such as a short-distance wireless communication scheme, a near field communication scheme, and a radio LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements (such as multiple antenna elements included in an MIMO antenna), and is used for the radio communication interface 933 to transmit and receive radio signals. The car navigation apparatus 920 may include the multiple antennas 937, as illustrated in FIG. 40. Although FIG. 40 illustrates the example in which the car navigation apparatus 920 includes the multiple antennas 937, the car navigation apparatus 920 may also include a single antenna 937.

Furthermore, the car navigation apparatus 920 may include the antenna 937 for each radio communication scheme. In that case, the antenna switches 936 may be omitted from the configuration of the car navigation apparatus 920.

The battery 938 supplies power to blocks of the car navigation apparatus 920 illustrated in FIG. 40 via feeder lines that are partially shown as dashed lines in the figure. The battery 938 accumulates power supplied form the vehicle.

In the car navigation apparatus 920 illustrated in FIG. 40, the information acquisition unit 341 and the communication control unit 343 described with reference to FIG. 23 may be implemented in the radio communication interface 933. Alternatively, at least a part of constituent elements may be implemented in the processor 921. As one example, in the car navigation apparatus 920, a module including a part (for example, the BB processor 934) or all of the radio communication interface 933 and/or the processor 921 may be mounted, and the information acquisition unit 341 and the communication control unit 343 may be implemented in the module. In this case, the module may store a program causing the processor to function as the information acquisition unit 341 and the communication control unit 343 (in other words, a program causing the processor to perform the operations of the information acquisition unit 341 and the communication control unit 343) and may execute the program. As another example, a program causing the processor to function as the information acquisition unit 341 and the communication control unit 343 may be installed in the car navigation apparatus 920, and the radio communication interface 933 (for example, the BB processor 934) and/or the processor 921 may execute the program. As described above, the car navigation apparatus 920 or the module may be provided as an apparatus including the information acquisition unit 341 and the communication control unit 343, or a program causing the processor to function as the information acquisition unit 341 and the communication control unit 343 may be provided. A readable storage medium storing the program may be provided. In regard to this point, the information acquisition unit 351 and the communication control unit 353 described with reference to FIG. 30 and the information acquisition unit 361 and the communication control unit 363 described with reference to FIG. 33 are the same as the information acquisition unit 341 and the communication control unit 343.

The technology of the present disclosure may also be realized as an in-vehicle system (or a vehicle) 940 including one or more blocks of the car navigation apparatus 920, the in-vehicle network 941, and a vehicle module 942. That is, the in-vehicle system (or a vehicle) 940 may be provided as an apparatus including the information acquisition unit 341 and the communication control unit 343 (or the information acquisition unit 351 and the communication control unit 353, or the information acquisition unit 361 and the communication control unit 363). The vehicle module 942 generates vehicle data such as vehicle speed, engine speed, and trouble information, and outputs the generated data to the in-vehicle network 941.

7. Conclusion

The apparatuses and the processes according to the embodiments of the present disclosure have been described above with reference to FIGS. 1 to 40.

According to the embodiments of the present disclosure, the small base station 200 includes the information acquisition unit configured to acquire the channel configuration information indicating the configuration of the multicast channels disposed in the MBSFN subframes for the specific terminal group and the communication control unit configured to notify the specific terminal group of the channel configuration information. Further, for example, the communication control unit notifies the specific terminal group of the channel configuration information using the identification information for the specific terminal group.

According to the embodiments of the present disclosure, the terminal apparatus 300 includes the information acquisition unit configured to acquire the identification information for the specific terminal group and the communication control unit configured to acquire the channel configuration information which indicates the configuration of the multicast channels disposed in the MBSFN subframes for the specific terminal group and of which the small base station 200 notifies the specific terminal group using the identification information.

Accordingly, for example, it is possible to perform the multicast to the specific terminal group.

RNTI and DCI for Specific Terminal Group

For example, the identification information is the RNTI for the specific terminal group. Accordingly, for example, only the terminal apparatuses belonging to the specific terminal group are notified of the channel configuration information.

For example, the communication control unit of the small base station 200 notifies the specific terminal group of the channel configuration information through the DCI to be transmitted over the PDCCHs using the RNTI for the specific terminal group. The communication control unit of the terminal apparatus 300 acquires the channel configuration information through the DCI to be transmitted over the PDCCHs using the RNTI for the specific terminal group. Accordingly, for example, the specific terminal group can be quickly notified of the channel configuration information when it is necessary.

Multicast Channels

According to the first embodiment, the multicast channel is the MCCH. Accordingly, for example, the terminal apparatus belonging to the specific terminal group can acquire the information regarding the MCCHs for the specific terminal group. Therefore, the terminal apparatus can specify the PMCHs for the specific terminal group and the MTCHs mapped to the PMCHs (that is, the MTCHs for the specific terminal group). That is, it is possible to perform the multicast to the specific terminal group.

According to the second embodiment, the multicast channel is the PMCH. Accordingly, for example, the terminal apparatus belonging to the specific terminal group can specify the PMCHs for the specific terminal group and the MTCHs mapped to the PMCHs (that is, the MTCHs for the specific terminal group). That is, it is possible to perform the multicast to the specific terminal group.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the example in which the specific terminal group is the CSG has been described. However, the CSG may be managed by a mobility management entity (MME) in the core network 40 instead of being managed by the small base station. For example, a service provider of the MBSFN service may maintain a list of terminal apparatuses (user) to which the MBSFN service is to be provided and terminal IDs of the terminal apparatuses (users) may be copied to the MME. Then, the MME may perform access control of the CSG. The specific terminal group may not be the CSG, but may be another kind of group.

For example, the specific terminal group may not be a fixed group, but may be a variable group. For example, a terminal apparatus not belonging to the specific terminal group may transmit a predetermined message to a network and the terminal apparatus may be added to the specific terminal group.

For example, the embodiments in which attention is paid to the small base station have been described, but an embodiment of the present disclosure is not limited to the related example. For example, the operation of the above-described small base station may be performed by the macro base station. That is, the technology according to the present disclosure can be applied not only to the small base station but also to the macro base station.

For example, the example in which the communication system is a system that conforms to LTE, LTE-Advanced, or a communication standard equivalent thereto has been described, but an embodiment of the present disclosure is not limited thereto. For example, the communication system may be a system that conforms to another communication standard.

The processing steps in the processes of the present specification may not necessarily be performed chronologically in the orders described in the flowcharts or the sequence diagrams. For example, the steps in the processes may be performed in different orders from the orders described in the flowcharts or the sequence diagrams or may be performed in parallel.

It is also possible to generate a computer program causing the processors (for example, CPUs or DSPs) included in the nodes (for example, the control apparatus, the small base station, and/or the terminal apparatus) of the present specification to function as the constituent elements (for example, the information acquisition unit and the communication control unit) of the nodes (in other words, a computer program causing the processor to perform the operations of the constituent elements of the nodes). A storage medium storing the computer program may be provided. An apparatus (for example, an apparatus body or a module (a processing circuit, a chip, or the like) for the apparatus body) including a memory storing the computer program and one or more processors capable of executing the computer program may also be provided.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1) An apparatus including:

an acquisition unit configured to acquire channel configuration information indicating a configuration of a multicast channel disposed in a multimedia broadcast multicast service (MBMS) over single frequency network (MBSFN) subframe for a specific terminal group; and a control unit configured to notify the specific terminal group of the channel configuration information.

(2) The apparatus according to (1), wherein the control unit notifies the specific terminal group of the channel configuration information using identification information for the specific terminal group.

(3) The apparatus according to (2), wherein the identification information is a radio network temporary identifier (RNTI) for the specific terminal group.

(4) The apparatus according to (2) or (3), wherein the control unit notifies a terminal apparatus belonging to the specific terminal group of the identification information.

(5) The apparatus according to any one of (1) to (4), wherein the multicast channel is a multicast control channel (MCCH).

(6) The apparatus according to (5), wherein the control unit does not report the channel configuration information in a system information block.

(7) The apparatus according to (5) or (6), wherein the channel configuration information includes information indicating the subframe in which the multicast channel is disposed.

(8) The apparatus according to any one of (5) to (7), wherein the control unit notifies the specific terminal group of the channel configuration information when information regarding the multicast channel is changed.

(9) The apparatus according to any one of (1) to (4), wherein the multicast channel is a physical multicast channel (PMCH).

(10) The apparatus according to (9), wherein the channel configuration information is an MBSFN area configuration message.

(11) The apparatus according to (9) or (10), wherein the control unit notifies the specific terminal group of the channel configuration information when the channel configuration information is changed.

(12) The apparatus according to any one of (5) to (11), wherein, when a terminal apparatus belonging to the specific terminal group is connected in an MBSFN area, the control unit notifies the terminal apparatus of the channel configuration information.

(13) The apparatus according to (12), wherein, when the terminal apparatus is connected in the MBSFN area, the control unit notifies the terminal apparatus of the channel configuration information using identification information for the terminal apparatus.

(14) The apparatus according to any one of (1) to (13), wherein the control unit notifies the specific terminal group of the channel configuration information through downlink control information (DCI) to be transmitted over a physical downlink control channel (PDCCH) using an RNTI for the specific terminal group.

(15) The apparatus according to (14), wherein the control unit notifies the specific terminal group of the channel configuration information by notifying the specific terminal group of resource allocation information indicating a radio resource with which the channel configuration information is transmitted in the DCI, using the RNTI.

(16) The apparatus according to any one of (5) to (8), wherein the control unit notifies the specific terminal group of the channel configuration information in DCI to be transmitted over a PDCCH, using an RNTI for the specific terminal group.

(17) The apparatus according to any one of (9) to (11), wherein the control unit notifies the specific terminal group of the channel configuration information by notifying the specific terminal group that an MCCH is disposed in the subframe in which the MCCH is disposed among the MBSFN subframes for the specific terminal group in DCI to be transmitted over a PDCCH of the subframe, using an RNTI for the specific terminal group.

(18) The apparatus according to any one of (1) to (17), wherein the specific terminal group is a closed subscriber group (CSG).

(19) The apparatus according to any one of (1) to (18), wherein the apparatus is a base station of a small cell, a base station apparatus for the base station, or a module for the base station apparatus.

(20) The apparatus according to any one of (1) to (19), wherein the control unit allocates a radio resource of the subframe allocated to no multicast traffic channel (MTCH) among the MBSFN subframes for the specific terminal group to a terminal apparatus belonging to the specific terminal group.

(21) An apparatus including:
an acquisition unit configured to acquire identification information for a specific terminal group; and
a control unit configured to acquire channel configuration information which indicates a configuration of a multicast channel disposed in an MBSFN subframe for the specific terminal group and of which a base station notifies the specific terminal group using the identification information.

(22) The apparatus according to (21), wherein the apparatus is a terminal apparatus belonging to the specific terminal group or a module for the terminal apparatus.

(23) The apparatus according to (21) or (22), wherein the control unit determines whether a radio resource of the subframe allocated to no MTCH among the MBSFN subframes for the specific terminal group is allocated to the terminal apparatus.

(24) An apparatus including:
a decision unit configured to decide an MBSFN subframe for a specific terminal group.

(25) The apparatus according to (24), wherein the decision unit decides disposition of a multicast channel in the MBSFN subframe.

(26) The apparatus according to (24) or (25), further including:
a notification unit configured to notify a base station of the MBSFN subframe.

REFERENCE SIGNS LIST 1 communication system
10 macro cell
11 macro base station
100 control apparatus
131 decision unit
133 notification unit
100 control apparatus
131 decision unit
133 notification unit
200 small base station
251, 261, 271 information acquisition unit
253, 263, 273 communication control unit
200 terminal apparatus
341, 351, 361 information acquisition unit
343, 353, 363 communication control unit

The invention claimed is:
1. An apparatus comprising:
processing circuitry configured to
acquire channel configuration information indicating a configuration of a multicast channel disposed in a multimedia broadcast multicast service (MBMS) over single frequency network (MBSFN) subframe for a specific terminal group,
notify the specific terminal group of group multicast control channel (MCCH) configuration information over a physical downlink control channel (PDCCH) or a physical download shared channel (PDSCH) using a group radio network temporary identifier (RNTI) for the specific terminal group, wherein notifying the specific terminal group of the group MCCH configuration information includes generating a downlink control information (DCI) for the specific terminal group including cyclic redundancy check (CRC) bits scrambled by the group RNTI and the group MCCH configuration information, mapping the DCI to radio resources of the PDCCHs, and transmitting the DCI over the PDCCH, wherein terminal apparatuses belonging to the specific terminal group acquire the group MCCH configuration from only the DCI, transmit group physical multicast channel (PMCH) configuration information over the group MCCHs disposed in the group MBSFN subframes, wherein the PMCH configuration information includes MBSFN area configuration information, transmit multicast channel scheduling information of the PMCH in a first subframe in the group MBSFN subframes in which the PMCHs are disposed, transmit a predetermined MBMS session to the specific terminal group over the multicast traffic channels (MTCH) disposed in the MBSFN subframes, allocate radio resources of vacant subframes among the MBSFN subframes to one or more terminal apparatuses in the specific terminal group, wherein the vacant subframes are allocated for unicast, and notify the one or more terminal apparatuses of the vacant subframes, wherein vacant subframe information is included in the MBSFN area configuration message.

2. The apparatus according to claim 1, wherein the processing circuitry is further configured to
notify a terminal apparatus belonging to the specific terminal group of the group RNTI.

3. The apparatus according to claim 1, wherein the processing circuitry is further configured to
not report the channel configuration information in a system information block.

4. The apparatus according to claim 1, wherein the channel configuration information includes information indicating the subframe in which the multicast channel is disposed.

5. The apparatus according to claim 1, wherein the processing circuitry is further configured to
notify the specific terminal group of the channel configuration information when information regarding the multicast channel is changed.

6. The apparatus according to claim 1, wherein the multicast channel is a physical multicast channel (PMCH).

7. The apparatus according to claim 6, wherein the processing circuitry is further configured to
notify the specific terminal group of the channel configuration information when the channel configuration information is changed.

8. The apparatus according to claim 6, wherein the processing circuitry is further configured to
notify the specific terminal group of the channel configuration information by notifying the specific terminal group that an MCCH is disposed in the subframe in which the MCCH is disposed among the MBSFN subframes for the specific terminal group in DCI to be transmitted over a PDCCH of the subframe, using an RNTI for the specific terminal group.

9. The apparatus according to claim 1, wherein, when a terminal apparatus belonging to the specific terminal group is connected in an MBSFN area, the processing circuitry is further configured to notify the terminal apparatus of the channel configuration information.

10. The apparatus according to claim 9, wherein, when the terminal apparatus is connected in the MBSFN area, the processing circuitry is further configured to
notify the terminal apparatus of the channel configuration information using identification information for the terminal apparatus.

11. The apparatus according to claim 1, wherein the processing circuitry is further configured to
notify the specific terminal group of the channel configuration information by notifying the specific terminal group of resource allocation information indicating a radio resource with which the channel configuration information is transmitted in the DCI, using the RNTI.

12. The apparatus according to claim 1, wherein the specific terminal group is a closed subscriber group (CSG).

13. The apparatus according to claim 1, wherein the apparatus is a base station of a small cell, a base station apparatus for the base station, or a module for the base station apparatus.

14. The apparatus according to claim 1, wherein
the vacant subframes are subframes allocated to no multicast traffic channel (MTCH) among the MBSFN subframes for the specific terminal group, wherein the vacant subframe information is located in the system information block.

15. An apparatus comprising:
processing circuitry configured to
acquire identification information for a specific terminal group,
acquire group multicast control channel (MCCH) configuration information over a physical downlink control channel (PDCCH) or a physical download shared channel (PDSCH) using a group radio network temporary identifier (RNTI) for the specific terminal group, wherein notifying the specific terminal group of the group MCCH configuration information includes
generating a downlink control information (DCI) for the specific terminal group including cyclic redundancy check (CRC) bits scrambled by the group RNTI and the group MCCH configuration information, and
mapping the DCI to radio resources of the PDCCHs, and
transmitting the DCI over the PDCCH, wherein terminal apparatuses belonging to the specific terminal group acquire the group MCCH configuration from only the DCI,
receive group physical multicast channel (PMCH) configuration information over the group MCCHs disposed in the group MBSFN subframes, wherein the PMCH configuration information includes MBSFN area configuration information,
receive multicast channel scheduling information of the PMCH in a first subframe in the group MBSFN subframes in which the PMCHs are disposed, and
receive a predetermined MBMS session to the specific terminal group over the multicast traffic channels (MTCH) disposed in the MBSFN subframes,
acquire allocated radio resources of vacant subframes among the MBSFN subframes to one or more terminal apparatuses in the specific terminal group, wherein the vacant subframes are allocated for unicast, and receive notification the one or more terminal apparatuses of the vacant subframes, wherein vacant subframe information is included in the MBSFN area configuration message.

16. The apparatus according to claim 15, wherein the apparatus is a terminal apparatus belonging to the specific terminal group or a module for the terminal apparatus.

17. The apparatus according to claim 15, wherein the vacant subframes are subframes allocated to no MTCH among the MBSFN subframes for the specific terminal group, wherein the vacant subframe information is located in the system information block.

18. An apparatus comprising:
processing circuitry configured to
  determine a multimedia broadcast single frequency network (MBSFN) subframe for a specific terminal group, and
  notify a base station of the MBSFN subframe, wherein the base station is configured to
    acquire channel configuration information indicating a configuration of a multicast channel disposed in a multimedia broadcast multicast service (MBMS) over the MBSFN subframe for a specific terminal group,
    notify the specific terminal group of group multicast control channel (MCCH) configuration information over a physical downlink control channel (PDCCH) or a physical download shared channel (PDSCH) using a group radio network temporary identifier (RNTI) for the specific terminal group, wherein notifying the specific terminal group of the group MCCH configuration information includes
      generating a downlink control information (DCI) for the specific terminal group including cyclic redundancy check (CRC) bits scrambled by the group RNTI and the group MCCH configuration information, and
      mapping the DCI to radio resources of the PDCCHs, and
      transmitting the DCI over the PDCCH, wherein terminal apparatuses belonging to the specific terminal group acquire the group MCCH configuration from only the DCI,
    transmit group physical multicast channel (PMCH) configuration information over the group MCCHs disposed in the group MBSFN subframes, wherein the PMCH configuration information includes MBSFN area configuration information,
    transmit multicast channel scheduling information of the PMCH in a first subframe in the group MBSFN subframes in which the PMCHs are disposed, and
    transmit a predetermined MBMS session to the specific terminal group over the multicast traffic channels (MTCH) disposed in the MBSFN subframes,
    allocate radio resources of vacant subframes among the MBSFN subframes to one or more terminal apparatuses in the specific terminal group, wherein the vacant subframes are allocated for unicast, and
    notify the one or more terminal apparatuses of the vacant subframes, wherein vacant subframe information is included in the MBSFN area configuration message.

* * * * *